(12) United States Patent
Oberoi et al.

(10) Patent No.: US 10,835,948 B2
(45) Date of Patent: Nov. 17, 2020

(54) ADJUSTABLE RETAINING STRUCTURE FOR A CRADLE FIXTURE

(71) Applicant: The Boeing Company, Chicago, IL (US)

(72) Inventors: Harinder S. Oberoi, Snohomish, WA (US); Alfredo Jose Gerosa, Snohomish, WA (US); Kevin Marion Barrick, Kingston, WA (US); Quang T. Do, Mukilteo, WA (US); Yuanxin Charles Hu, Newcastle, WA (US); Branko Sarh, Huntington Beach, CA (US); Richard Griffith Reese, IV, Seattle, WA (US); Gregory Gudzinski, South Lyon, MI (US); Jeffrey Lawrence Miller, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 25 days.

(21) Appl. No.: 14/559,303

(22) Filed: Dec. 3, 2014

(65) Prior Publication Data
US 2016/0009421 A1     Jan. 14, 2016

Related U.S. Application Data

(60) Provisional application No. 62/022,641, filed on Jul. 9, 2014.

(51) Int. Cl.
*B64F 5/10* (2017.01)
*B21J 15/28* (2006.01)
(Continued)

(52) U.S. Cl.
CPC ............ *B21J 15/28* (2013.01); *B21J 15/02* (2013.01); *B21J 15/10* (2013.01); *B21J 15/142* (2013.01);
(Continued)

(58) Field of Classification Search
CPC . B21J 15/28; B21J 15/142; B64F 5/10; B64F 50/50; B64F 5/50; B64F 5/0009;
(Continued)

(56) References Cited

U.S. PATENT DOCUMENTS 530,733 A    12/1894    Tower
819,866 A    5/1906    Dobson
(Continued)

FOREIGN PATENT DOCUMENTS

CN    1252754 A    5/2000
CN    2779207 Y    5/2006
(Continued)

OTHER PUBLICATIONS

Manula Wor Positioner brochure-ergo-master; Rev C, 102, Jan. 2016.*
(Continued)

*Primary Examiner* — Tyrone V Hall, Jr.
*Assistant Examiner* — Mahdi H Nejad
(74) *Attorney, Agent, or Firm* — Yee & Associates, P.C.

(57) ABSTRACT

A method and apparatus for adjusting an adjustable retaining structure. The adjustable retaining structure may be rotated, passively, about a spherical interface as a panel applies a load to the adjustable retaining structure.

33 Claims, 37 Drawing Sheets

(51) Int. Cl.
| | |
|---|---|
| *B21J 15/02* | (2006.01) |
| *B21J 15/10* | (2006.01) |
| *B21J 15/14* | (2006.01) |
| *B60G 3/14* | (2006.01) |
| *B25J 5/00* | (2006.01) |
| *B25J 9/16* | (2006.01) |
| *B25J 11/00* | (2006.01) |
| *F16B 19/06* | (2006.01) |
| *B23P 19/10* | (2006.01) |
| *B60G 7/00* | (2006.01) |
| *B21J 15/32* | (2006.01) |
| *B21J 15/40* | (2006.01) |
| *G05B 19/418* | (2006.01) |
| *B25B 5/16* | (2006.01) |
| *B29C 39/12* | (2006.01) |
| *B29C 39/22* | (2006.01) |
| *B64C 1/06* | (2006.01) |
| *G05D 1/00* | (2006.01) |
| *G05D 3/12* | (2006.01) |
| *B29C 45/14* | (2006.01) |
| *B29C 39/02* | (2006.01) |
| *B29C 39/10* | (2006.01) |
| *B64F 5/50* | (2017.01) |
| *B23P 21/00* | (2006.01) |
| *B29L 31/00* | (2006.01) |
| *B60P 3/025* | (2006.01) |

(52) U.S. Cl.
CPC ............ *B21J 15/32* (2013.01); *B21J 15/40* (2013.01); *B23P 19/10* (2013.01); *B25B 5/163* (2013.01); *B25J 5/007* (2013.01); *B25J 9/1682* (2013.01); *B25J 9/1687* (2013.01); *B25J 9/1697* (2013.01); *B25J 11/005* (2013.01); *B25J 11/007* (2013.01); *B29C 39/026* (2013.01); *B29C 39/10* (2013.01); *B29C 39/123* (2013.01); *B29C 39/22* (2013.01); *B29C 45/14336* (2013.01); *B60G 3/145* (2013.01); *B60G 7/001* (2013.01); *B60G 7/008* (2013.01); *B64C 1/06* (2013.01); *B64F 5/10* (2017.01); *B64F 5/50* (2017.01); *F16B 19/06* (2013.01); *G05B 19/41805* (2013.01); *G05D 1/0088* (2013.01); *G05D 3/12* (2013.01); *B23P 21/002* (2013.01); *B23P 2700/00* (2013.01); *B23P 2700/01* (2013.01); *B29C 2045/14368* (2013.01); *B29C 2793/0081* (2013.01); *B29K 2715/00* (2013.01); *B29L 2031/748* (2013.01); *B60G 2204/143* (2013.01); *B60G 2204/418* (2013.01); *B60G 2206/8207* (2013.01); *B60G 2300/60* (2013.01); *B60P 3/025* (2013.01); *G05B 2219/45071* (2013.01); *Y02P 90/80* (2015.11); *Y10S 901/01* (2013.01); *Y10S 901/02* (2013.01); *Y10S 901/41* (2013.01)

(58) Field of Classification Search
CPC ......... B25J 5/007; B29C 39/026; B23P 19/10; B23P 2700/01; G05B 2219/45071; F16M 11/14; F16M 11/041; Y10T 403/32311; B23B 47/28
USPC ....... 269/17, 75; 248/181.1, 288.31; 29/559, 29/428
See application file for complete search history.

(56) References Cited

U.S. PATENT DOCUMENTS

| | | | |
|---|---|---|---|
| 1,128,634 A | 2/1915 | Talbot | |
| 1,533,099 A | 4/1925 | Carroll | |
| 2,123,226 A * | 7/1938 | Benedek | B60K 5/1241 180/299 |
| 2,391,510 A * | 12/1945 | Pioch | B25H 1/00 105/177 |
| 2,505,245 A | 4/1950 | Hollerith | |
| 2,712,874 A * | 7/1955 | Murray | B60P 3/11 254/10 R |
| 2,714,321 A | 8/1955 | Roy | |
| 2,896,909 A * | 7/1959 | Taylor | B60P 1/025 254/134 |
| 3,253,842 A | 5/1966 | Rabe | |
| 3,348,572 A * | 10/1967 | Hall | E03B 11/10 137/899.3 |
| 3,355,346 A | 11/1967 | Black et al. | |
| 3,774,636 A | 11/1973 | Arita | |
| 3,865,203 A | 2/1975 | Hibma | |
| 3,952,401 A | 4/1976 | Wagner | |
| 3,957,263 A * | 5/1976 | Christl | B21D 43/18 269/21 |
| 4,172,591 A | 10/1979 | Craig | |
| 4,310,958 A | 1/1982 | Balaud et al. | |
| 4,424,741 A * | 1/1984 | Moldestad | B21D 55/00 100/226 |
| 4,440,265 A | 4/1984 | Spagnoli | |
| 4,445,678 A * | 5/1984 | George | B23Q 3/104 269/282 |
| 4,461,455 A * | 7/1984 | Mills | B64F 5/50 180/125 |
| 4,491,306 A * | 1/1985 | Eickhorst | B25B 11/005 269/21 |
| 4,575,934 A | 3/1986 | Kitmura et al. | |
| 4,599,033 A * | 7/1986 | Raz | B66F 5/02 187/244 |
| 4,714,339 A | 12/1987 | Lau et al. | |
| 4,740,025 A | 4/1988 | Nelson | |
| 4,798,371 A | 1/1989 | Wallisser | |
| 4,864,702 A * | 9/1989 | Speller, Sr. | B21J 15/14 29/243.53 |
| 4,885,836 A | 12/1989 | Bonomi et al. | |
| 4,943,202 A | 7/1990 | Galloway | |
| 4,995,148 A | 2/1991 | Bonomi et al. | |
| 5,005,912 A * | 4/1991 | Pipes | B66F 9/072 105/220 |
| 5,145,276 A * | 9/1992 | Demange | F16B 7/20 285/360 |
| 5,163,793 A * | 11/1992 | Martinez | B21J 15/10 269/309 |
| 5,248,341 A * | 9/1993 | Berry, Jr. | B05B 13/0431 105/163.2 |
| 5,318,394 A * | 6/1994 | Pierce | B23B 47/287 408/115 B |
| 5,408,219 A | 4/1995 | Newman et al. | |
| 5,423,396 A * | 6/1995 | Fahrion | B66F 11/04 182/115 |
| 5,477,597 A * | 12/1995 | Catania | B21J 15/10 29/33 K |
| 5,590,870 A * | 1/1997 | Goellner | B25B 5/003 269/21 |
| 5,738,344 A * | 4/1998 | Hagman | B23Q 1/545 269/20 |
| 5,795,078 A * | 8/1998 | Li | A47C 3/0257 384/2 |
| 5,857,713 A | 1/1999 | Horimoto | |
| 5,896,637 A * | 4/1999 | Sarh | B23P 19/04 227/51 |
| 5,903,459 A | 5/1999 | Greenwood et al. | |
| 6,030,244 A | 2/2000 | Bickheit et al. | |
| 6,098,260 A * | 8/2000 | Sarh | B21J 15/10 227/52 |
| 6,108,896 A | 8/2000 | Gignac et al. | |
| 6,113,343 A | 9/2000 | Goldenberg et al. | |

(56) References Cited

U.S. PATENT DOCUMENTS

| | | | |
|---|---|---|---|
| 6,158,666 A * | 12/2000 | Banks | B21J 15/10 |
| | | | 105/25 |
| 6,282,036 B1 * | 8/2001 | Woytassek | G01B 5/0004 |
| | | | 359/438 |
| 6,295,710 B1 * | 10/2001 | Roberts | B21J 15/10 |
| | | | 100/226 |
| 6,357,194 B1 | 3/2002 | Jones | |
| 6,415,476 B1 | 7/2002 | McCoy | |
| 6,447,073 B1 | 9/2002 | Goettker | |
| 6,470,820 B1 | 10/2002 | Wilkins | |
| 6,481,096 B2 | 11/2002 | Lehmker et al. | |
| 6,505,393 B2 * | 1/2003 | Stoewer | B21J 15/10 |
| | | | 29/243.53 |
| 6,513,231 B1 | 2/2003 | Hafenrichter et al. | |
| 6,575,443 B2 * | 6/2003 | Kick | B25B 11/00 |
| | | | 269/21 |
| 6,691,392 B2 | 2/2004 | Savoy et al. | |
| 7,111,854 B1 | 9/2006 | Tuthill et al. | |
| 7,237,789 B1 | 7/2007 | Herman | |
| 7,344,109 B1 | 3/2008 | Rezai | |
| 7,402,009 B2 | 7/2008 | Hamann et al. | |
| 7,416,363 B2 | 8/2008 | Kozhuev | |
| 7,421,886 B1 | 9/2008 | Fox et al. | |
| 7,527,759 B2 | 5/2009 | Lee et al. | |
| 7,530,607 B2 | 5/2009 | Luft | |
| 7,686,287 B2 * | 3/2010 | Dixon | B23Q 1/32 |
| | | | 269/20 |
| RE41,821 E | 10/2010 | Ross et al. | |
| 7,940,685 B1 | 5/2011 | Breslau | |
| 7,966,729 B2 | 6/2011 | Frauen et al. | |
| 8,146,222 B2 * | 4/2012 | Frauen | B64F 5/10 |
| | | | 228/44.3 |
| 8,266,778 B2 | 9/2012 | Neuhaus et al. | |
| 8,353,199 B1 * | 1/2013 | Ma | A63H 27/12 |
| | | | 108/136 |
| 8,499,433 B2 * | 8/2013 | Matlack | B23Q 3/062 |
| | | | 269/130 |
| 8,602,713 B1 * | 12/2013 | Davis | B60P 1/025 |
| | | | 254/10 C |
| 8,634,950 B2 | 1/2014 | Simonetti et al. | |
| 8,752,293 B2 * | 6/2014 | Jones | B29C 70/30 |
| | | | 156/196 |
| 8,916,010 B2 * | 12/2014 | Brennan | B29C 70/30 |
| | | | 156/123 |
| 8,989,053 B1 | 3/2015 | Saaksrud et al. | |
| 9,014,836 B2 * | 4/2015 | Stone | B64F 5/0036 |
| | | | 29/791 |
| 9,063,525 B2 | 6/2015 | Sanders et al. | |
| 9,096,331 B2 * | 8/2015 | Gehlsen | B64F 5/0081 |
| 9,211,679 B1 * | 12/2015 | Metschan | B29C 70/30 |
| 9,309,008 B2 * | 4/2016 | Boulanger | B64F 5/0036 |
| 9,315,137 B1 * | 4/2016 | Davis | B60P 1/34 |
| 9,327,751 B2 * | 5/2016 | Nou | B62B 3/04 |
| 9,505,051 B2 * | 11/2016 | Oberoi | B29C 45/14336 |
| 9,751,435 B1 | 9/2017 | Davis et al. | |
| 2001/0054228 A1 * | 12/2001 | Lehmker | B21J 15/10 |
| | | | 29/701 |
| 2002/0087587 A1 | 7/2002 | Vos et al. | |
| 2002/0092149 A1 | 7/2002 | Wolf et al. | |
| 2002/0124377 A1 | 9/2002 | Nakamura | |
| 2002/0170160 A1 | 11/2002 | Savoy et al. | |
| 2003/0009867 A1 | 1/2003 | Whiten et al. | |
| 2003/0023540 A2 | 1/2003 | Johnson et al. | |
| 2003/0229900 A1 | 12/2003 | Reisman | |
| 2004/0022379 A1 | 2/2004 | Klos et al. | |
| 2004/0110483 A1 | 6/2004 | Mollenkopf | |
| 2004/0113756 A1 | 6/2004 | Mollenkopf | |
| 2004/0113757 A1 | 6/2004 | White et al. | |
| 2004/0135676 A1 | 7/2004 | Berkman et al. | |
| 2004/0267254 A1 | 12/2004 | Manzo et al. | |
| 2005/0015962 A1 * | 1/2005 | Sturm, Jr. | B23Q 1/035 |
| | | | 29/468 |
| 2005/0023052 A1 | 2/2005 | Beck et al. | |
| 2005/0041048 A1 | 2/2005 | Hillman et al. | |
| 2005/0084344 A1 * | 4/2005 | Dods | B23B 47/287 |
| | | | 408/67 |
| 2005/0275181 A1 | 12/2005 | MacIsaac | |
| 2006/0032702 A1 | 2/2006 | Linsmeier et al. | |
| 2006/0117547 A1 * | 6/2006 | Ffield | B21J 15/02 |
| | | | 29/525.06 |
| 2006/0118235 A1 * | 6/2006 | Lum | B25B 5/14 |
| | | | 156/285 |
| 2006/0167587 A1 | 7/2006 | Read | |
| 2006/0171776 A1 | 8/2006 | Luft | |
| 2006/0218780 A1 | 10/2006 | Lewis et al. | |
| 2006/0284047 A1 * | 12/2006 | Spishak | B64F 5/10 |
| | | | 248/637 |
| 2007/0001432 A1 | 1/2007 | Thurm | |
| 2007/0001868 A1 | 1/2007 | Hillan | |
| 2007/0036627 A1 * | 2/2007 | Wright | B25H 1/0007 |
| | | | 410/49 |
| 2007/0051852 A1 | 3/2007 | McCoskey et al. | |
| 2007/0061811 A1 | 3/2007 | Rumelhart et al. | |
| 2007/0080001 A1 | 4/2007 | Beck et al. | |
| 2007/0143398 A1 | 6/2007 | Graham | |
| 2007/0200379 A1 | 8/2007 | Key et al. | |
| 2007/0220341 A1 | 9/2007 | Apostoloui et al. | |
| 2007/0266423 A1 | 11/2007 | Tehee | |
| 2007/0276538 A1 | 11/2007 | Kjellsson | |
| 2008/0054541 A1 | 3/2008 | Dixon et al. | |
| 2008/0066311 A1 * | 3/2008 | Greene | B21D 53/88 |
| | | | 29/897.2 |
| 2008/0087783 A1 * | 4/2008 | Istas | F16M 11/14 |
| | | | 248/288.11 |
| 2008/0099612 A1 | 5/2008 | Plude et al. | |
| 2008/0113557 A1 | 5/2008 | Cox et al. | |
| 2008/0160253 A1 | 7/2008 | Liu et al. | |
| 2008/0162956 A1 | 7/2008 | Bozek et al. | |
| 2008/0162958 A1 | 7/2008 | Bozek et al. | |
| 2008/0178537 A1 | 7/2008 | Spangler et al. | |
| 2008/0205763 A1 | 8/2008 | Marsh et al. | |
| 2008/0250626 A1 | 10/2008 | Frankenberger et al. | |
| 2008/0255899 A1 | 10/2008 | McConnell et al. | |
| 2008/0256776 A1 * | 10/2008 | Neuhaus | B64F 5/10 |
| | | | 29/446 |
| 2008/0307630 A1 | 12/2008 | Hasegawa et al. | |
| 2009/0022556 A1 | 1/2009 | Clark | |
| 2009/0044655 A1 | 2/2009 | DeLouis et al. | |
| 2009/0067973 A1 | 3/2009 | Eliuk et al. | |
| 2009/0083589 A1 | 3/2009 | Fulton et al. | |
| 2009/0100096 A1 | 4/2009 | Erlichson et al. | |
| 2009/0139375 A1 | 6/2009 | Hathaway | |
| 2009/0313363 A1 | 12/2009 | Parsons et al. | |
| 2010/0031509 A1 * | 2/2010 | Frauen | B64F 5/10 |
| | | | 29/897.2 |
| 2010/0077810 A1 | 4/2010 | De Franceschi et al. | |
| 2010/0156632 A1 | 6/2010 | Hyland et al. | |
| 2010/0235037 A1 | 6/2010 | Vian et al. | |
| 2010/0259931 A1 | 10/2010 | Chemel et al. | |
| 2010/0264846 A1 | 10/2010 | Chemel et al. | |
| 2010/0270933 A1 | 10/2010 | Chemel et al. | |
| 2010/0295473 A1 | 11/2010 | Chemel et al. | |
| 2010/0295474 A1 | 11/2010 | Chemel et al. | |
| 2010/0295475 A1 | 11/2010 | Chemel et al. | |
| 2010/0295482 A1 | 11/2010 | Chemel et al. | |
| 2010/0295672 A1 | 11/2010 | Hyland et al. | |
| 2010/0301768 A1 | 12/2010 | Chemel et al. | |
| 2010/0301769 A1 | 12/2010 | Chemel et al. | |
| 2010/0301770 A1 | 12/2010 | Chemel et al. | |
| 2010/0301771 A1 | 12/2010 | Chemel et al. | |
| 2010/0301774 A1 | 12/2010 | Chemel et al. | |
| 2011/0001436 A1 | 1/2011 | Chemel et al. | |
| 2011/0001438 A1 | 1/2011 | Chemel et al. | |
| 2011/0010007 A1 | 1/2011 | Sarh et al. | |
| 2011/0046775 A1 | 2/2011 | Bailey et al. | |
| 2011/0054694 A1 | 3/2011 | Munk | |
| 2011/0063417 A1 | 3/2011 | Peters et al. | |
| 2011/0066297 A1 | 3/2011 | Saberi et al. | |
| 2011/0101192 A1 * | 5/2011 | Lee | F16C 11/106 |
| | | | 248/346.03 |
| 2011/0138601 A1 | 6/2011 | Kilibarda | |
| 2011/0189440 A1 | 8/2011 | Appleby et al. | |

(56) References Cited

U.S. PATENT DOCUMENTS

| | | | |
|---|---|---|---|
| 2011/0308638 A1 | 12/2011 | Hyland et al. | |
| 2012/0007374 A1 | 1/2012 | Nakasugi et al. | |
| 2012/0110816 A1* | 5/2012 | Groves | B62B 3/10 29/428 |
| 2012/0197449 A1 | 8/2012 | Sanders | |
| 2012/0224944 A1 | 9/2012 | Boulanger et al. | |
| 2012/0235579 A1 | 9/2012 | Chemel et al. | |
| 2012/0240381 A1 | 9/2012 | Carey | |
| 2012/0300093 A1 | 11/2012 | Laudrain et al. | |
| 2013/0008977 A1 | 1/2013 | Pfrenger et al. | |
| 2013/0009469 A1 | 1/2013 | Gillett | |
| 2013/0035783 A1 | 2/2013 | Scheuerman et al. | |
| 2013/0152397 A1 | 6/2013 | Oberoi et al. | |
| 2013/0158697 A1* | 6/2013 | Stone | B64F 5/0036 700/114 |
| 2013/0167610 A1 | 7/2013 | Sarh et al. | |
| 2013/0176141 A1 | 7/2013 | LaFrance et al. | |
| 2013/0185925 A1 | 7/2013 | Sarh et al. | |
| 2013/0318767 A1* | 12/2013 | Kott | B64C 1/00 29/464 |
| 2014/0096365 A1 | 4/2014 | Sarh et al. | |
| 2014/0156905 A1 | 6/2014 | Butcher et al. | |
| 2014/0165388 A1 | 6/2014 | Kim et al. | |
| 2014/0223490 A1 | 8/2014 | Pan et al. | |
| 2014/0277717 A1* | 9/2014 | Jung | B25J 9/1682 700/248 |
| 2014/0292538 A1 | 10/2014 | Pathi et al. | |
| 2014/0312581 A1 | 10/2014 | Anderson | |
| 2014/0353894 A1* | 12/2014 | DesJardien | B23P 19/10 269/21 |
| 2014/0366352 A1* | 12/2014 | Jang | B62D 65/026 29/281.1 |
| 2015/0005939 A1 | 1/2015 | DiStefano | |
| 2015/0008296 A1* | 1/2015 | Longaphie | B65D 19/0004 248/121 |
| 2015/0052596 A1 | 2/2015 | Ayanam et al. | |
| 2015/0060231 A1 | 3/2015 | Bosgoed | |
| 2015/0082593 A1 | 3/2015 | Courtier | |
| 2015/0113792 A1* | 4/2015 | Jacobs | E21B 19/163 29/559 |
| 2015/0135206 A1 | 5/2015 | Reisman | |
| 2015/0135214 A1 | 5/2015 | Reisman | |
| 2015/0244306 A1 | 8/2015 | Estes | |
| 2015/0291273 A1* | 10/2015 | Elze | B64C 1/069 244/120 |
| 2015/0306967 A1 | 10/2015 | Cohen | |
| 2015/0363481 A1 | 12/2015 | Haynes | |
| 2015/0375390 A1 | 12/2015 | Becroft et al. | |
| 2016/0008934 A1* | 1/2016 | Oberoi | B29C 45/14336 29/428 |
| 2016/0009417 A1* | 1/2016 | Oberoi | B29C 45/14336 700/117 |
| 2016/0009420 A1* | 1/2016 | Oberoi | B29C 45/14336 29/897.2 |
| 2016/0009421 A1 | 1/2016 | Oberoi et al. | |
| 2016/0011593 A1* | 1/2016 | Oberoi | B29C 45/14336 701/23 |
| 2016/0068210 A1 | 3/2016 | Sakamoto | |
| 2016/0074926 A1* | 3/2016 | Hunt | B29C 70/00 72/19.6 |
| 2016/0075347 A1 | 3/2016 | Thompson et al. | |
| 2016/0075451 A1* | 3/2016 | Hunt | B64F 5/0009 72/16.2 |
| 2016/0076879 A1* | 3/2016 | Hunt | G01B 11/24 356/601 |
| 2016/0087432 A1 | 3/2016 | Matan et al. | |
| 2016/0130017 A1* | 5/2016 | Best | B05B 13/005 427/427.1 |
| 2016/0163177 A1 | 6/2016 | Klicpera | |
| 2016/0185467 A1* | 6/2016 | Lim | B64F 5/0009 29/714 |
| 2016/0204606 A1 | 7/2016 | Matan et al. | |
| 2016/0217093 A1 | 7/2016 | Whittington et al. | |
| 2016/0311284 A1 | 10/2016 | Osborne et al. | |
| 2016/0319855 A1 | 11/2016 | Watanabe | |
| 2016/0354883 A1* | 12/2016 | Vogt | B23P 21/004 |
| 2016/0381181 A1 | 12/2016 | Cohan | |
| 2017/0001735 A1* | 1/2017 | Darras | B23P 19/04 |
| 2017/0015440 A1* | 1/2017 | Hunt | B21D 53/92 |
| 2017/0247122 A1* | 8/2017 | Hunt | B64F 5/10 |
| 2017/0253167 A1* | 9/2017 | Gill, III | B60P 3/00 |
| 2017/0369144 A1* | 12/2017 | Payne | B64C 1/12 |
| 2018/0126447 A1 | 5/2018 | Oberoi et al. | |

FOREIGN PATENT DOCUMENTS

| | | |
|---|---|---|
| CN | 201442654 U | 4/2010 |
| CN | 102001451 A | 4/2011 |
| CN | 102765489 A | 11/2012 |
| CN | 103228536 A | 7/2013 |
| CN | 103303491 A | 9/2013 |
| CN | 103889664 A | 6/2014 |
| CN | 204624973 U * | 9/2015 |
| DE | 10134852 A1 | 8/2002 |
| DE | 102008062026 A1 | 6/2010 |
| DE | 102009018991 A1 | 11/2010 |
| DE | 102011053800 A1 | 3/2013 |
| EP | 1063166 A1 | 12/2000 |
| EP | 1961514 A2 | 8/2008 |
| EP | 2166646 A1 | 3/2010 |
| EP | 2221151 A2 | 8/2010 |
| EP | 2527257 A1 | 11/2012 |
| EP | 2527527 A2 | 11/2012 |
| EP | 2604523 A2 | 6/2013 |
| EP | 2617536 A1 | 7/2013 |
| EP | 2965871 A2 | 1/2016 |
| EP | 2965994 B1 | 10/2019 |
| FR | 2153221 A1 | 5/1973 |
| FR | 2457151 A1 | 12/1980 |
| FR | 2706369 A1 | 12/1994 |
| FR | 2841809 A1 | 1/2004 |
| GB | 2473100 A | 3/2011 |
| WO | WO 9636461 A1 | 11/1996 |
| WO | WO 2004/113015 * | 12/2004 |
| WO | WO2014023284 A2 | 2/2014 |

OTHER PUBLICATIONS

Ergo Master by Ergotronix; Oct. 17, 2017.*
Extended European Search Report, dated Nov. 5, 2015, regarding Application No. EP14196476.7, 6 pages.
Partial European Search Report, dated Nov. 17, 2015, regarding Application No. EP14196497.3, 5 pages.
Extended European Search Report, dated Nov. 26, 2015, regarding Application No. EP14196544.2, 8 pages.
Extended European Search Report, dated Dec. 2, 2015, regarding Application No. EP14196574.9, 8 pages.
Canadian Search Report, dated Jun. 1, 2016, regarding Application No. 2894206, 4 pages.
Notice of Allowance, dated Jul. 20, 2016, regarding U.S. Appl. No. 14/558,933, 18 pages.
Office Action, dated Sep. 23, 2016, regarding U.S. Appl. No. 14/559,191, 36 pages.
Sarh et al., "Positioning System for Electromagnetic Riveting," U.S. Appl. No. 14/168,259, filed Jan. 30, 2014, 82 pages.
Oberoi et al., "Mobile Platforms for Performing Operations along an Exterior of a Fuselage Assembly," U.S. Appl. No. 14/558,933, filed Dec. 3, 2014, 170 pages.
Oberoi et al., "Mobile Platforms for Performing Operations Inside a Fuselage Assembly," U.S. Appl. No. 14/559,073, filed Dec. 3, 2014, 163 pages.
Oberoi et al., "Wheel Mounting System," U.S. Appl. No. 14/559,115, filed Dec. 3, 2014, 149 pages.
Oberoi et al., "Dual-Interface Coupler," U.S. Appl. No. 14/559,153, filed Dec. 3, 2014, 166 pages.
Oberoi et al., "Metrology-Based System for Operating a Flexible Manufacturing System," U.S. Appl. No. 14/559,855, filed Dec. 3, 2014, 170 pages.

(56) References Cited

OTHER PUBLICATIONS

Oberoi et al., "Clamping Feet for an End Effector," U.S. Appl. No. 14/559,191, filed Dec. 3, 2014, 115 pages.
Oberoi et al., "Towers for Accessing an Interior of a Fuselage Assembly," U.S. Appl. No. 14/559,234, filed Dec. 3, 2014, 166 pages.
Oberoi et al., "Assembly Fixture for Supporting a Fuselage Assembly," U.S. Appl. No. 14/559,277, filed Dec. 3, 2014, 176 pages.
Oberoi et al., "Utility Fixture for Creating a Distributed Utility Network," U.S. Appl. No. 14/559,371, filed Dec. 3, 2014, 158 pages.
Oberoi et al., "Two-Stage Riveting," U.S. Appl. No. 14/559,483, filed Dec. 3, 2014, 118 pages.
Oberoi et al., "Autonomous Flexible Manufacturing System for Building a Fuselage," U.S. Appl. No. 14/559,518, filed Dec. 3, 2014, 150 pages.
Canadian Search Report, dated Sep. 8, 2016, regarding Application No. 2,894,299, 5 pages.
Extended European Search Report, dated Feb. 8, 2016, regarding Application No. EP14196497.3, 13 pages.
Partial European Search Report, dated Jan. 28, 2016, regarding Application No. EP14196608.5, 10 pages.
Extended European Search Report, dated Feb. 18, 2016, regarding Application No. EP14196581.4, 9 pages.
Office Action, dated Mar. 4, 2016, regarding U.S. Appl. No. 14/558,933, 22 pages.
Extended European Search Report, dated May 4, 2016, regarding Application No. EP14196469.2, 8 pages.
Extended European Search Report, dated Apr. 8, 2016, regarding Application No. EP14196472.6, 6 pages.
Extended European Search Report, dated May 9, 2016, regarding Application No. EP14196474.2, 8 pages.
Extended European Search Report, dated May 10, 2016, regarding Application No. EP14196491.6, 7 pages.
Partial European Search Report, dated Jun. 20, 2016, regarding Application No. EP14196485.8, 129 pages.
Canadian Search Report, dated Jun. 28, 2016, regarding Application No. 2895735, 4 pages.
Canadian Search Report, dated Aug. 3, 2016, regarding Application No. 2895704, 4 pages.
Canadian Search Report, dated Jan. 30, 2017, regarding Application No. 2,895,739, 3 pages.
Extended European Search Report, dated Mar. 15, 2017, regarding Application No. 14196485.8, 9 pages.
Canadian Intellectual Property Office Examination Search Report, dated Feb. 23, 2017, regarding Application No. 2,896,059, 11 pages.
Office Action, dated Jan. 27, 2017, U.S. Appl. No. 14/559,073, 53 pages.
Office Action, dated Nov. 29, 2016, U.S. Appl. No. 14/559,115, 48 pages.
Office Action, dated Feb. 1, 2017, regarding U.S. Appl. No. 14/559,234, 47 pages.
Office Action, dated Jan. 18, 2017, regarding U.S. Appl. No. 14/559,371, 46 pages.
Extended European Search Report, dated Jul. 11, 2016, regarding Application No. 14196608.5, 15 pages.
Office Action, dated Feb. 10, 2017, regarding U.S. Appl. No. 14/559,855, 45 pages.
Canadian Intellectual Property Office Office Action, dated Jun. 9, 2017, regarding Application No. 2,895,824, 5 pages.
Canadian Intellectual Property Office Office Action, dated Jul. 5, 2017, regarding Application No. 2,894,299, 18 pages.
Extended European Search Report, dated Jul. 25, 2017, regarding Application No. EP17168019.2, 8 pages.
Final Office Action, dated Aug. 9, 2017, regarding U.S. Appl. No. 14/559,855, 38 pages.
Office Action, dated Jun. 30, 2017, regarding U.S. Appl. No. 14/559,483, 42 pages.
Final Office Action, dated Aug. 28, 2017, regarding U.S. Appl. No. 14/559,518, 29 pages.
Canadian Intellectual Property Office Office Action, dated Apr. 10, 2017, regarding Application No. 2,895,735, 3 pages.
Canadian Intellectual Property Office Office Action, dated May 2, 2017, regarding Application No. 2,894,311, 17 pages.
Canadian Intellectual Property Office Office Action, dated Apr. 27, 2017, regarding Application No. 2,895,737, 10 pages.
Canadian Intellectual Property Office Office Action, dated Apr. 6, 2017, regarding Application No. 2,894,306, 12 pages.
Final Office Action, dated Jun. 8, 2017, regarding U.S. Appl. No. 14/559,073, 22 pages.
Notice of Allowance, dated Jun. 2, 2017, regarding U.S. Appl. No. 14/559,115, 15 pages.
Office Action, dated Apr. 6, 2017, regarding U.S. Appl. No. 14/559,153, 42 pages.
Final Office Action, dated May 9, 2017, regarding U.S. Appl. No. 14/559,191, 36 pages.
Final Office Action, dated Jun. 8, 2017, regarding U.S. Appl. No. 14/559,234, 22 pages.
Final Office Action, dated May 16, 2017, regarding U.S. Appl. No. 14/559,371, 27 pages.
Office Action, dated Apr. 5, 2017, regarding U.S. Appl. No. 14/559,518, 64 pages.
Decker et al. "Dynamic Measurement of Position and Orientation of Robots",IEEE Transactions on Instrumentation and Measurement, vol. 41, No. 6, Dec. 1992, 5 pages.
Canadian Intellectual Property Office Office Action, dated May 29, 2017, regarding Application No. 2,895,704, 7 pages.
Canadian Intellectual Property Office, Office Action, dated Jan. 25, 2018, regarding Application No. 2,895,737, 11 pages.
Canadian Intellectual Property Office Examination Report, dated Jan. 31, 2018, regarding Application No. 2,894,308, 19 pages.
Canadian Examination Search Report, dated Mar. 28, 2018, regarding Application No. 2,895,704, 10 pages.
Chinese National Intellectual Property Administration First Notification of Office Action with English Translation, dated Oct. 26, 2018, regarding Application No. 201510394571.2, 13 pages.
Chinese National Intellectual Property Administration First Notification of Office Action with English Translation, dated Oct. 29, 2018, regarding Application No. 201510400460.8, 13 pages.
Canadian Intellectual Property Office Examination Search Report, dated Nov. 8, 2018, regarding Application No. 2894308, 3 pages.
European Patent Office Communication Report, dated Nov. 16, 2018, regarding Application No. 14196574.9, 7 pages.
European Patent Office Communication Report, dated Dec. 6, 2018, regarding Application No. 14196608.5, 4 pages.
Canadian Intellectual Property Office Communication Report, dated Jan. 28, 2019, regarding Application No. 2895704, 5 pages.
Japanese Notice of Reasons for Rejection with English translation, dated Jun. 3, 2019, regarding Application No. 2015-119173, 12 pages.
Canadian Intellectual Property Office Examination Search Report, dated Nov. 6, 2019, regarding Application No. 2895704, 5 pages.
European Patent Office Office Action, dated Nov. 29, 2019, regarding Application No. 19192945.4, 3 pages.
Extended European Search Report, dated Mar. 17, 2020, regarding Application No. 19192945.4, 9 pages.
Office Action, dated Sep. 25, 2017, regarding U.S. Appl. No. 15/352,524, 49 pages.
Final Office Action, dated Oct. 18, 2017, regarding U.S. Appl. No. 14/559,153, 20 pages.
Office Action, dated Nov. 22, 2017, regarding U.S. Appl. No. 14/559,234, 25 pages.
Office Action, dated Nov. 17, 2017, regarding U.S. Appl. No. 14/559,277, 73 pages.
Notice of Allowance, dated Sep. 6, 2017, regarding U.S. Appl. No. 14/559,371, 20 pages.
Notice of Allowance, dated Nov. 22, 2017, regarding U.S. Appl. No. 12/559,483, 17 pages.

* cited by examiner

ADJUSTABLE RETAINING STRUCTURE FOR A CRADLE FIXTURE

RELATED PROVISIONAL APPLICATION

This application claims the benefit of U.S. Provisional Patent Application Ser. No. 62/022,641, filed Jul. 9, 2014, and entitled "Automated Flexible Manufacturing System for Building a Fuselage."

CROSS-REFERENCE TO RELATED APPLICATIONS

This application is related to the following patent applications: entitled "Autonomous Flexible Manufacturing System for Building a Fuselage," Ser. No. 14/559,518; entitled "Mobile Platforms for Performing Operations along an Exterior of a Fuselage Assembly," Ser. No. 14/558,933; entitled "Mobile Platforms for Performing Operations inside a Fuselage Assembly," Ser. No. 14/559,073; entitled "Wheel Mounting System," Ser. No. 14/559,115; entitled "Dual-Interface Coupler," Ser. No. 14/559,153; entitled "Metrology-Based System for Operating a Flexible Manufacturing System," Ser. No. 14/559,855; entitled "Clamping Feet for an End Effector," Ser. No. 14/559,191; entitled "Towers for Accessing an Interior of a Fuselage Assembly," Ser. No. 14/559,234; entitled "Assembly Fixture for Supporting a Fuselage Assembly," Ser. No. 14/559,277; entitled "Utility Fixture for Creating a Distributed Utility Network," Ser. No. 14/559,371; and entitled "Two-Stage Riveting," Ser. No. 14/559,483, filed of even date herewith, each of which claims the benefit of U.S. Provisional Patent Application Ser. No. 62/022,641, filed Jul. 9, 2014 and entitled "Automated Flexible Manufacturing System for Building a Fuselage," each assigned to the same assignee, and each incorporated herein by reference in its entirety.

BACKGROUND INFORMATION

1. Field

The present disclosure relates generally to aircraft and, in particular, to building the fuselage of an aircraft. Still more particularly, the present disclosure relates to a method, apparatus, and system for building an assembly fixture and supporting a fuselage assembly using the assembly fixture while building the fuselage assembly.

2. Background

Building a fuselage may include assembling skin panels and a support structure for the fuselage. The skin panels and support structure may be joined together to form a fuselage assembly. For example, without limitation, the skin panels may have support members, such as frames and stringers, attached to the surface of the skin panels that will face the interior of the fuselage assembly. These support members may be used to form the support structure for the fuselage assembly. The skin panels may be positioned relative to each other and the support members may be tied together to form this support structure.

Fastening operations may then be performed to join the skin panels and the support members together to form the fuselage assembly. These fastening operations may include, for example, riveting operations, interference-fit bolting operations, other types of attachment operations, or some combination thereof. The fuselage assembly may need to be assembled in a manner that meets outer mold line (OML) requirements and inner mold line (IML) requirements for the fuselage assembly.

With some currently available methods for building a fuselage assembly, the fastening operations performed to assemble the skin panels and the support members together may be performed manually. For example, without limitation, a first human operator positioned at an exterior of the fuselage assembly and a second human operator positioned at an interior of the fuselage assembly may use handheld tools to perform these fastening operations. In some cases, this type of manual fastening process may be more labor-intensive, time-consuming, ergonomically challenging, or expensive than desired. Further, some current assembly methods used to build fuselages that involve manual fastening processes may not allow fuselages to be built in the desired assembly facilities or factories at desired assembly rates or desired assembly costs.

In some cases, the current assembly methods and systems used to build fuselages may require that these fuselages be built in facilities or factories specifically designated and permanently configured for building fuselages. These current assembly methods and systems may be unable to accommodate different types and shapes of fuselages. For example, without limitation, large and heavy equipment needed for building fuselages may be permanently affixed to a factory and configured for use solely with fuselages of a specific type.

Further, with some current assembly methods, supporting a fuselage during building of the fuselage may be more difficult than desired. With some current assembly systems, the structures used to support a fuselage during the building of the fuselage may be permanent fixtures and unable to be moved from one location to another location. Therefore, it would be desirable to have a method and apparatus that take into account at least some of the issues discussed above, as well as other possible issues.

SUMMARY

In one illustrative embodiment, a method for holding a panel for a fuselage assembly may be provided. The panel may be placed onto a cradle fixture having an adjustable retaining structure. The adjustable retaining structure may be engaged with the panel.

In another illustrative embodiment, a method for adjusting an adjustable retaining structure may be provided. The adjustable retaining structure may be rotated, passively, about a spherical interface as a panel applies a load to the adjustable retaining structure.

In yet another illustrative embodiment, a cradle fixture may comprise a base and an adjustable retaining structure associated with the base.

In still another illustrative embodiment, an assembly fixture may comprise a number of cradle fixtures. At least one of the number of cradle fixtures may comprise a number of retaining structures. At least one of the number of retaining structures may be an adjustable retaining structure capable of impinging on a panel for a fuselage assembly and passively aligning to the panel.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
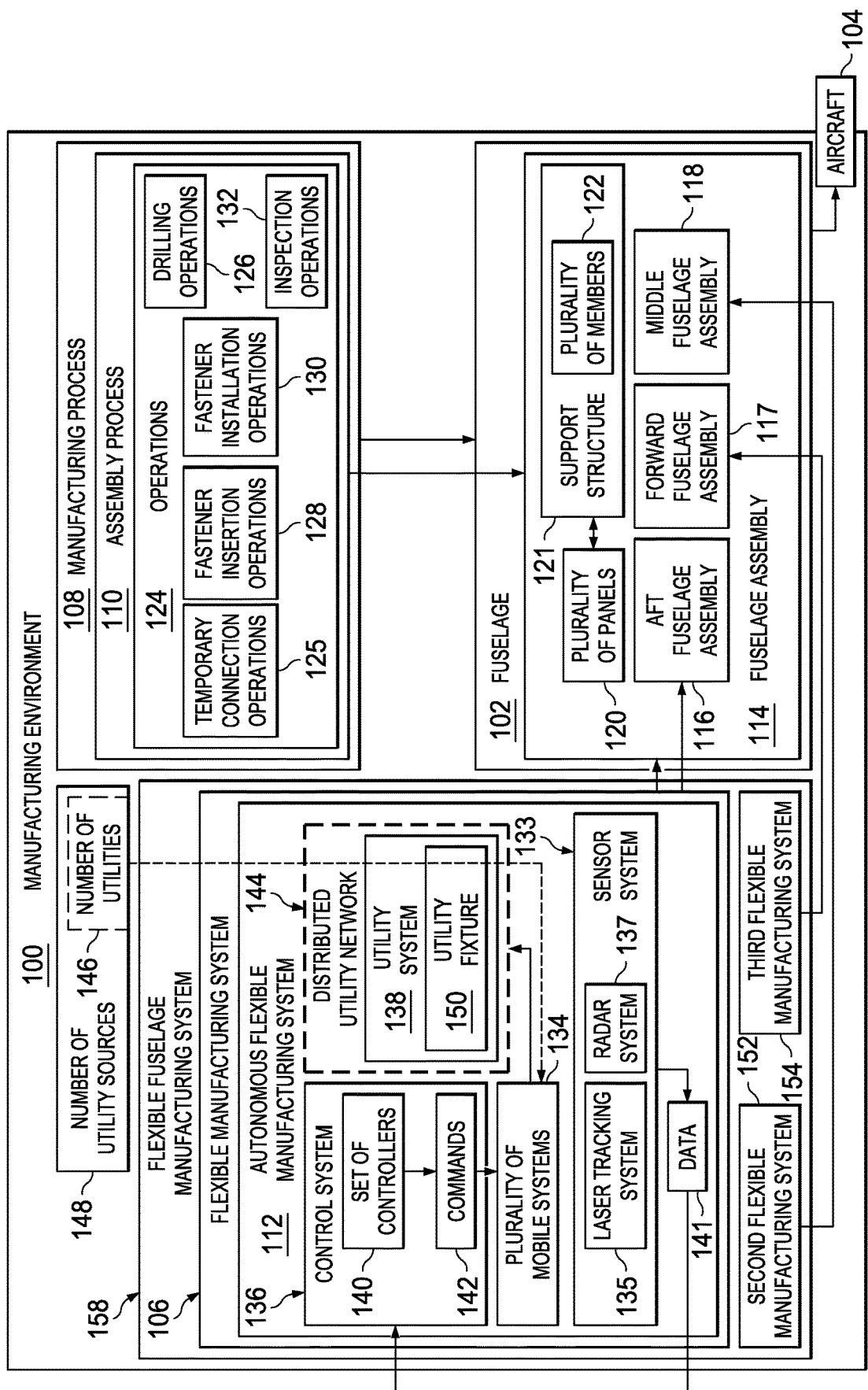
FIG. 1 is an illustration of a manufacturing environment in the form of a block diagram in accordance with an illustrative embodiment.

The illustrative embodiments recognize and take into account different considerations. For example, the illustrative embodiments recognize and take into account that it may be desirable to automate the process of building a fuselage assembly for an aircraft. Automating the process of building a fuselage assembly for an aircraft may improve build efficiency, improve build quality, and reduce costs associated with building the fuselage assembly. The illustrative embodiments also recognize and take into account that automating the process of building a fuselage assembly may improve the accuracy and precision with which assembly operations are performed, thereby ensuring improved compliance with outer mold line (OML) requirements and inner mold line (IML) requirements for the fuselage assembly.

Further, the illustrative embodiments recognize and take into account that automating the process used to build a fuselage assembly for an aircraft may significantly reduce the amount of time needed for the build cycle. For example, without limitation, automating fastening operations may reduce and, in some cases, eliminate, the need for human operators to perform these fastening operations as well as other types of assembly operations.

Further, this type of automation of the process for building a fuselage assembly for an aircraft may be less labor-intensive, time-consuming, ergonomically challenging, and expensive than performing this process primarily manually. Reduced manual labor may have a desired benefit for the human laborer. Additionally, automating the fuselage assembly process may allow fuselage assemblies to be built in desired assembly facilities and factories at desired assembly rates and desired assembly costs.

The illustrative embodiments also recognize and take into account that it may be desirable to use equipment that can be autonomously driven and operated to automate the process of building a fuselage assembly. In particular, it may be desirable to have an autonomous flexible manufacturing system comprised of mobile systems that may be autonomously driven across a factory floor, autonomously positioned relative to the factory floor as needed for building the fuselage assembly, autonomously operated to build the fuselage assembly, and then autonomously driven away when building of the fuselage assembly has been completed.

As used herein, performing any operation, action, or step autonomously may mean performing that operation substantially without any human input. For example, without limitation, a platform that may be autonomously driven is a platform that may be driven substantially independently of any human input. In this manner, an autonomously drivable platform may be a platform that is capable of driving or being driven substantially independently of human input.

Thus, the illustrative embodiments provide a method, apparatus, and system for building a fuselage assembly for an aircraft. In particular, the illustrative embodiments provide an autonomous flexible manufacturing system that automates most, if not all, of the process of building a fuselage assembly. For example, without limitation, the autonomous flexible manufacturing system may automate the process of installing fasteners to join fuselage skin panels and a fuselage support structure together to build the fuselage assembly.

However, the illustrative embodiments recognize and take into account that automating the process for building a fuselage assembly using an autonomous flexible manufacturing system may present unique technical challenges that require unique technical solutions. For example, the illustrative embodiments recognize and take into account that it may be desirable to provide utilities to all of the various systems within the autonomous flexible manufacturing system. In particular, it may be desirable to provide these utilities in a manner that will not disrupt or delay the process of building the fuselage assembly or restrict the movement of various mobile systems within the autonomous flexible manufacturing system over a factory floor.

For example, without limitation, it may be desirable to provide a set of utilities, such as power, communications, and air, to the autonomous flexible manufacturing system using an infrastructure that includes only a single direct connection to each of a set of utility sources providing the set of utilities. These direct connections may be above-ground, in-ground, or embedded. These direct connections may be established using, for example, without limitation, a utility fixture. Thus, the infrastructure may include a utility fixture that provides a direct connection to each of the set of utility sources and an assembly area with a floor space sufficiently large to allow the various systems of an autonomous flexible manufacturing system to be coupled to the utility fixture and each other in series. In this manner, the set of utilities may flow from the set of utility sources to the utility fixture and then downstream to the various systems of the autonomous flexible manufacturing system within the assembly area.

Thus, the illustrative embodiments provide a distributed utility network that may be used to provide utilities to the various systems of the autonomous flexible manufacturing system. The distributed utility network may provide these utilities in a manner that does not restrict or impede movement of the various mobile systems of the autonomous flexible manufacturing system. The different mobile systems of the autonomous flexible manufacturing system may be autonomously coupled to each other to create this distributed utility network.

Further, the illustrative embodiments recognize and take into account that it may be desirable to have an apparatus and method for supporting a fuselage assembly during building of the fuselage assembly in a manner that meets desired tolerances. In particular, it may be desirable to have a method and apparatus for supporting a fuselage assembly that allows the fuselage assembly to be built within selected tolerances of outer mold line requirements and inner mold line requirements for the fuselage assembly. Thus, the illustrative embodiments provide a cradle system that may be used to form an assembly fixture for supporting and holding a fuselage assembly.

Referring now to the figures and, in particular, with reference to FIGS. 1-6, illustrations of a manufacturing environment are depicted in the form of block diagrams in accordance with an illustrative embodiment. In particular, in FIGS. 1-6, a fuselage assembly, a flexible manufacturing system, the various systems within the flexible manufacturing system that may be used to build the fuselage assembly, and a distributed utility network are described.

Turning now to FIG. 1, an illustration of a manufacturing environment is depicted in the form of a block diagram in accordance with an illustrative embodiment. In this illustrative example, manufacturing environment 100 may be an example of one environment in which at least a portion of fuselage 102 may be manufactured for aircraft 104.

Manufacturing environment 100 may take a number of different forms. For example, without limitation, manufacturing environment 100 may take the form of a factory, a manufacturing facility, an outdoor factory area, an enclosed manufacturing area, an offshore platform, or some other type of manufacturing environment 100 suitable for building at least a portion of fuselage 102.

Fuselage 102 may be built using manufacturing process 108. Flexible manufacturing system 106 may be used to implement at least a portion of manufacturing process 108. In one illustrative example, manufacturing process 108 may be substantially automated using flexible manufacturing system 106. In other illustrative examples, only one or more stages of manufacturing process 108 may be substantially automated.

Flexible manufacturing system 106 may be configured to perform at least a portion of manufacturing process 108 autonomously. In this manner, flexible manufacturing system 106 may be referred to as autonomous flexible manufacturing system 112. In other illustrative examples, flexible manufacturing system 106 may be referred to as an automated flexible manufacturing system.

As depicted, manufacturing process 108 may include assembly process 110 for building fuselage assembly 114. Flexible manufacturing system 106 may be configured to perform at least a portion of assembly process 110 autonomously.

Fuselage assembly 114 may be fuselage 102 at any stage during manufacturing process 108 prior to the completion of manufacturing process 108. In some cases, fuselage assembly 114 may be used to refer to a partially assembled fuselage 102. Depending on the implementation, one or more other components may need to be attached to fuselage assembly 114 to fully complete the assembly of fuselage 102. In other cases, fuselage assembly 114 may be used to refer to the fully assembled fuselage 102. Flexible manufacturing system 106 may build fuselage assembly 114 up to the point needed to move fuselage assembly 114 to a next stage in the manufacturing process for building aircraft 104. In some cases, at least a portion of flexible manufacturing system 106 may be used at one or more later stages in the manufacturing process for building aircraft 104.

In one illustrative example, fuselage assembly 114 may be an assembly for forming a particular section of fuselage 102. As one example, fuselage assembly 114 may take the form of aft fuselage assembly 116 for forming an aft section of fuselage 102. In another example, fuselage assembly 114 may take the form of forward fuselage assembly 117 for forming a forward section of fuselage 102. In yet another example, fuselage assembly 114 may take the form of middle fuselage assembly 118 for forming a center section of fuselage 102 or some other middle section of fuselage 102 between the aft and forward sections of fuselage 102.

As depicted, fuselage assembly 114 may include plurality of panels 120 and support structure 121. Support structure 121 may be comprised of plurality of members 122. Plurality of members 122 may be used to both support plurality of panels 120 and connect plurality of panels 120 to each other. Support structure 121 may help provide strength, stiffness, and load support for fuselage assembly 114.

Plurality of members 122 may be associated with plurality of panels 120. As used herein, when one component or structure is "associated" with another component or structure, the association is a physical association in the depicted examples.

For example, a first component, such as one of plurality of members 122, may be considered to be associated with a second component, such as one of plurality of panels 120, by being at least one of secured to the second component, bonded to the second component, mounted to the second component, attached to the component, coupled to the component, welded to the second component, fastened to the second component, adhered to the second component, glued to the second component, or connected to the second component in some other suitable manner. The first component also may be connected to the second component using one or more other components. For example, the first component may be connected to the second component using a third component. Further, the first component may be considered to be associated with the second component by being formed as part of the second component, an extension of the second component, or both. In another example, the first component may be considered part of the second component by being co-cured with the second component.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" or "at least one of item A, item B, or item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In these illustrative examples, a member of plurality of members 122 may be associated with at least one of plurality of panels 120 in a number of different ways. For example, without limitation, a member of plurality of members 122 may be attached directly to a single panel, attached to two or more panels, attached to another member that is directly attached to at least one panel, attached to at least one member that is directly or indirectly attached to at least one panel, or associated with at least one of plurality of panels 120 in some other way.

In one illustrative example, substantially all or all of plurality of members 122 may be associated with plurality of panels 120 prior to the beginning of assembly process 110 for building fuselage assembly 114. For example, a corresponding portion of plurality of members 122 may be associated with each panel of plurality of panels 120 prior to plurality of panels 120 being joined to each other through assembly process 110.

In another illustrative example, only a first portion of plurality of members 122 may be associated with plurality of panels 120 prior to the beginning of assembly process 110. Assembly process 110 may include attaching a remaining portion of plurality of members 122 to plurality of panels 120 for at least one of providing support to plurality of panels 120 or connecting plurality of panels 120 together. The first portion of plurality of members 122 attached to plurality of panels 120 prior to assembly process 110 and the remaining portion of plurality of members 122 attached to plurality of panels 120 during assembly process 110 may together form support structure 121.

In yet another illustrative example, all of plurality of members 122 may be associated with plurality of panels 120 during assembly process 110. For example, each of plurality of panels 120 may be "naked" without any members attached to or otherwise associated with the panel prior to assembly process 110. During assembly process 110, plurality of members 122 may then be associated with plurality of panels 120.

In this manner, support structure 121 for fuselage assembly 114 may be built up in a number of different ways.

Fuselage assembly 114 comprising plurality of panels 120 and support structure 121 is described in greater detail in FIG. 2 below.

Building fuselage assembly 114 may include joining plurality of panels 120 together. Joining plurality of panels 120 may be performed in a number of different ways. Depending on the implementation, joining plurality of panels 120 together may include joining one or more of plurality of members 122 to one or more of plurality of panels 120 or to other members of plurality of members 122.

In particular, joining plurality of panels 120 may include joining at least one panel to at least one other panel, joining at least one member to at least one other member, or joining at least one member to at least one panel, or some combination thereof. As one illustrative example, joining a first panel and a second panel together may include at least one of the following: fastening the first panel directly to the second panel, joining a first member associated with the first panel to a second member associated with the second panel, joining a member associated with the first panel directly to the second panel, joining one member associated with both the first panel and the second panel to another member, joining a selected member to both the first panel and the second panel, or some other type of joining operation.

Assembly process 110 may include operations 124 that may be performed to join plurality of panels 120 together to build fuselage assembly 114. In this illustrative example, flexible manufacturing system 106 may be used to perform at least a portion of operations 124 autonomously.

Operations 124 may include, for example, but are not limited to, temporary connection operations 125, drilling operations 126, fastener insertion operations 128, fastener installation operations 130, inspection operations 132, other types of assembly operations, or some combination thereof. Temporary connection operations 125 may be performed to temporarily connect plurality of panels 120 together. For example, without limitation, temporary connection operations 125 may include temporarily tacking plurality of panels 120 together using tack fasteners.

Drilling operations 126 may include drilling holes through one or more of plurality of panels 120 and, in some cases, through one or more of plurality of members 122. Fastener insertion operations 128 may include inserting fasteners into the holes drilled by drilling operations 126.

Fastener installation operations 130 may include fully installing each of the fasteners that have been inserted into the holes. Fastener installation operations 130 may include, for example, without limitation, riveting operations, interference-fit bolting operations, other types of fastener installation operations, or some combination thereof. Inspection operations 132 may include inspecting the fully installed fasteners. Depending on the implementation, flexible manufacturing system 106 may be used to perform any number of these different types of operations 124 substantially autonomously.

As depicted, flexible manufacturing system 106 may include plurality of mobile systems 134, control system 136, and utility system 138. Each of plurality of mobile systems 134 may be a drivable mobile system. In some cases, each of plurality of mobile systems 134 may be an autonomously drivable mobile system. For example, without limitation, each of plurality of mobile systems 134 may include one or more components that may be autonomously driven within manufacturing environment 100 from one location to another location. Plurality of mobile systems 134 are described in greater detail in FIG. 3 below.

In this illustrative example, control system 136 may be used to control the operation of flexible manufacturing system 106. For example, without limitation, control system 136 may be used to control plurality of mobile systems 134. In particular, control system 136 may be used to direct the movement of each of plurality of mobile systems 134 within manufacturing environment 100. Control system 136 may be at least partially associated with plurality of mobile systems 134.

In one illustrative example, control system 136 may include set of controllers 140. As used herein, a "set of" items may include one or more items. In this manner, set of controllers 140 may include one or more controllers.

Each of set of controllers 140 may be implemented using hardware, firmware, software, or some combination thereof. In one illustrative example, set of controllers 140 may be associated with plurality of mobile systems 134. For example, without limitation, one or more of set of controllers 140 may be implemented as part of plurality of mobile systems 134. In other examples, one or more of set of controllers 140 may be implemented independently of plurality of mobile systems 134.

Set of controllers 140 may generate commands 142 to control the operation of plurality of mobile systems 134 of flexible manufacturing system 106. Set of controllers 140 may communicate with plurality of mobile systems 134 using at least one of a wireless communications link, a wired communications link, an optical communications link, or other type of communications link. In this manner, any number of different types of communications links may be used for communication with and between set of controllers 140.

In these illustrative examples, control system 136 may control the operation of plurality of mobile systems 134 using data 141 received from sensor system 133. Sensor system 133 may be comprised of any number of individual sensor systems, sensor devices, controllers, other types of components, or combination thereof. In one illustrative example, sensor system 133 may include laser tracking system 135 and radar system 137. Laser tracking system 135 may be comprised of any number of laser tracking devices, laser targets, or combination thereof. Radar system 137 may be comprised of any number of radar sensors, radar targets, or combination thereof.

Sensor system 133 may be used to coordinate the movement and operation of the various mobile systems in plurality of mobile systems 134 within manufacturing environment 100. As one illustrative example, radar system 137 may be used for macro-positioning mobile systems, systems within mobile systems, components within mobile systems, or some combination thereof. Further, laser tracking system 135 may be used for micro-positioning mobile systems, systems within mobile systems, components within mobile systems, or some combination thereof.

Plurality of mobile systems 134 may be used to form distributed utility network 144. Depending on the implementation, one or more of plurality of mobile systems 134 may form distributed utility network 144. Number of utilities 146 may flow from number of utility sources 148 to the various mobile systems of plurality of mobile systems 134 that make up distributed utility network 144.

In this illustrative example, each of number of utility sources 148 may be located with manufacturing environment 100. In other illustrative examples, one or more of number of utility sources 148 may be located outside of manufacturing environment 100. The corresponding utility provided by these one or more utility sources may then be carried into manufacturing environment 100 using, for example, without limitation, one or more utility cables.

In one illustrative example, distributed utility network 144 may allow number of utilities 146 to flow directly from number of utility sources 148 to one mobile system in plurality of mobile systems 134 over some number of utility cables. This one mobile system may then distribute number of utilities 146 to other mobile systems of plurality of mobile systems 134 such that these other mobile systems do not need to directly receive number of utilities 146 from number of utility sources 148.

As depicted, distributed utility network 144 may be formed using utility system 138. Utility system 138 may include utility fixture 150. Utility system 138 may be configured to connect to number of utility sources 148 such that number of utilities 146 may flow from number of utility sources 148 to utility fixture 150. Utility fixture 150 may be above-ground or in-ground, depending on the implementation. For example, without limitation, utility fixture 150 may be embedded in a floor within manufacturing environment 100.

Utility fixture 150 may then distribute number of utilities 146 to one or more of plurality of mobile systems 134. In particular, one autonomous coupling of one of plurality of mobile systems 134 to utility fixture 150 may be followed by any number of autonomous couplings of mobile systems to each other in series to form distributed utility network 144. Utility fixture 150 may distribute number of utilities 146 to each of plurality of mobile systems 134 downstream of utility fixture 150 in the series of autonomous couplings of the mobile systems.

Depending on the implementation, distributed utility network 144 may have a chain-like configuration or a tree-like configuration. In one illustrative example, plurality of mobile systems 134 may include mobile systems A, B, C, and D (not shown in figure) with mobile system A autonomously coupled to utility fixture 150 and mobile systems B, C, and D autonomously coupled to mobile system A and each other in series. An example of a chain-like configuration for distributed utility network 144 may include number of utilities 146 flowing from number of utility sources 148 over some number of utility cables to utility fixture 150, from utility fixture 150 to mobile system A, from mobile system A to mobile system B, from mobile system B to mobile system C, and from mobile system C to mobile system D. An example of a tree-like configuration for distributed utility network 144 may include number of utilities 146 flowing from number of utility sources 148 over some number of utility cables to utility fixture 150, from utility fixture 150 to mobile system A, from mobile system A to both mobile system B and mobile system C, and from mobile system C to mobile system D. An example of one manner in which distributed utility network 144 may be implemented using plurality of mobile systems 134 is described in greater detail in FIG. 5 below.

In some illustrative examples, multiple flexible manufacturing systems may be used to build multiple fuselage assemblies concurrently. For example, flexible manufacturing system 106 may be a first flexible manufacturing system of many flexible manufacturing systems.

In one illustrative example, flexible manufacturing system 106, second flexible manufacturing system 152, and third flexible manufacturing system 154 may be used to build aft fuselage assembly 116, middle fuselage assembly 118, and forward fuselage assembly 117, respectively. Aft fuselage assembly 116, middle fuselage assembly 118, and forward fuselage assembly 117 may then be joined together to form a fully assembled fuselage 102. In this manner, in this example, flexible manufacturing system 106, second flexible manufacturing system 152, and third flexible manufacturing system 154 may together form flexible fuselage manufacturing system 158.

Thus, any number of fuselage assemblies, such as fuselage assembly 114, may be built within manufacturing environment 100 using any number of flexible manufacturing systems implemented in a manner similar to flexible manufacturing system 106. Similarly, any number of full fuselages, such as fuselage 102, may be built within manufacturing environment 100 using any number of flexible fuselage manufacturing systems implemented in a manner similar to flexible fuselage manufacturing system 158.

Figure 2:
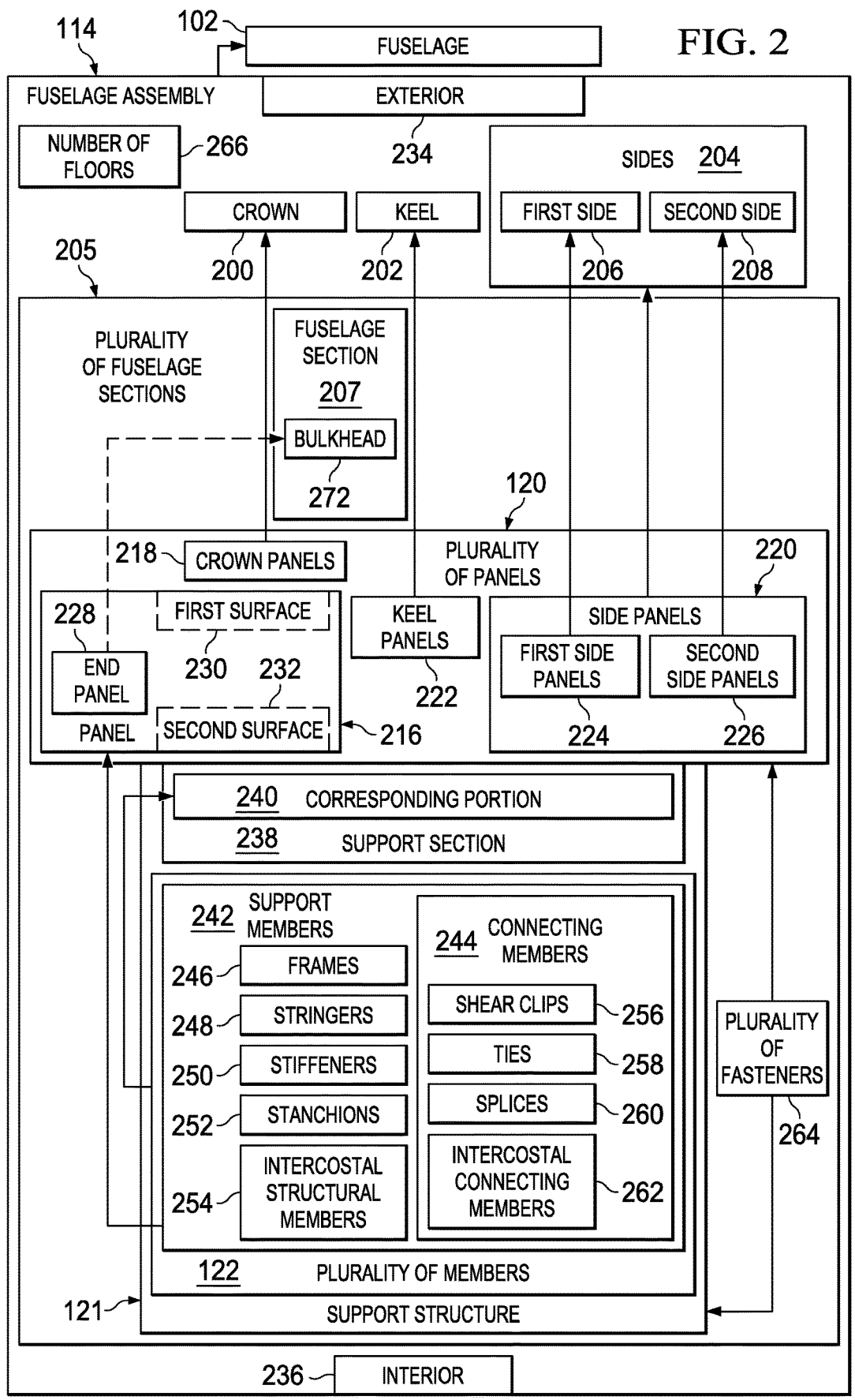
FIG. 2 is an illustration of a fuselage assembly in the form of a block diagram in accordance with an illustrative embodiment.

With reference now to FIG. 2, an illustration of fuselage assembly 114 from FIG. 1 is depicted in the form of a block diagram in accordance with an illustrative embodiment. As described above, fuselage assembly 114 may include plurality of panels 120 and support structure 121. Fuselage assembly 114 may be used to refer to any stage in the building of fuselage assembly 114. For example, fuselage assembly 114 may be used to refer to a single one of plurality of panels 120, multiple ones of plurality of panels 120 that have been or are being joined together, a partially built fuselage assembly, or a fully built fuselage assembly.

As depicted, fuselage assembly 114 may be built such that fuselage assembly 114 has plurality of fuselage sections 205. Each of plurality of fuselage sections 205 may include one or more of plurality of panels 120. In this illustrative example, each of plurality of fuselage sections 205 may take the form of a cylindrically-shaped fuselage section, a barrel-shaped fuselage section, a tapered cylindrical fuselage section, a cone-shaped fuselage section, a dome-shaped fuselage section, or a section having some other type of shape. Depending on the implementation, a fuselage section of plurality of fuselage sections 205 may have a shape that has a substantially circular cross-sectional shape, elliptical cross-sectional shape, oval cross-sectional shape, polygon with rounded corners cross-sectional shape, or otherwise closed-curve cross-sectional shape.

As one specific illustrative example, each of plurality of fuselage sections 205 may be a portion of fuselage assembly 114 defined between two radial cross-sections of fuselage assembly 114 that are taken substantially perpendicular to a center axis or longitudinal axis through fuselage assembly 114. In this manner, plurality of fuselage sections 205 may be arranged along the longitudinal axis of fuselage assembly 114. In other words, plurality of fuselage sections 205 may be arranged longitudinally.

Fuselage section 207 may be an example of one of plurality of fuselage sections 205. Fuselage section 207 may be comprised of one or more of plurality of panels 120. In one illustrative example, multiple panel sections may be arranged circumferentially around fuselage section 207 to form the skin of fuselage section 207. In some cases, multiple rows of two or more longitudinally adjacent panels may be arranged circumferentially around fuselage section 207 to form the skin of fuselage section 207.

In one illustrative example, fuselage assembly 114 may have crown 200, keel 202, and sides 204. Sides 204 may include first side 206 and second side 208.

Crown 200 may be the top portion of fuselage assembly 114. Keel 202 may be the bottom portion of fuselage assembly 114. Sides 204 of fuselage assembly 114 may be the portions of fuselage assembly 114 between crown 200 and keel 202. In one illustrative example, each of crown 200, keel 202, first side 206, and second side 208 of fuselage assembly 114 may be formed by at least a portion of at least one of plurality of panels 120. Further, a portion of each of plurality of fuselage sections 205 may form each of crown 200, keel 202, first side 206, and second side 208.

Panel 216 may be an example of one of plurality of panels 120. Panel 216 may also be referred to as a skin panel, a fuselage panel, or a fuselage skin panel, depending on the implementation. In some illustrative examples, panel 216 may take the form of a mega-panel comprised of multiple smaller panels, which may be referred to as sub-panels. A mega-panel may also be referred to as a super panel. In these illustrative examples, panel 216 may be comprised of at least one of a metal, a metal alloy, some other type of metallic material, a composite material, or some other type of material. As one illustrative example, panel 216 may be comprised of an aluminum alloy, steel, titanium, a ceramic material, a composite material, some other type of material, or some combination thereof.

When used to form keel 202 of fuselage assembly 114, panel 216 may be referred to as a keel panel or a bottom panel. When used to form one of sides 204 of fuselage assembly 114, panel 216 may be referred to as a side panel. When used to form crown 200 of fuselage assembly 114, panel 216 may be referred to as a crown panel or a top panel. As one illustrative example, plurality of panels 120 may include crown panels 218 for forming crown 200, side panels 220 for forming sides 204, and keel panels 222 for forming keel 202. Side panels 220 may include first side panels 224 for forming first side 206 and second side panels 226 for forming second side 208.

In one illustrative example, fuselage section 207 of plurality of fuselage sections 205 of fuselage assembly 114 may include one of crown panels 218, two of side panels 220, and one of keel panels 222. In another illustrative example, fuselage section 207 may form an end of fuselage assembly 114.

In some cases, fuselage section 207 may be comprised solely of a single panel, such as panel 216. For example, without limitation, panel 216 may take the form of end panel 228.

End panel 228 may be used to form one end of fuselage assembly 114. For example, when fuselage assembly 114 takes the form of aft fuselage assembly 116 in FIG. 1, end panel 228 may form the aftmost end of fuselage assembly 114. When fuselage assembly 114 takes the form of forward fuselage assembly 117 in FIG. 1, end panel 228 may form the forwardmost end of fuselage assembly 114.

In one illustrative example, end panel 228 may take the form of a cylindrically-shaped panel, a cone-shaped panel, a barrel-shaped panel, or a tapered cylindrical panel. For example, end panel 228 may be a single cylindrically-shaped panel having a substantially circular cross-sectional shape that may change in diameter with respect to a center axis for fuselage assembly 114.

In this manner, as described above, fuselage section 207 may be comprised solely of end panel 228. In some illustrative examples, fuselage section 207 may be an end fuselage section that is comprised of only a single panel, which may be end panel 228. In some cases, bulkhead 272 may be associated with end panel 228 when fuselage section 207 is an end fuselage section. Bulkhead 272, which may also be referred to as a pressure bulkhead, may be considered separate from or part of end panel 228, depending on the implementation. Bulkhead 272 may have a dome-type shape in these illustrative examples.

When fuselage assembly 114 takes the form of aft fuselage assembly 116 in FIG. 1, bulkhead 272 may be part of fuselage section 207 located at the aftmost end of aft fuselage assembly 116. When fuselage assembly 114 takes the form of forward fuselage assembly 117 in FIG. 1, bulkhead 272 may be part of fuselage section 207 located at forwardmost end of aft fuselage assembly 116. Middle fuselage assembly 118 in FIG. 1 may not include a bulkhead, such as bulkhead 272, at either end of middle fuselage assembly 118. In this manner, plurality of fuselage sections 205 may be implemented in any number of different ways.

Panel 216 may have first surface 230 and second surface 232. First surface 230 may be configured for use as an exterior-facing surface. In other words, first surface 230 may be used to form exterior 234 of fuselage assembly 114. Second surface 232 may be configured for use as an interior-facing surface. In other words, second surface 232 may be used to form interior 236 of fuselage assembly 114. Each of plurality of panels 120 may be implemented in a manner similar to panel 216.

As described earlier, support structure 121 may be associated with a corresponding one of plurality of panels 120. Support structure 121 may be comprised of plurality of members 122 that are associated with panel 216. In one illustrative example, corresponding portion 240 may be the portion of plurality of members 122 that correspond to panel 216. Corresponding portion 240 may form support section 238 corresponding to panel 216. Support section 238 may form a part of support structure 121.

Plurality of members 122 may include support members 242. Support members 242 may include, for example, without limitation, at least one of connecting members 244, frames 246, stringers 248, stiffeners 250, stanchions 252, intercostal structural members 254, or other types of structural members.

Connecting members 244 may connect other types of support members 242 together. In some cases, connecting members 244 may also connect support members 242 to plurality of panels 120. Connecting members 244 may include, for example, without limitation, shear clips 256, ties 258, splices 260, intercostal connecting members 262, other types of mechanical connecting members, or some combination thereof.

In one illustrative example, when panel 216 is comprised of multiple sub-panels, connecting members 244 may be used to, for example, without limitation, connect together complementary frames of frames 246 running in the hoopwise direction on adjacent sub-panels and complementary stringers of stringers 248 running in the longitudinal direction on adjacent sub-panels. In other illustrative examples, connecting members 244 may be used to connect together complementary frames, stringers, or other types of support members on two or more adjacent panels in plurality of panels 120. In some cases, connecting members 244 may be used to connect together complementary support members on two or more adjacent fuselage sections.

Operations 124, as described in FIG. 1, may be performed to join plurality of panels 120 together to build fuselage assembly 114. In one illustrative example, plurality of fasteners 264 may be used to join plurality of panels 120 together.

As described above, joining plurality of panels 120 together may be performed in a number of different ways. Joining plurality of panels 120 together may include at least one of joining at least one panel in plurality of panels 120 to another one of plurality of panels 120, joining at least one panel in plurality of panels 120 to at least one of plurality of members 122, joining at least one member in plurality of members 122 to another one of plurality of members 122, or some other type of joining operation. Plurality of panels 120 may be joined together such that plurality of members 122 ultimately form support structure 121 for fuselage assembly 114.

As depicted, number of floors 266 may be associated with fuselage assembly 114. In this illustrative example, number of floors 266 may be part of fuselage assembly 114. Number of floors 266 may include, for example, without limitation, at least one of a passenger floor, a cargo floor, or some other type of floor.

Figure 3:
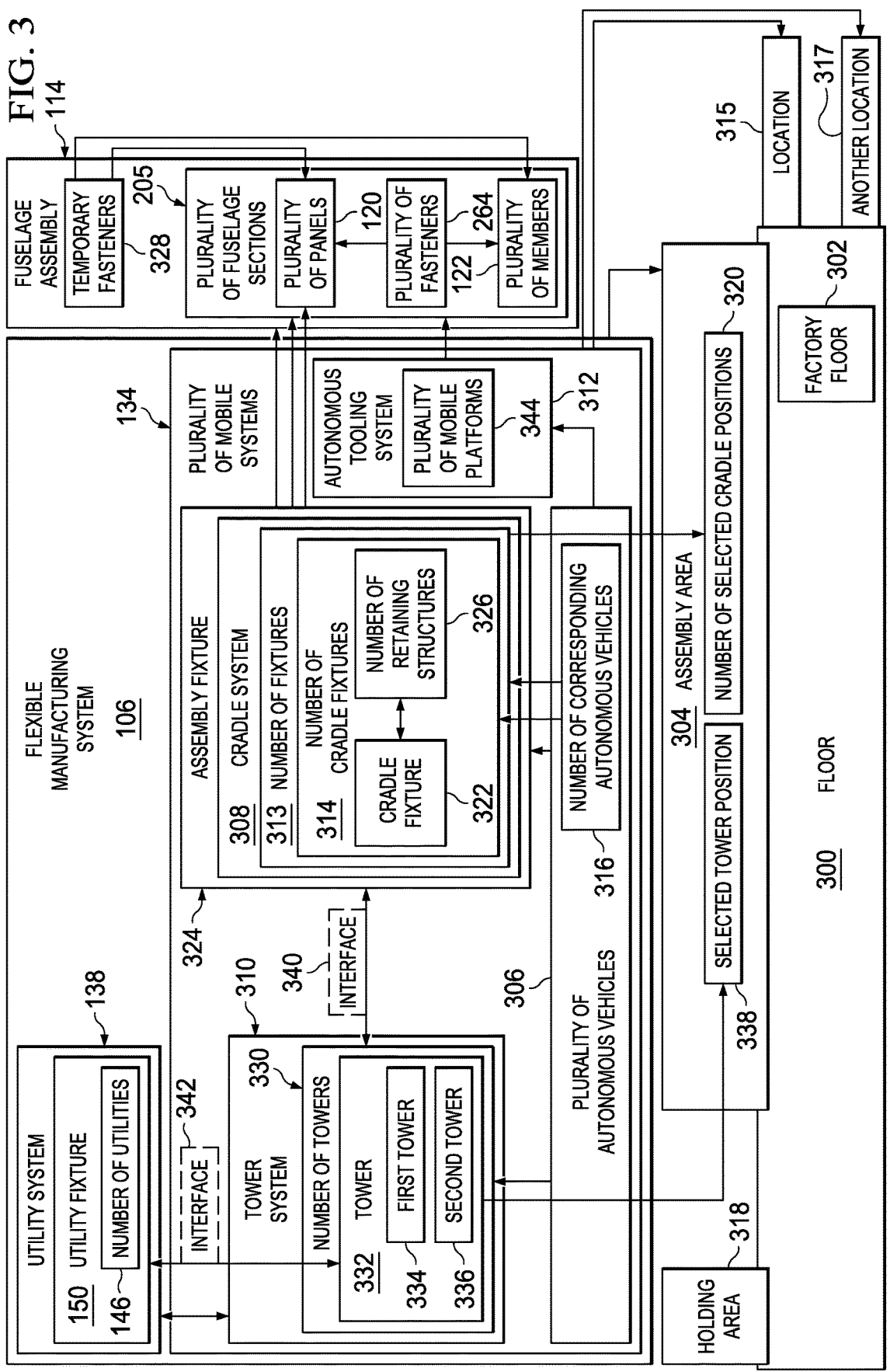
FIG. 3 is an illustration of a plurality of mobile systems of a flexible manufacturing system within a manufacturing environment in the form of a block diagram in accordance with an illustrative embodiment.

With reference now to FIG. 3, an illustration of plurality of mobile systems 134 of flexible manufacturing system 106 within manufacturing environment 100 from FIG. 1 is depicted in the form of a block diagram in accordance with an illustrative embodiment. As depicted, flexible manufacturing system 106 may be used to build fuselage assembly 114 on floor 300 of manufacturing environment 100. When manufacturing environment 100 takes the form of a factory, floor 300 may be referred to as factory floor 302.

In one illustrative example, floor 300 may be substantially smooth and substantially planar. For example, floor 300 may be substantially level. In other illustrative examples, one or more portions of floor 300 may be sloped, ramped, or otherwise uneven.

Assembly area 304 may be an area within manufacturing environment 100 designated for performing assembly process 110 in FIG. 1 to build a fuselage assembly, such as fuselage assembly 114. Assembly area 304 may also be referred to as a cell or a work cell. In this illustrative example, assembly area 304 may be a designated area on floor 300. However, in other illustrative examples, assembly area 304 may include a designated area on floor 300 as well as the area above this designated area. Any number of assembly areas may be present within manufacturing environment 100 such that any number of fuselage assemblies may be built concurrently within manufacturing environment 100.

As depicted, plurality of mobile systems 134 may include plurality of autonomous vehicles 306, cradle system 308, tower system 310, and autonomous tooling system 312. Each of plurality of mobile systems 134 may be drivable across floor 300. In other words, each of plurality of mobile systems 134 may be capable of being autonomously driven across floor 300 from one location 315 to another location 317 on floor 300.

In one illustrative example, each of plurality of autonomous vehicles 306 may take the form of an automated guided vehicle (AGV), which may be capable of operating independently without human direction or guidance. In some cases, plurality of autonomous vehicles 306 may be referred to as a plurality of automated guided vehicles (AGVs).

In this illustrative example, cradle system 308 may be used to support and hold fuselage assembly 114 during assembly process 110 in FIG. 1. In some cases, cradle system 308 may be referred to as a drivable cradle system. In still other cases, cradle system 308 may be referred to as an autonomously drivable cradle system.

Cradle system 308 may include number of fixtures 313. As used herein, a "number of" items may include one or more items. In this manner, number of fixtures 313 may include one or more fixtures. In some illustrative examples, number of fixtures 313 may be referred to as a number of drivable fixtures. In other illustrative examples, number of fixtures 313 may be referred to as a number of autonomously drivable fixtures.

Number of fixtures 313 may include number of cradle fixtures 314. In some illustrative examples, number of cradle fixtures 314 may be referred to as a number of drivable cradle fixtures. In other illustrative examples, number of cradle fixtures 314 may be referred to as a number of autonomously drivable cradle fixtures. Cradle fixture 322 may be an example of one of number of cradle fixtures 314.

Number of retaining structures 326 may be associated with each of number of cradle fixtures 314. Number of retaining structures 326 associated with each of number of cradle fixtures 314 may be engaged with and used to support fuselage assembly 114. For example, number of retaining structures 326 associated with cradle fixture 322 may be engaged with and used to support one or more of plurality of panels 120.

Number of cradle fixtures 314 may be autonomously driven across floor 300 of manufacturing environment 100 to assembly area 304. In one illustrative example, each of number of cradle fixtures 314 may be autonomously driven across floor 300 using a corresponding one of plurality of autonomous vehicles 306. In other words, without limitation, number of corresponding autonomous vehicles 316 in plurality of autonomous vehicles 306 may be used to drive number of cradle fixtures 314 across floor 300 into assembly area 304.

In this illustrative example, number of corresponding autonomous vehicles 316 may drive from, for example, without limitation, holding area 318, across floor 300, to assembly area 304. Holding area 318 may be an area in which at least one of plurality of autonomous vehicles 306, cradle system 308, tower system 310, autonomous tooling system 312, or control system 136 from FIG. 1 may be held when flexible manufacturing system 106 is not in use or when that particular device or system is not in use.

Holding area 318 may be referred to as a home area, a storage area, or a base area, depending on the implementation. Although holding area 318 is depicted as being located within manufacturing environment 100, holding area 318 may be located in some other area or environment outside of manufacturing environment 100 in other illustrative examples.

Number of corresponding autonomous vehicles 316 in plurality of autonomous vehicles 306 may drive number of cradle fixtures 314 into number of selected cradle positions 320. As used herein, a "position" may be comprised of a location, an orientation, or both. The location may be in two-dimensional coordinates or three-dimensional coordinates with respect to a reference coordinate system. The orientation may be a two-dimensional or three-dimensional orientation with respect to a reference coordinate system. This reference coordinate system may be, for example, without limitation, a fuselage coordinate system, an aircraft coordinate system, a coordinate system for manufacturing environment 100, or some other type of coordinate system.

When number of cradle fixtures 314 includes more than one cradle fixture such that number of selected cradle positions 320 includes more than one cradle position, these cradle positions may be positions selected relative to each other. In this manner, number of cradle fixtures 314 may be positioned such that number of cradle fixtures 314 are in number of selected cradle positions 320 relative to each other.

In these illustrative examples, number of corresponding autonomous vehicles 316 may be used to drive number of cradle fixtures 314 into number of selected cradle positions 320 within assembly area 304. "Driving" a component or a system across floor 300 may mean, for example, but not limited to, moving substantially the entirety of that component or system from one location to another location. For example, without limitation, driving cradle fixture 322 across floor 300 may mean moving the entirety of cradle fixture 322 from one location to another location. In other words, all or substantially all components that comprise cradle fixture 322 may be simultaneously moved together from one location to another location.

Once number of cradle fixtures 314 has been driven into number of selected cradle positions 320 in assembly area 304, number of cradle fixtures 314 may be coupled to each other and to tower system 310. Number of corresponding autonomous vehicles 316 may then drive away from number of cradle fixtures 314 to, for example, without limitation, holding area 318, once number of cradle fixtures 314 is positioned in number of selected cradle positions 320 within selected tolerances. In other illustrative examples, number of corresponding autonomous vehicles 316 may be comprised of a single autonomous vehicle that is used to drive each of number of cradle fixtures 314 into a corresponding selected position in number of selected cradle positions 320 within assembly area 304 one at a time.

In assembly area 304, number of cradle fixtures 314 may be configured to form assembly fixture 324. Assembly fixture 324 may be formed when the different cradle fixtures in number of cradle fixtures 314 have been placed in number of selected cradle positions 320 relative to each other. In some cases, assembly fixture 324 may be formed when number of cradle fixtures 314 have been coupled to each other while number of cradle fixtures 314 is in number of selected cradle positions 320 and when number of retaining structures 326 associated with each of number of cradle fixtures 314 has been adjusted to receive fuselage assembly 114.

In this manner, number of cradle fixtures 314 may form a single fixture entity, such as assembly fixture 324. Assembly fixture 324 may be used to support and hold fuselage assembly 114. In some cases, assembly fixture 324 may be referred to as an assembly fixture system or a fixture system. In some cases, assembly fixture 324 may be referred to as a drivable assembly fixture. In other cases, assembly fixture 324 may be referred to as an autonomously drivable assembly fixture.

Once assembly fixture 324 has been formed, number of cradle fixtures 314 may receive fuselage assembly 114. In other words, plurality of fuselage sections 205 may be engaged with number of cradle fixtures 314. In particular, plurality of fuselage sections 205 may be engaged with number of retaining structures 326 associated with each of number of cradle fixtures 314. Plurality of fuselage sections 205 may be engaged with number of cradle fixtures 314 in any number of ways.

When number of cradle fixtures 314 includes a single cradle fixture, that cradle fixture may be used to support and hold substantially the entire fuselage assembly 114. When number of cradle fixtures 314 includes multiple cradle fixtures, each of these cradle fixtures may be used to support and hold at least one corresponding fuselage section of plurality of fuselage sections 205.

In one illustrative example, each of plurality of fuselage sections 205 may be engaged with number of cradle fixtures 314 one at a time. For example, without limitation, all of the panels for a particular fuselage section in plurality of fuselage sections 205 may be positioned relative to each other and a corresponding cradle fixture in number of cradle fixtures 314 and then engaged with the corresponding cradle fixture. The remaining fuselage sections in plurality of fuselage sections 205 may then be formed and engaged with number of cradle fixtures 314 in a similar manner. In this manner, plurality of panels 120 may be engaged with number of cradle fixtures 314 by engaging at least a portion of plurality of panels 120 with number of retaining structures 326 associated with each of number of cradle fixtures 314 that makes up assembly fixture 324 such that plurality of panels 120 is supported by number of cradle fixtures 314.

As described in FIG. 2, plurality of panels 120 may include keel panels 222, side panels 220, and crown panels 218. In one illustrative example, all of keel panels 222 in FIG. 2 used to form keel 202 of fuselage assembly 114 in FIG. 2 may first be positioned relative to and engaged with number of cradle fixtures 314. Next, all of side panels 220 in FIG. 2 used to form sides 204 of fuselage assembly 114 in FIG. 2 may be positioned relative to and engaged with keel panels 222. Then, all of crown panels 218 in FIG. 2 used to form crown 200 of fuselage assembly 114 in FIG. 2 may be positioned relative to and engaged with side panels 220. In this manner, plurality of fuselage sections 205 may be concurrently assembled to form fuselage assembly 114.

In one illustrative example, each panel in plurality of panels 120 may have a corresponding portion of plurality of members 122 fully formed and associated with the panel prior to the panel being engaged with one of number of cradle fixtures 314. This corresponding portion of plurality of members 122 may be referred to as a support section. For example, support section 238 in FIG. 2 may be fully formed and associated with panel 216 in FIG. 2 prior to panel 216 being engaged with one of number of cradle fixtures 314 or another panel of plurality of panels 120 in FIG. 2. In other words, a corresponding portion of support members 242 in FIG. 2 may already be attached to panel 216 and a corresponding portion of connecting members 244 in FIG. 2 already installed to connect this portion of support members 242 to each other prior to panel 216 from FIG. 2 being engaged with one of number of cradle fixtures 314.

In other illustrative examples, plurality of members 122 may be associated with plurality of panels 120 after plurality of panels 120 have been engaged with each other and number of cradle fixtures 314. In still other illustrative examples, only a portion of plurality of members 122 may be associated with plurality of panels 120 prior to plurality of panels 120 being engaged with each other and number of cradle fixtures 314 and then a remaining portion of plurality of members 122 associated with plurality of panels 120 once plurality of panels 120 have been engaged with each other and number of cradle fixtures 314.

In some illustrative examples, one or more of support members 242 in FIG. 2, one or more of connecting members 244 in FIG. 2, or both may not be associated with panel 216 when panel 216 from FIG. 2 is engaged with one of number of cradle fixtures 314 or with one of the other panels in plurality of panels 120. For example, without limitation, frames 246 described in FIG. 2 may be added to panel 216 from FIG. 2 after panel 216 has been engaged with cradle fixture 322. In another example, stiffeners 250 described in FIG. 2 may be added to panel 216 from FIG. 2 after panel 216 has been engaged with cradle fixture 322.

Building fuselage assembly 114 may include engaging plurality of panels 120 with each other as plurality of panels 120 are built up on number of cradle fixtures 314 of assembly fixture 324. For example, adjacent panels in plurality of panels 120 may be connected by connecting at least a portion of the support members associated with the panels. Depending on the implementation, at least one of lap splices, butt splices, or other types of splices may be used to connect the adjacent panels in addition to or in place of connecting the corresponding support members of the adjacent panels.

As one illustrative example, the support members associated with two adjacent panels in plurality of panels 120 may be connected together using connecting members, thereby connecting the two adjacent panels. The two support members associated with these two adjacent panels may be, for example, without limitation, spliced, tied, clipped, tacked, pinned, joined, or fastened together in some other manner. When the two adjacent panels are hoop-wise adjacent, complementary frames may be connected in the hoop-wise direction. When the two adjacent panels are longitudinally adjacent, complementary stringers may be connected in the longitudinal direction.

In some cases, connecting complementary stringers, frames, or other support members on these two adjacent panels may be part of splicing these panels together. Adjacent panels may be connected together using any number of panel splices, stringer splices, frame splices, or other types of splices.

In one illustrative example, plurality of panels 120 may be temporarily connected to each other by temporarily fastening at least one of plurality of panels 120 or plurality of members 122 together using temporary fasteners or permanent fasteners. For example, without limitation, temporary clamps may be used to temporarily connect and hold in place two of plurality of panels 120 together. Temporarily connecting plurality of panels 120 together may be performed by at least one of temporarily connecting at least two plurality of panels 120 together, temporarily connecting at least two plurality of members 122 together, or temporarily connecting at least one of plurality of panels 120 to at least one of plurality of members 122 such that plurality of members 122 associated with plurality of panels 120 forms support structure 121 in FIG. 2 for fuselage assembly 114.

As one illustrative example, plurality of panels 120 may be temporarily tacked or pinned together using temporary fasteners 328 until plurality of fasteners 264 are installed to join plurality of panels 120 together to form fuselage assembly 114. Temporarily connecting plurality of panels 120 may temporarily connect together plurality of fuselage sections 205 from FIG. 2 formed by plurality of panels 120. Once plurality of fasteners 264 have been installed, temporary fasteners 328 may then be removed.

In this manner, plurality of panels 120 may be connected together in a number of different ways. Once plurality of panels 120 have been connected together, plurality of members 122 may be considered as forming support structure 121 for fuselage assembly 114. Connecting plurality of panels 120 together and forming support structure 121 may maintain desired compliance with outer mold line requirements and inner mold line requirements for fuselage assembly 114. In other words, plurality of panels 120 may be held together in place relative to each other such that fuselage assembly 114 formed using plurality of panels 120 meets outer mold line requirements and inner mold line requirements for fuselage assembly 114 within selected tolerances.

In particular, assembly fixture 324 may support plurality of panels 120 and support structure 121 associated with plurality of panels 120 such that fuselage assembly 114 built using plurality of panels 120 and support structure 121 has a shape and a configuration that is within selected tolerances. In this manner, this shape and configuration may be maintained within selected tolerances while supporting plurality of panels 120 and plurality of members 122 associated with plurality of panels 120 during the building of fuselage assembly 114. This shape may be at least partially determined by, for example, without limitation, the outer mold line requirements and inner mold line requirements for fuselage assembly 114. In some cases, the shape may be at least partially determined by the location and orientation of the frames and stringers of fuselage assembly 114.

In some cases, when the assembly of plurality of panels 120 and support structure 121 that comprise fuselage assembly 114 has reached a desired point, number of corresponding autonomous vehicles 316 may drive assembly fixture 324 out of assembly area 304. For example, fuselage assembly 114 may be driven across floor 300 into a different area within manufacturing environment 100, from floor 300 onto another floor in a different manufacturing environment, or from floor 300 onto another floor in some other area or environment.

In one illustrative example, assembly fixture 324 may be driven to some other location at which another assembly fixture is located such that the two assembly fixtures may be coupled to form a larger assembly fixture. As one illustrative example, assembly fixture 324 may be used to hold and support aft fuselage assembly 116 in FIG. 1, while another assembly fixture implemented in a manner similar to assembly fixture 324 may be used to hold and support forward fuselage assembly 117 in FIG. 1. Yet another assembly fixture implemented in a manner similar to assembly fixture 324 may be used to hold and support middle fuselage assembly 118 in FIG. 1.

Once these three fuselage assemblies have been built, the three assembly fixtures may be brought together to form a larger assembly fixture for holding aft fuselage assembly 116, middle fuselage assembly 118, and forward fuselage assembly 117 such that these three fuselage assemblies may be joined to form fuselage 102 described in FIG. 1. In particular, this larger assembly fixture may hold aft fuselage assembly 116, middle fuselage assembly 118, and forward fuselage assembly 117 in alignment with each other such that fuselage 102 may be built within selected tolerances.

In another illustrative example, a first assembly fixture and a second assembly fixture implemented in a manner similar to assembly fixture 324 may be used to hold and support aft fuselage assembly 116 and forward fuselage assembly 117, respectively, from FIG. 1. Once these two fuselage assemblies have been built, the two assembly fixtures may then be brought together to form a larger assembly fixture for holding the two fuselage assemblies such that these fuselage assemblies may be joined to form fuselage 102. The larger assembly fixture may hold aft fuselage assembly 116 and forward fuselage assembly 117 in alignment with each other such that fuselage 102 may be built within selected tolerances.

As depicted, tower system 310 includes number of towers 330. Tower 332 may be an example of one implementation for one of number of towers 330. Tower 332 may be configured to provide access to interior 236 of fuselage assembly 114 described in FIG. 2. In some illustrative examples, tower 332 may be referred to as a drivable tower. In other illustrative examples, tower 332 may be referred to as an autonomously drivable tower.

In one illustrative example, tower 332 may take the form of first tower 334. First tower 334 may also be referred to as an operator tower in some cases. In another illustrative example, tower 332 may take the form of second tower 336. Second tower 336 may also be referred to as a robotics tower in some cases. In this manner, number of towers 330 may include both first tower 334 and second tower 336.

First tower 334 may be configured substantially for use by a human operator, whereas second tower 336 may be configured substantially for use by a mobile platform having at least one robotic device associated with the mobile platform. In other words, first tower 334 may allow a human operator to access and enter interior 236 of fuselage assembly 114. Second tower 336 may allow a mobile platform to access and enter interior 236 of fuselage assembly 114.

First tower 334 and second tower 336 may be positioned relative to assembly fixture 324 at different times during assembly process 110. As one illustrative example, one of plurality of autonomous vehicles 306 may be used to move or autonomously drive first tower 334 from holding area 318 into selected tower position 338 within assembly area 304. Number of cradle fixtures 314 may then be autonomously driven, using number of corresponding autonomous vehicles 316, into number of selected cradle positions 320 relative to first tower 334, which is in selected tower position 338 within assembly area 304.

Second tower 336 may be exchanged for first tower 334 at some later stage during assembly process 110 in FIG. 1. For example, one of plurality of autonomous vehicles 306 may be used to autonomously drive first tower 334 out of assembly area 304 and back into holding area 318. The same autonomous vehicle or a different autonomous vehicle in plurality of autonomous vehicles 306 may then be used to autonomously drive second tower 336 from holding area 318 into selected tower position 338 within assembly area 304 that was previously occupied by first tower 334. Depending on the implementation, first tower 334 may be later exchanged for second tower 336.

In other illustrative examples, first tower 334 and second tower 336 may each have an autonomous vehicle in plurality of autonomous vehicles 306 fixedly associated with the tower. In other words, one of plurality of autonomous vehicles 306 may be integrated with first tower 334 and one of plurality of autonomous vehicles 306 may be integrated with second tower 336. For example, one of plurality of autonomous vehicles 306 may be considered part of or built into first tower 334. First tower 334 may then be considered capable of autonomously driving across floor 300. In a similar manner, one of plurality of autonomous vehicles 306 may be considered part of or built into second tower 336. Second tower 336 may then be considered capable of autonomously driving across floor 300.

Tower system 310 and assembly fixture 324 may be configured to form interface 340 with each other. Interface 340 may be a physical interface between tower system 310 and assembly fixture 324. Tower system 310 may also be configured to form interface 342 with utility system 138. In one illustrative example, interface 340 and interface 342 may be autonomously formed.

Interface 342 may be a physical interface between tower system 310 and utility system 138. In these illustrative examples, in addition to being physical interfaces, interface 340 and interface 342 may also be utility interfaces. For example, with respect to the utility of power, interface 340 and interface 342 may be considered electrical interfaces.

Utility system 138 is configured to distribute number of utilities 146 to tower system 310 when tower system 310 and utility system 138 are physically and electrically coupled through interface 342. Tower system 310 may then distribute number of utilities 146 to assembly fixture 324 formed by cradle system 308 when assembly fixture 324 and tower system 310 are physically and electrically coupled through interface 340. Number of utilities 146 may include at least one of power, air, hydraulic fluid, communications, water, or some other type of utility.

As depicted, utility system 138 may include utility fixture 150. Utility fixture 150 may be configured to receive number of utilities 146 from number of utility sources 148. Number of utility sources 148 may include, for example, without limitation, at least one of a power generator, a battery system, a water system, an electrical line, a communications system, a hydraulic fluid system, an air tank, or some other type of utility source. For example, utility fixture 150 may receive power from a power generator.

In one illustrative example, utility fixture 150 may be positioned relative to assembly area 304. Depending on the implementation, utility fixture 150 may be positioned inside assembly area 304 or outside of assembly area 304.

In some illustrative examples, utility fixture 150 may be associated with floor 300. Depending on the implementation, utility fixture 150 may be permanently associated with floor 300 or temporarily associated with floor 300. In other illustrative examples, utility fixture 150 may be associated with some other surface of manufacturing environment 100, such as a ceiling, or some other structure in manufacturing environment 100. In some cases, utility fixture 150 may be embedded within floor 300.

In one illustrative example, first tower 334 may be autonomously driven into selected tower position 338 with respect to floor 300 relative to utility fixture 150 such that interface 342 may be formed between first tower 334 and utility fixture 150. Once interface 342 has been formed, number of utilities 146 may flow from utility fixture 150 to first tower 334. Assembly fixture 324 may then autonomously form interface 340 with first tower 334 to form a network of utility cables between first tower 334 and assembly fixture 324. Once both interface 342 and interface 340 have been formed, number of utilities 146 received at utility fixture 150 may flow from utility fixture 150 to first tower 334 and to each of number of cradle fixtures 314 that forms assembly fixture 324. In this manner, first tower 334 may function as a conduit or "middleman" for distributing number of utilities 146 to assembly fixture 324.

When interface 340 has been formed between second tower 336 and assembly fixture 324 and interface 342 has been formed between second tower 336 and utility fixture 150, number of utilities 146 may be provided to second tower 336 and assembly fixture 324 in a similar manner as described above. Thus, utility fixture 150 may distribute number of utilities 146 to tower system 310 and assembly fixture 324 without tower system 310 and cradle assembly fixture 324 having to separately connect to number of utility sources 148 or any other utility sources.

Autonomous tooling system 312 may be used to assemble plurality of panels 120 and support structure 121 while fuselage assembly 114 is being supported and held by assembly fixture 324. Autonomous tooling system 312 may include plurality of mobile platforms 344. Each of plurality of mobile platforms 344 may be configured to perform one or more of operations 124 in assembly process 110 described in FIG. 1. In particular, plurality of mobile platforms 344 may be autonomously driven into selected positions relative to plurality of panels 120 within selected tolerances to autonomously perform operations 124 that join plurality of panels 120 together to build fuselage assembly 114. Plurality of mobile platforms 344 are described in greater detail in FIG. 4 below.

In this illustrative example, set of controllers 140 in control system 136 may generate commands 142 as described in FIG. 1 to control the operation of at least one of cradle system 308, tower system 310, utility system 138, autonomous tooling system 312, or plurality of autonomous vehicles 306. Set of controllers 140 in FIG. 1 may communicate with at least one of cradle system 308, tower system 310, utility system 138, autonomous tooling system 312, or plurality of autonomous vehicles 306 using any number of wireless communications links, wired communications links, optical communications links, other types of communications links, or combination thereof.

In this manner, plurality of mobile systems 134 of flexible manufacturing system 106 may be used to automate the process of building fuselage assembly 114. Plurality of mobile systems 134 may enable fuselage assembly 114 to be built substantially autonomously with respect to joining together plurality of panels 120 to reduce the overall time, effort, and human resources needed.

Flexible manufacturing system 106 may build fuselage assembly 114 up to the point needed to move fuselage assembly 114 to the next stage in manufacturing process 108 for building fuselage 102 or the next stage in the manufacturing process for building aircraft 104, depending on the implementation. In some cases, cradle system 308 in the form of assembly fixture 324 may continue carrying and supporting fuselage assembly 114 during one or more of these later stages in manufacturing process 108 for building fuselage 102 and aircraft 104.

Figure 4:
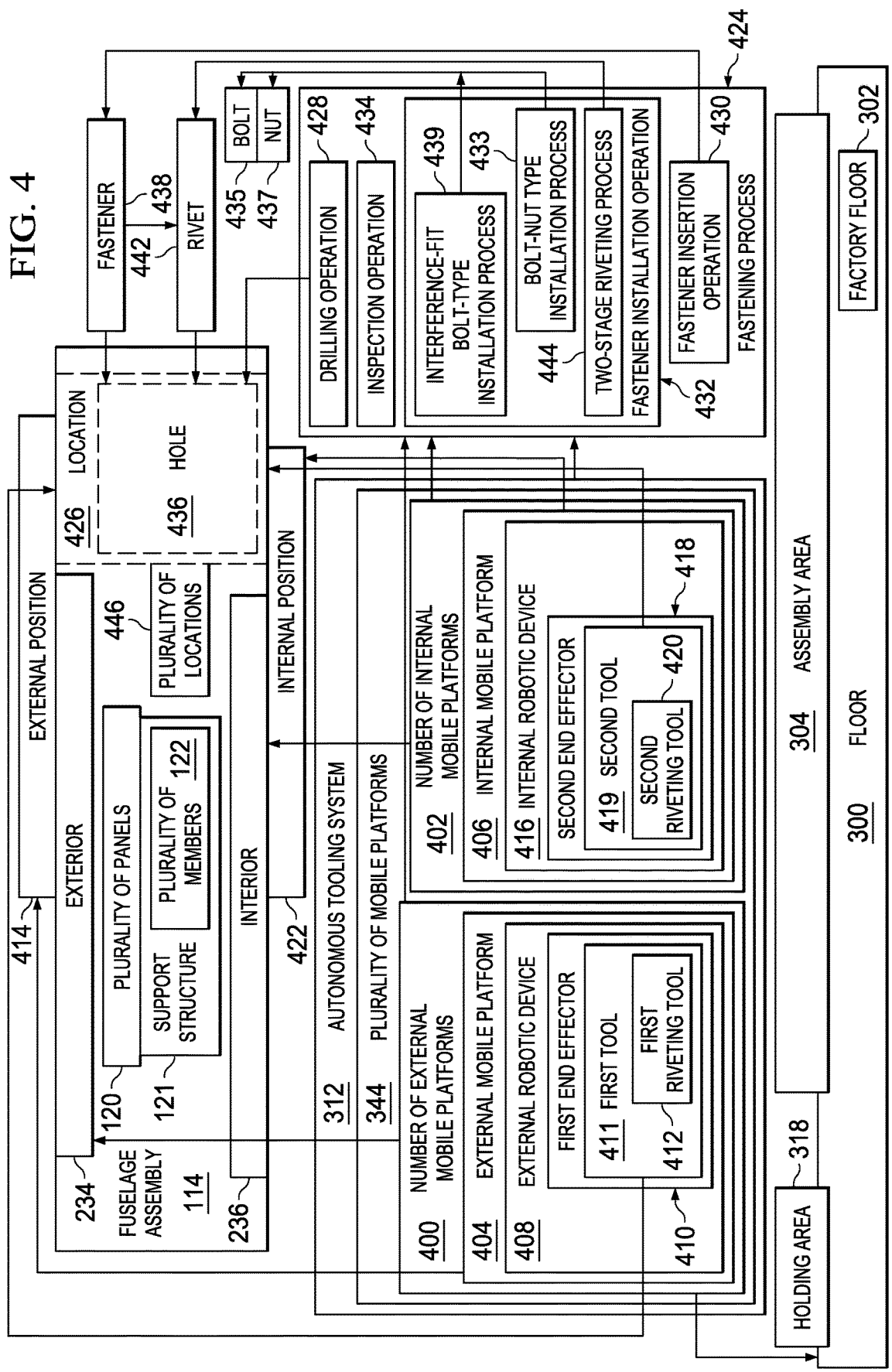
FIG. 4 is an illustration of a plurality of mobile platforms in the form of a block diagram in accordance with an illustrative embodiment.

With reference now to FIG. 4, an illustration of plurality of mobile platforms 344 from FIG. 3 is depicted in the form of a block diagram in accordance with an illustrative embodiment. As depicted, plurality of mobile platforms 344 may include number of external mobile platforms 400 and number of internal mobile platforms 402. In this manner, plurality of mobile platforms 344 may include at least one external mobile platform and at least one internal mobile platform.

In some illustrative examples, number of external mobile platforms 400 may be referred to as a number of drivable external mobile platforms. Similarly, in some cases, number of internal mobile platforms 402 may be referred to as a number of drivable internal mobile platforms. In other illustrative examples, number of external mobile platforms 400 and number of internal mobile platforms 402 may be referred to as a number of autonomously drivable external mobile platforms and a number of autonomously drivable internal mobile platforms, respectively.

External mobile platform 404 may be an example of one of number of external mobile platforms 400 and internal mobile platform 406 may be an example of one of number of internal mobile platforms 402. External mobile platform 404 and internal mobile platform 406 may be platforms that are autonomously drivable. Depending on the implementation, each of external mobile platform 404 and internal mobile platform 406 may be configured to autonomously drive across floor 300 on its own or with the assistance of one of plurality of autonomous vehicles 306 from FIG. 3.

As one illustrative example, without limitation, external mobile platform 404 may be autonomously driven across floor 300 using a corresponding one of plurality of autonomous vehicles 306. In some illustrative examples, external mobile platform 404 and this corresponding one of plurality of autonomous vehicles 306 may be integrated with each other. For example, the autonomous vehicle may be fixedly associated with external mobile platform 404. An entire load of external mobile platform 404 may be transferable to the autonomous vehicle such that driving the autonomous vehicle across floor 300 drives external mobile platform 404 across floor 300.

External mobile platform 404 may be driven from, for example, without limitation, holding area 318 to a position relative to exterior 234 of fuselage assembly 114 to perform one or more operations 124 in FIG. 1. As depicted, at least one external robotic device 408 may be associated with external mobile platform 404. In this illustrative example, external robotic device 408 may be considered part of external mobile platform 404. In other illustrative examples, external robotic device 408 may be considered a separate component that is physically attached to external mobile platform 404. External robotic device 408 may take the form of, for example, without limitation, a robotic arm.

External robotic device 408 may have first end effector 410. Any number of tools may be associated with first end effector 410. These tools may include, for example, without limitation, at least one of a drilling tool, a fastener insertion tool, a fastener installation tool, an inspection tool, or some other type of tool. In particular, any number of fastening tools may be associated with first end effector 410.

As depicted, first tool 411 may be associated with first end effector 410. In one illustrative example, first tool 411 may be any tool that is removably associated with first end effector 410. In other words, first tool 411 associated with first end effector 410 may be changed as various operations need to be performed. For example, without limitation, first tool 411 may take the form of one type of tool, such as a drilling tool, to perform one type of operation. This tool may then be exchanged with another type of tool, such as a fastener insertion tool, to become the new first tool 411 associated with first end effector 410 to perform a different type of operation.

In one illustrative example, first tool 411 may take the form of first riveting tool 412. First riveting tool 412 may be used to perform riveting operations. In some illustrative examples, a number of different tools may be exchanged with first riveting tool 412 and associated with first end effector 410. For example, without limitation, first riveting tool 412 may be exchangeable with a drilling tool, a fastener insertion tool, a fastener installation tool, an inspection tool, or some other type of tool.

External mobile platform 404 may be autonomously driven across floor 300 and positioned relative to assembly fixture 324 in FIG. 3 supporting fuselage assembly 114 to position first end effector 410 and first tool 411 associated with first end effector 410 relative to one of plurality of panels 120. For example, external mobile platform 404 may be autonomously driven across floor 300 to external position 414 relative to assembly fixture 324. In this manner, first tool 411 carried by external mobile platform 404 may be macro-positioned using external mobile platform 404.

Once in external position 414, first end effector 410 may be autonomously controlled using at least external robotic device 408 to position first tool 411 associated with first end effector 410 relative to a particular location on an exterior-facing side of one of plurality of panels 120. In this manner, first tool 411 may be micro-positioned relative to the particular location.

Internal mobile platform 406 may be located on second tower 336 in FIG. 3 when internal mobile platform 406 is not in use. When interface 340 described in FIG. 3 is formed between second tower 336 and assembly fixture 324, internal mobile platform 406 may be driven from second tower 336 into interior 236 of fuselage assembly 114 and used to perform one or more of operations 124. In one illustrative example, internal mobile platform 406 may have a movement system that allows internal mobile platform 406 to move from second tower 336 onto a floor inside fuselage assembly 114.

At least one internal robotic device 416 may be associated with internal mobile platform 406. In this illustrative example, internal robotic device 416 may be considered part of internal mobile platform 406. In other illustrative examples, internal robotic device 416 may be considered a separate component that is physically attached to internal mobile platform 406. Internal robotic device 416 may take the form of, for example, without limitation, a robotic arm.

Internal robotic device 416 may have second end effector 418. Any number of tools may be associated with second end effector 418. For example, without limitation, at least one of a drilling tool, a fastener insertion tool, a fastener installation tool, an inspection tool, or some other type of tool may be associated with second end effector 418. In particular, any number of fastening tools may be associated with second end effector 418.

As depicted, second tool 419 may be associated with second end effector 418. In one illustrative example, second tool 419 may be any tool that is removably associated with second end effector 418. In other words, second tool 419 associated with second end effector 418 may be changed as various operations need to be performed. For example, without limitation, second tool 419 may take the form of one type of tool, such as a drilling tool, to perform one type of operation. This tool may then be exchanged with another type of tool, such as a fastener insertion tool, to become the new second tool 419 associated with second end effector 418 to perform a different type of operation.

In one illustrative example, second tool 419 may take the form of second riveting tool 420. Second riveting tool 420 may be associated with second end effector 418. Second riveting tool 420 may be used to perform riveting operations. In some illustrative examples, a number of different tools may be exchanged with second riveting tool 420 and associated with second end effector 418. For example, without limitation, second riveting tool 420 may be exchangeable with a drilling tool, a fastener insertion tool, a fastener installation tool, an inspection tool, or some other type of tool.

Internal mobile platform 406 may be driven from second tower 336 into fuselage assembly 114 and positioned relative to interior 236 of fuselage assembly 114 to position second end effector 418 and second tool 419 associated with second end effector 418 relative to one of plurality of panels 120. In one illustrative example, internal mobile platform 406 may be autonomously driven onto one of number of floors 266 in FIG. 2 into internal position 422 within fuselage assembly 114 relative to fuselage assembly 114. In this manner, second tool 419 may be macro-positioned into internal position 422 using internal mobile platform 406.

Once in internal position 422, second end effector 418 may be autonomously controlled to position second tool 419 associated with second end effector 418 relative to a particular location on an interior-facing side of one of plurality of panels 120 or an interior-facing side of one of plurality of members 122 in FIG. 2 that make up support structure 121. In this manner, second tool 419 may be micro-positioned relative to the particular location.

In one illustrative example, external position 414 for external mobile platform 404 and internal position 422 for internal mobile platform 406 may be selected such that fastening process 424 may be performed at location 426 on fuselage assembly 114 using external mobile platform 404 and internal mobile platform 406. Fastening process 424 may include any number of operations. In one illustrative example, fastening process 424 may include at least one of drilling operation 428, fastener insertion operation 430, fastener installation operation 432, inspection operation 434, or some other type of operation.

As one specific example, drilling operation 428 may be performed autonomously using first tool 411 associated with first end effector 410 of external mobile platform 404 or second tool 419 associated with second end effector 418 of internal mobile platform 406. For example, without limitation, first tool 411 or second tool 419 may take the form of a drilling tool for use in performing drilling operation 428. Drilling operation 428 may be autonomously performed using first tool 411 or second tool 419 to form hole 436 at location 426. Hole 436 may pass through at least one of two panels in plurality of panels 120, two members of a plurality of members 122, or a panel and one of plurality of members 122.

Fastener insertion operation 430 may be performed autonomously using first tool 411 associated with first end effector 410 of external mobile platform 404 or second tool 419 associated with second end effector 418 of internal mobile platform 406. Fastener insertion operation 430 may result in fastener 438 being inserted into hole 436.

Fastener installation operation 432 may then be performed autonomously using at least one of first tool 411 associated with first end effector 410 of external mobile platform 404 or second tool 419 associated with second end effector 418 of internal mobile platform 406. In one illustrative example, fastener installation operation 432 may be performed autonomously using first tool 411 in the form of first riveting tool 412 and second tool 419 in the form of second riveting tool 420 such that fastener 438 becomes rivet 442 installed at location 426. Rivet 442 may be a fully installed rivet. Rivet 442 may be one of plurality of fasteners 264 described in FIG. 2.

In one illustrative example, fastener installation operation 432 may take the form of bolt-nut type installation process 433. First tool 411 associated with first end effector 410 may be used to, for example, without limitation, install bolt 435 through hole 436. Second tool 419 associated with second end effector 418 may then be used to install nut 437 over bolt 435. In some cases, installing nut 437 may include applying a torque sufficient to nut 437 such that a portion of nut 437 breaks off. In these cases, nut 437 may be referred to as a frangible collar.

In another illustrative example, fastener installation operation 432 may take the form of interference-fit bolt-type installation process 439. First tool 411 associated with first end effector 410 may be used to, for example, without limitation, install bolt 435 through hole 436 such that an interference fit is created between bolt 435 and hole 436. Second tool 419 associated with second end effector 418 may then be used to install nut 437 over bolt 435.

In yet another illustrative example, fastener installation operation 432 may take the form of two-stage riveting process 444. Two-stage riveting process 444 may be performed using, for example, without limitation, first riveting tool 412 associated with external mobile platform 404 and second riveting tool 420 associated with internal mobile platform 406.

For example, first riveting tool 412 and second riveting tool 420 may be positioned relative to each other by external mobile platform 404 and internal mobile platform 406, respectively. For example, external mobile platform 404 and external robotic device 408 may be used to position first riveting tool 412 relative to location 426 at exterior 234 of fuselage assembly 114. Internal mobile platform 406 and internal robotic device 416 may be used to position second riveting tool 420 relative to the same location 426 at interior 236 of fuselage assembly 114.

First riveting tool 412 and second riveting tool 420 may then be used to perform two-stage riveting process 444 to form rivet 442 at location 426. Rivet 442 may join at least two of plurality of panels 120 together, a panel in plurality of panels 120 to support structure 121 formed by plurality of members 122, or two panels in plurality of panels 120 to support structure 121.

In this example, two-stage riveting process 444 may be performed at each of plurality of locations 446 on fuselage assembly 114 to install plurality of fasteners 264 as described in FIG. 2. Two-stage riveting process 444 may ensure that plurality of fasteners 264 in FIG. 2 are installed at plurality of locations 446 with a desired quality and desired level of accuracy.

In this manner, internal mobile platform 406 may be autonomously driven and operated inside fuselage assembly 114 to position internal mobile platform 406 and second riveting tool 420 associated with internal mobile platform 406 relative to plurality of locations 446 on fuselage assembly 114 for performing assembly process 110 described in FIG. 1. Similarly, external mobile platform 404 may be autonomously driven and operated around fuselage assembly 114 to position external mobile platform 404 and first riveting tool 412 associated with external mobile platform 404 relative to plurality of locations 446 on fuselage assembly 114 for performing operations 124.

Figure 5:
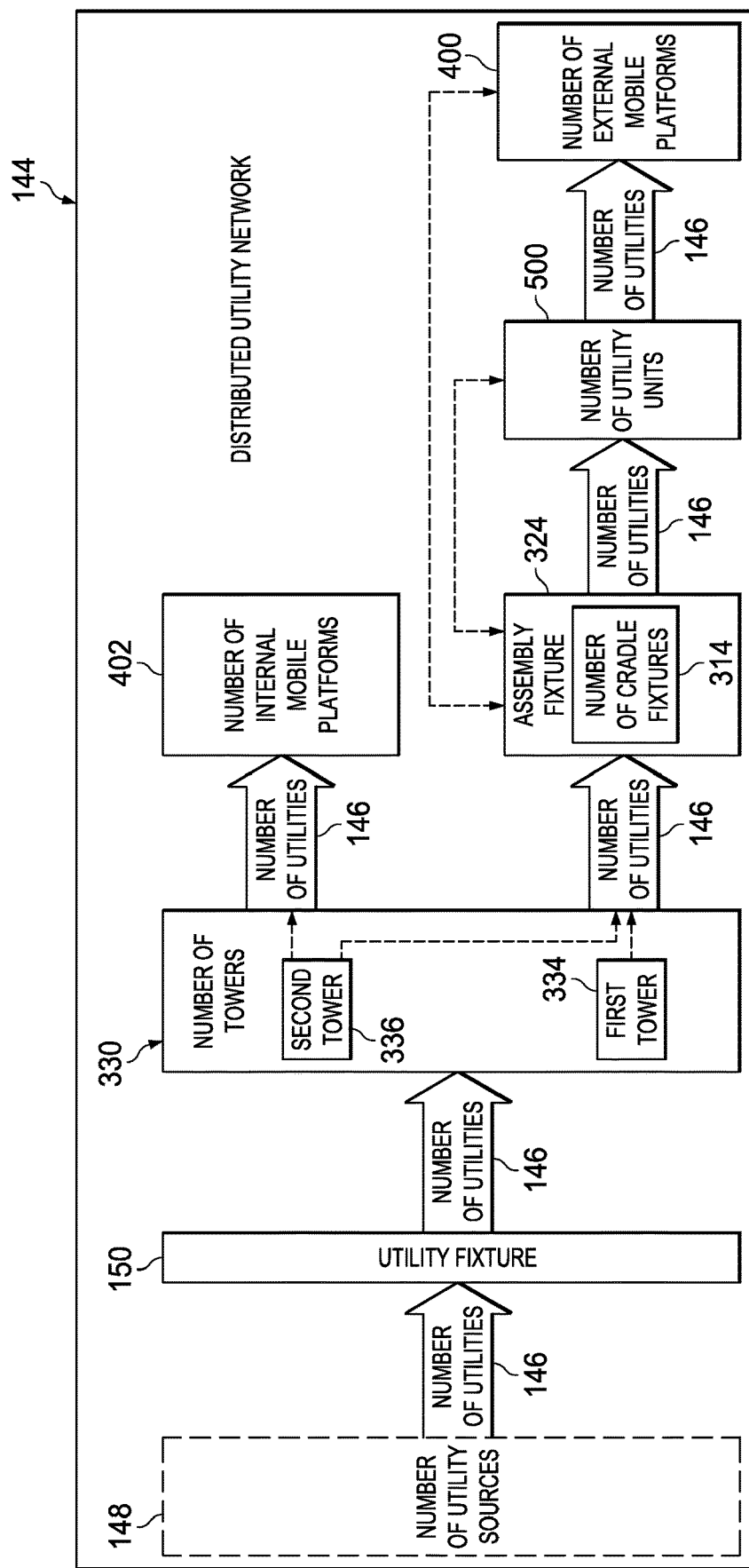
FIG. 5 is an illustration of a flow of a number of utilities across a distributed utility network in the form of a block diagram in accordance with an illustrative embodiment.

With reference now to FIG. 5, an illustration of a flow of number of utilities 146 across distributed utility network 144 from FIG. 1 is depicted in the form of a block diagram in accordance with an illustrative embodiment. As depicted, number of utilities 146 may be distributed across distributed utility network 144.

Distributed utility network 144 may include, for example, without limitation, number of utility sources 148, utility fixture 150, number of towers 330, assembly fixture 324, number of external mobile platforms 400, and number of utility units 500. In some cases, distributed utility network 144 may also include number of internal mobile platforms 402. In some illustrative examples, number of utility sources 148 may be considered separate from distributed utility network 144.

In this illustrative example, only one of number of towers 330 may be included in distributed utility network 144 at a time. When first tower 334 is used, distributed utility network 144 may be formed when utility fixture 150 is coupled to number of utility sources 148, first tower 334 is coupled to utility fixture 150, assembly fixture 324 is coupled to first tower 334, and number of external mobile platforms 400 is coupled to number of utility units 500.

Number of utility units 500 may be associated with number of cradle fixtures 314 of assembly fixture 324 or separated from number of cradle fixtures 314. For example, without limitation, a number of dual interfaces may be created between number of external mobile platforms 400, number of utility units 500, and number of cradle fixtures 314 using one or more dual-interface couplers.

When second tower 336 is used, distributed utility network 144 may be formed when utility fixture 150 is coupled to number of utility sources 148, second tower 336 is coupled to utility fixture 150, assembly fixture 324 is coupled to second tower 336, number of internal mobile platforms 402 is coupled to second tower 336, and number of external mobile platforms 400 is coupled to number of utility units 500, which may be associated with number of cradle fixtures 314 or separated from number of cradle fixtures 314. Number of internal mobile platforms 402 may receive number of utilities 146 through a number of cable management systems associated with second tower 336.

In this manner, number of utilities 146 may be distributed across distributed utility network 144 using a single utility fixture 150. This type of distributed utility network 144 may reduce the number of utility components, utility cables, and other types of devices needed to provide number of utilities 146 to the various components in distributed utility network 144. Further, with this type of distributed utility network 144, starting from at least utility fixture 150, number of utilities 146 may be provided completely above floor 300 of manufacturing environment in FIG. 1.

Figure 6:
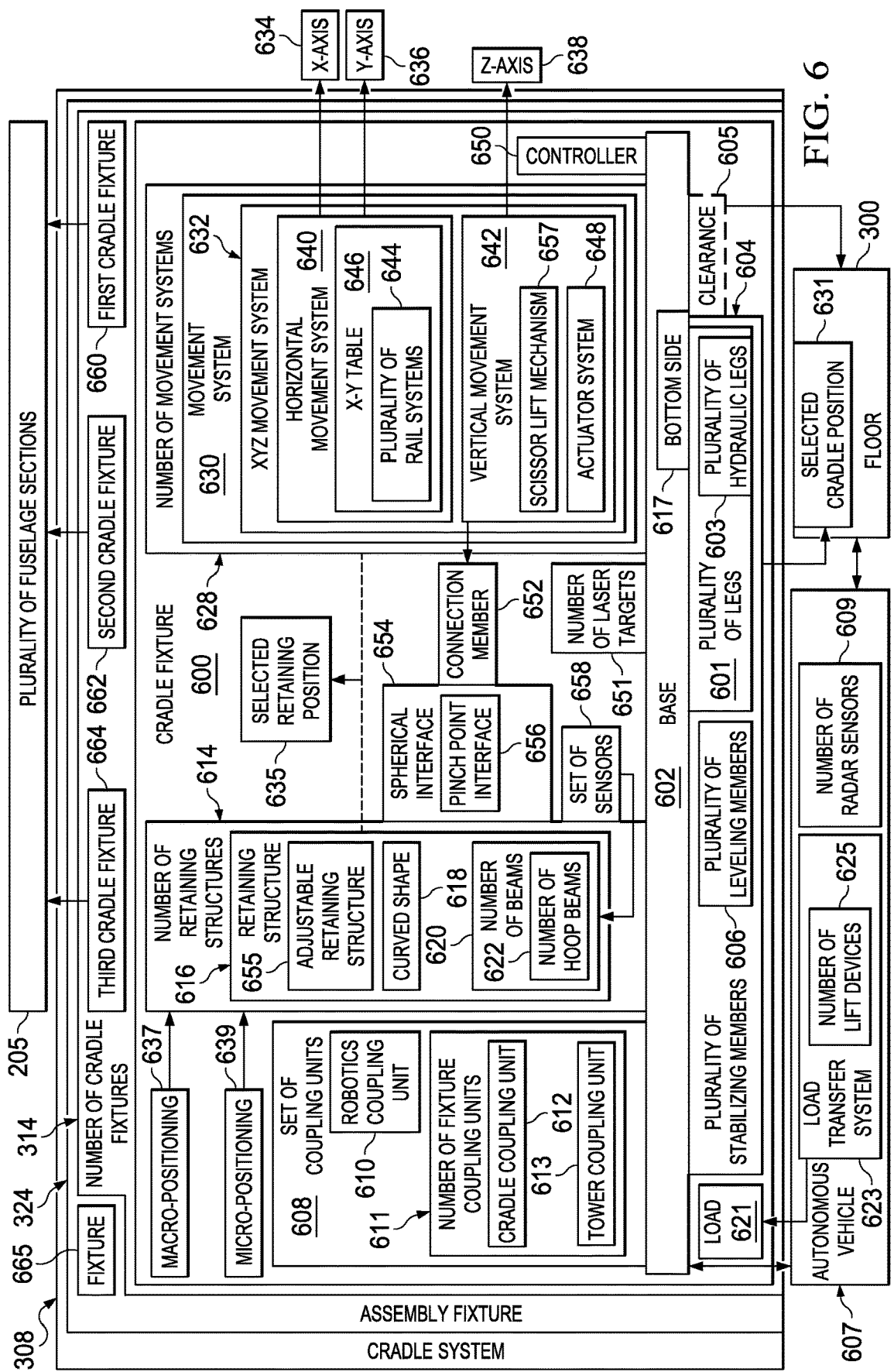
FIG. 6 is an illustration of a cradle system in the form of a block diagram in accordance with an illustrative embodiment.

With reference now to FIG. 6, an illustration of cradle system 308 from FIG. 3 is depicted in the form of a block diagram in accordance with an illustrative embodiment. As depicted, cradle system 308 includes number of fixtures 313 shown in FIG. 3. In this illustrative example, number of fixtures 313 may include number of cradle fixtures 314 also shown in FIG. 3.

Cradle fixture 600 may be an example of one of number of cradle fixtures 314. For example, cradle fixture 600 may be an example of one implementation for cradle fixture 322 in FIG. 3.

Cradle fixture 600 may have base 602. Base 602 may have plurality of stabilizing members 604 that support base 602 and the various components associated with base 602. In particular, plurality of stabilizing members 604 may be used to stabilize base 602 relative to floor 300. In one illustrative example, plurality of stabilizing members 604 may take the form of plurality of legs 601. Depending on the implementation, plurality of stabilizing members 604 may take the form of plurality of hydraulic legs 603.

In some cases, plurality of stabilizing members 604 may be used to adjust cradle fixture 600 to align number of floors 266 of fuselage assembly 114 shown in FIG. 2 with a number of platform levels of, for example, tower 332 in FIG. 3. For example, without limitation, plurality of stabilizing members 604 may adjust cradle fixture 600 by at least one of raising, lowering, or tilting cradle fixture 600. Further, plurality of stabilizing members 604 may be used to adjust cradle fixture 600 to align a coupling unit associated with cradle fixture 600 with a corresponding coupling unit associated with tower 332 such that cradle fixture 600 may be coupled to tower 332.

In some illustrative examples, plurality of leveling members 606 may be optionally associated with plurality of stabilizing members 604. Plurality of leveling members 606 may be used to level base 602 such that, if desired, base 602 may be leveled substantially parallel to floor 300. In other illustrative examples, plurality of leveling members 606 may be used to level base 602 such that base 602 is substantially aligned with a true horizontal plane. For example, without limitation, plurality of leveling members 606 may be used to level base 602 such that a selected point on base 602 is substantially perpendicular to the gradient of the gravity field at that point. The selected point may be, for example, without limitation, a center of base 602 or a center of cradle fixture 600.

Plurality of stabilizing members 604 may be used to compensate for unevenness of one or more portions of floor 300. For example, without limitation, plurality of leveling members 606 may be used to align base 602 with a horizontal plane when base 602 is over an uneven or sloped portion of floor 300.

In other illustrative examples, plurality of stabilizing members 604 may be used to adjust cradle fixture 600 such that a panel being supported by cradle fixture 600 may be substantially aligned with another panel being supported by another one of number of cradle fixtures 314. For example, plurality of stabilizing members 604 may be used to ensure that these panels are substantially aligned prior to the panels being temporarily connected together using, for example, without limitation, temporary fasteners 328 in FIG. 3.

Further, plurality of stabilizing members 604 may be configured to provide clearance 605 between bottom side 617 of base 602 and floor 300. For example, each of plurality of stabilizing members 604 may have a height that provides clearance 605. Clearance 605 may be selected such that one of plurality of autonomous vehicles 306 in FIG. 3, such as autonomous vehicle 607, may be autonomously driven under base 602 without contacting bottom side 617 of base 602. Autonomous vehicle 607 may be an example of one of number of corresponding autonomous vehicles 316 in FIG. 3.

For example, cradle fixture 600 and autonomous vehicle 607 may be located in holding area 318 from FIG. 3. Autonomous vehicle 607 may be driven to a position under bottom side 617 of base 602. Autonomous vehicle 607 may then be associated with cradle fixture 600. For example, without limitation, autonomous vehicle 607 may couple to cradle fixture 600. In other illustrative examples, a vehicle other than autonomous vehicle 607 may be coupleable to cradle fixture 600.

In one illustrative example, load 621 of cradle fixture 600 may be transferred to autonomous vehicle 607. For example, without limitation, autonomous vehicle 607 may use load transfer system 623 to transfer load 621 of cradle fixture 600 onto autonomous vehicle 607. As one illustrative example, load transfer system 623 may include number of lift devices 625 associated with autonomous vehicle 607. Number of lift devices 625 may include at least one of, for example without limitation, a lift beam, a lift arm, a vertically mobile platform, or some other type of lift device.

Number of lift devices 625 may be used to lift base 602 vertically relative to floor 300 such that the entire load 621 of cradle fixture 600 is completely supported by autonomous vehicle 607. For example, base 602 may be lifted such that plurality of stabilizing members 604 do not contact floor 300.

Once the entire load 621 of cradle fixture 600 is supported by autonomous vehicle 607, autonomous vehicle 607 may enable autonomous driving of cradle fixture 600 freely across floor 300. For example, autonomous vehicle 607 may drive cradle fixture 600 from holding area 318 in FIG. 3, across floor 300, to selected cradle position 631, which may be located within assembly area 304 in FIG. 3. Selected cradle position 631 may be an example of one of number of selected cradle positions 320 in FIG. 3.

Autonomous vehicle 607 may use number of radar sensors 609 associated with autonomous vehicle 607 to position cradle fixture 600 in selected cradle position 631 within selected tolerances. This positioning of cradle fixture 600 may be referred to as a rough positioning or macro-positioning, depending on the implementation. Autonomous vehicle 607 may also use number of radar sensors 609 to avoid obstacles while autonomous vehicle 607 drives across floor 300.

Once cradle fixture 600 is in selected cradle position 631, autonomous vehicle 607 may be disassociated from cradle fixture 600 such that the entire load of cradle fixture 600 is no longer supported by autonomous vehicle 607. For example, without limitation, once cradle fixture 600 is in selected cradle position 631, load transfer system 623 may be used to lower cradle fixture 600 towards floor 300 to put plurality of stabilizing members 604 back in contact with floor 300. Autonomous vehicle 607 may decouple, or disassociate, from cradle fixture 600 such that autonomous vehicle 607 may be driven away from cradle fixture 600. In one illustrative example, autonomous vehicle 607 may be driven back into holding area 318 in FIG. 3. Plurality of stabilizing members 604 may then be used to at least one of stabilize or position cradle fixture 600 relative to floor 300.

In other illustrative examples, some other type of movement system may be used to move cradle fixture 600 into selected cradle position 631. For example, without limitation, two autonomous vehicles may be used to move cradle fixture 600 into selected cradle position 631. In another illustrative example, a crane system may be used to autonomously pick up cradle fixture 600 from holding area 318 and place cradle fixture 600 into selected cradle position 631.

As depicted, set of coupling units 608 may be associated with base 602. Set of coupling units 608 may include at least one of robotics coupling unit 610, number of fixture coupling units 611, and tower coupling unit 613. Robotics coupling unit 610 may be used to form an interface between cradle fixture 600 and a mobile platform, such as, for example, without limitation, external mobile platform 404 in FIG. 4. For example, robotics coupling unit 610 may be configured to connect to a corresponding cradle coupling unit (not shown) associated with external mobile platform 404 in FIG. 4.

Number of fixture coupling units 611 may include, for example, cradle coupling unit 612. Cradle coupling unit 612 may be used to form an interface between cradle fixture 600 and another one of number of cradle fixtures 314 using another cradle coupling unit associated with the other cradle fixture.

Tower coupling unit 613 may be used to form an interface between cradle fixture 600 and one of number of towers 330 in FIG. 3 using a cradle coupling unit associated with the tower. In this illustrative example, tower coupling unit 613 may be used to autonomously couple cradle fixture 600 to one of number of towers 330 in FIG. 3 such that number of utilities 146 in FIG. 1 may be received at cradle fixture 600 from the tower. For example, tower coupling unit 613 may be used to autonomously couple cradle fixture 600 to tower 332 in FIG. 3. In other illustrative examples, tower coupling unit 613 may be used to manually couple cradle fixture 600 to tower 332.

In this illustrative example, each of set of coupling units 608 may be used to couple number of utilities 146 between cradle fixture 600 and a corresponding system. In this manner, number of utilities 146 may be distributed from a system to cradle fixture 600 or from cradle fixture 600 to a system through each coupling unit in set of coupling units 608.

In this illustrative example, number of retaining structures 614 may be associated with base 602. Each of number of retaining structures 614 may be comprised of one or more beams. Number of retaining structures 614 may be an example of one implementation for number of retaining structures 326 in FIG. 3.

Number of retaining structures 614 may be used to support one or more panels of one or more different types, depending on the implementation. For example, number of retaining structures 614 may be used to support one, two, or some other number of keel panels 222 in FIG. 2.

As depicted, retaining structure 616 may be an example of one of number of retaining structures 614. Retaining structure 616 may have curved shape 618. Curved shape 618 may substantially match a curvature of a corresponding fuselage section in plurality of fuselage sections 268 in FIG. 2 to be received by and engaged with retaining structure 616. In particular, curved shape 618 may substantially match the curvature for a corresponding portion of the outer mold line (OML) for fuselage assembly 114, and thereby, fuselage 102 in FIG. 1. This portion may be, for example, without limitation, the portion of the outer mold line corresponding to the bottom, or keel, of fuselage assembly 114. For example, retaining structure 616 may have curved shape 618 that substantially matches a curvature of one of plurality of panels 120 in FIGS. 1-4 to be received by and engaged with retaining structure 616.

In one illustrative example, retaining structure 616 may include number of beams 620. Each of number of beams 620 may have a curved shape such that retaining structure 616 may have the overall curved shape 618. In particular, each of number of beams 620 may have a radius of curvature substantially equal to the radius of curvature of the portion of a corresponding one of keel panels 222 in FIG. 2 that is to be engaged with that particular beam. In other words, each of number of beams 620 may be shaped such that the portion of a keel panel that is engaged with each of number of beams 620 may mate with the beam with a desired contact fit. In some illustrative examples, number of beams 620 may be referred to as number of hoop beams 622.

Each beam in number of beams 620 may have any shape or configuration that allows the beam to engage a corresponding panel in a manner that allows fuselage assembly 114 to be built in accordance with outer mold line requirements. For example, a beam in number of beams 620 may be comprised of a plurality of members angled relative to each other in a manner that forms a shape that substantially matches to an outer mold line of fuselage assembly 114. The plurality of members may include any number of linear members, curved members, or combination thereof. Further, each beam in number of beams 620 may have any position or orientation relative to base 602 of cradle fixture 600, relative to one or more other beams in number of beams 620, or relative to fuselage assembly 114 that allows the beam to engage a corresponding panel in a manner that allows fuselage assembly 114 to be built in accordance with outer mold line requirements.

Configuring number of cradle fixtures 314 to form assembly fixture 324 may include configuring the retaining structures associated with number of cradle fixtures 314. Configuring these retaining structures may include positioning a number of retaining structures associated with each of number of cradle fixtures 314 relative to the base of each of number of cradle fixtures 314 with respect to a reference coordinate system. The reference coordinate system may be a fuselage coordinate system, an aircraft coordinate system, a manufacturing environment coordinate system, or some other type of coordinate system.

In this illustrative example, each of number of retaining structures 614 may be at least one of translatable or rotatable relative to base 602. For example, without limitation, retaining structure 616 may be associated with base 602 through number of movement systems 628. Each of number of movement systems 628 may be configured to provide movement with at least one degree of freedom.

As one illustrative example, number of movement systems 628 may be used to at least one of translationally or rotationally move retaining structure 616 relative to base 602. In one illustrative example, number of movement systems 628 may be used to horizontally and vertically move retaining structure 616.

Movement system 630 is an example of one of number of movement systems 628. Movement system 630 may be coupled to at least a portion of retaining structure 616 and used to move at least that portion of retaining structure 616 horizontally and vertically.

As one illustrative example, movement system 630 may take the form of XYZ movement system 632. XYZ movement system 632 may be capable of moving a corresponding portion, which may be some or all of retaining structure 616, in directions substantially parallel to X-axis 634, Y-axis 636, and Z-axis 638. In this example, movement substantially parallel to an axis may be referred to as movement along that axis. In these illustrative examples, movement along either X-axis 634 or Y-axis 636 may be considered horizontal movement. Further, movement along Z-axis 638 may be considered vertical movement.

As depicted, XYZ movement system 632 may include horizontal movement system 640 and vertical movement system 642. In one illustrative example, horizontal movement system 640 may use plurality of rail systems 644 to provide horizontal motion along X-axis 634 and Y-axis 636. Plurality of rail systems 644 may be motorized. As one illustrative example, horizontal movement system 640 may take the form of X-Y table 646.

Vertical movement system 642 may be implemented using actuator system 648. Actuator system 648 may provide, for example, without limitation, vertical motion relative to Z-axis 638. In one illustrative example, actuator system 648 may be implemented using one or more actuator devices. These actuator devices may be implemented using, for example, without limitation, a Pogo® actuator, which may be provided by CNA Manufacturing Systems, Inc., headquartered in Renton, Wash., United States. Of course, some other type of actuator device may be used to implement actuator system 648 in other illustrative examples.

In some illustrative examples, controller 650 may be associated with base 602. Controller 650 may be an example of one of set of controllers 140 in FIG. 1. Controller 650 may be used to control the operation of number of movement systems 628 to control the movement of number of movement systems 628, and thereby, the movement of retaining structure 616. In this manner, controller 650 may control the movement of each of number of retaining structures 614. This type of movement of number of retaining structures 614 may be performed autonomously.

Each of number of retaining structures 614 may be moved into a position relative to base 602 within selected tolerances. This position may be with respect to a reference coordinate system. This positioning may be performed using, for example, without limitation, a laser tracking system (not shown) of flexible manufacturing system 106 in FIG. 1 that includes number of laser targets 651 associated with base 602. Number of laser targets 651 may be directly associated with base 602 or indirectly associated with base 602 through, for example, a mounting structure or frame.

In one illustrative example, data may be received from the laser tracking system based on the locations of number of laser targets 651 within manufacturing environment 100 in FIG. 1. This data may be used to position number of retaining structures 614. For example, the data may be used to control number of movement systems 628 to move retaining structure 616 into selected retaining position 635 relative to base 602 with respect to the reference coordinate system. This positioning of number of retaining structures 614 may more precisely position number of retaining structures 614 as compared to the movement of base 602 using autonomous vehicle 607.

The positioning of base 602 by autonomous vehicle 607 may be considered macro-positioning 637 of cradle fixture 600, and thereby number of retaining structures 614. The individual positioning of each of number of retaining structures 614 using number of movement systems 628 associated with each retaining structure may be considered micro-positioning 639 of each of number of retaining structures 614.

Micro-positioning 639 of each of number of retaining structures 614 may be used to ensure that panels such as, for example, keel panels 222 in FIG. 2, may engage number of retaining structures 614 properly. For example, without limitation, after cradle fixture 600 is moved into selected cradle position 631 by autonomous vehicle 607, plurality of stabilizing members 604 may be used to adjust at least one of the height of cradle fixture 600 or the tilt of cradle fixture 600 relative to the vertical axis, which may be Z-axis 638. Consequently, the position of one or more of number of retaining structures 614 may need to be adjusted to ensure that number of retaining structures 614 have an overall configuration that is ready to receive one of keel panels 222 in FIG. 2.

Additionally, micro-positioning 639 may be performed after one of keel panels 222 from FIG. 2 has been engaged with number of retaining structures 614. For example, micro-positioning 639 may be used to adjust the position of the keel panel engaged with number of retaining structures 614 of cradle fixture 600 relative to another keel panel engaged with another one of number of fixtures 313. Micro-positioning 639 may be used to align an outer mold line of a keel panel engaged with cradle fixture 600 with the outer mold line of another keel panel engaged with another one of number of fixtures 313.

In one illustrative example, retaining structure 616 may take the form of adjustable retaining structure 655. Adjustable retaining structure 655 may be associated with number of movement systems 628 through connection member 652. In particular, adjustable retaining structure 655 may be rotatably associated with connection member 652 in a manner that forms spherical interface 654. Spherical interface 654 may take the form of pinch point interface 656 in one specific example. Adjustable retaining structure 655 may be capable of passively rotating about spherical interface 654 to rotate about X-axis 634, Y-axis 636, and Z-axis 638.

Spherical interface 654 may enable passive positioning, and thereby adjustment, of adjustable retaining structure 655 in response to a panel, such as one of keel panels 222 in FIG. 2, engaging adjustable retaining structure 655. In other words, adjustable retaining structure 655 may passively rotate about spherical interface 654. Adjustable retaining structure 655 may be passively rotated about spherical interface 654 as a panel applies a load to adjustable retaining structure 655. The panel may be, for example, panel 216 in FIG. 2, which may be one of keel panels 222 from FIG. 2 in one example.

For example, when a panel, such as one of keel panels 222 in FIG. 2, is engaged with adjustable retaining structure 655, contact with the panel may cause adjustable retaining structure 655 to passively rotate about at least one of X-axis 634, Y-axis 636, or Z-axis 638 to ensure that curved shape 618 of adjustable retaining structure 655 matches the curvature of the portion of the panel that engages adjustable retaining structure 655. In particular, the panel may load adjustable retaining structure 655 in a manner that causes adjustable retaining structure 655 to passively rotate about spherical interface 654 until a desired contact fit between the panel and adjustable retaining structure 655 is achieved.

In this manner, adjustable retaining structure 655 impinging on the panel may force passive alignment of adjustable retaining structure 655. In other words, adjustable retaining structure 655 may impinge on the panel and thereby, force alignment of adjustable retaining structure 655 with the panel.

In this illustrative example, number of movement systems 628 may be associated with connection member 652. In one illustrative example, vertical movement system 642 may include at least one scissor lift mechanism 657. Scissor lift mechanism 657 may be used to move connection member 652, and thereby adjustable retaining structure 655 associated with connection member 652, relative to Z-axis 638. For example, adjustable retaining structure 655 may be moved vertically substantially along Z-axis 638.

Horizontal movement system 640 may be used to move connection member 652, and thereby adjustable retaining structure 655, along at least one of X-axis 634 or Y-axis 636. In some cases, number of movement systems 628 may include two horizontal movement systems that allow connection member 652, and thereby adjustable retaining structure 655, to rotate about Z-axis 638.

In this manner, number of movement systems 628 may be used to provide different types of movement relative to X-axis 634, Y-axis 636, Z-axis 638, or some combination thereof for adjustable retaining structure 655 at different times or simultaneously. In particular, movement along X-axis 634, about X-axis 634, along Y-axis 636, about Y-axis 636, along Z-axis 638, about Z-axis 638, or some combination thereof may be performed concurrently, at different times, or in some other manner to position adjustable retaining structure 655 in selected retaining position 635.

As depicted, set of sensors 658 may be associated with retaining structure 616. Set of sensors 658 may include one or more sensors that may be used to aid in positioning retaining structure 616 relative to a panel in plurality of panels 120 in FIGS. 1-4. Set of sensors 658 may be used to guide, for example, without limitation, vertical movement system 642.

As one illustrative example, number of retaining structures 614 may include two other retaining structures in addition to retaining structure 616. These two retaining structures may be, for example, a forward retaining structure and an aft retaining structure. The forward retaining structure and the aft retaining structure may be positioned using movement systems prior to a panel, such as one of keel panels 222 in FIG. 2 being received. Once the panel has been received, number of movement systems 628 and set of sensors 658 may be used to move connection member 652, and thereby retaining structure 616, into a position relative to the panel. Retaining structure 616 may then passively rotate into alignment with the panel such that retaining structure 616 is in selected retaining position 635 that will support outer mold line requirements for fuselage assembly 114.

Number of cradle fixtures 314 may be positioned and configured within assembly area 304 in FIG. 3 to form assembly fixture 324, as described above in FIG. 3. In one illustrative example, number of cradle fixtures 314 includes first cradle fixture 660, second cradle fixture 662, and third cradle fixture 664. First cradle fixture 660, second cradle fixture 662, and third cradle fixture 664 may support and hold plurality of fuselage sections 205 for fuselage assembly 114.

In some illustrative examples, number of fixtures 313 from FIG. 3 may include fixture 665 in addition to number of cradle fixtures 314. Fixture 665 may be used to form a part of assembly fixture 324. Fixture 665 may be used to support and hold one of plurality of fuselage sections 205. Depending on the implementation, fixture 665 may be permanently or removably associated with one of number of cradle fixtures 314. In other cases, fixture 665 may be separate from number of cradle fixtures 314.

The illustrations in FIGS. 1-6 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, more than one flexible manufacturing system may be present within manufacturing environment 100. These multiple flexible manufacturing systems may be used to build multiple fuselage assemblies within manufacturing environment 100. In other illustrative examples, flexible manufacturing system 106 may include multiple cradle systems, multiple tower systems, multiple utility systems, multiple autonomous tooling systems, and multiple pluralities of autonomous vehicles such that multiple fuselage assemblies may be built within manufacturing environment 100.

In some illustrative examples, utility system 138 may include multiple utility fixtures that are considered separate from flexible manufacturing system 106. Each of these multiple utility fixtures may be configured for use with flexible manufacturing system 106 and any number of other flexible manufacturing systems.

Additionally, the different couplings of mobile systems in plurality of mobile systems 134 may be performed autonomously in these illustrative examples. However, in other illustrative example, a coupling of one of plurality of mobile systems 134 to another one of plurality of mobile systems 134 may be performed manually in other illustrative examples.

Further, in other illustrative examples, one or more of plurality of mobile systems 134 may be drivable by, for example, without limitation, a human operator. For example, without limitation, in some cases, first tower 332 may be drivable with human guidance.

Figure 7:
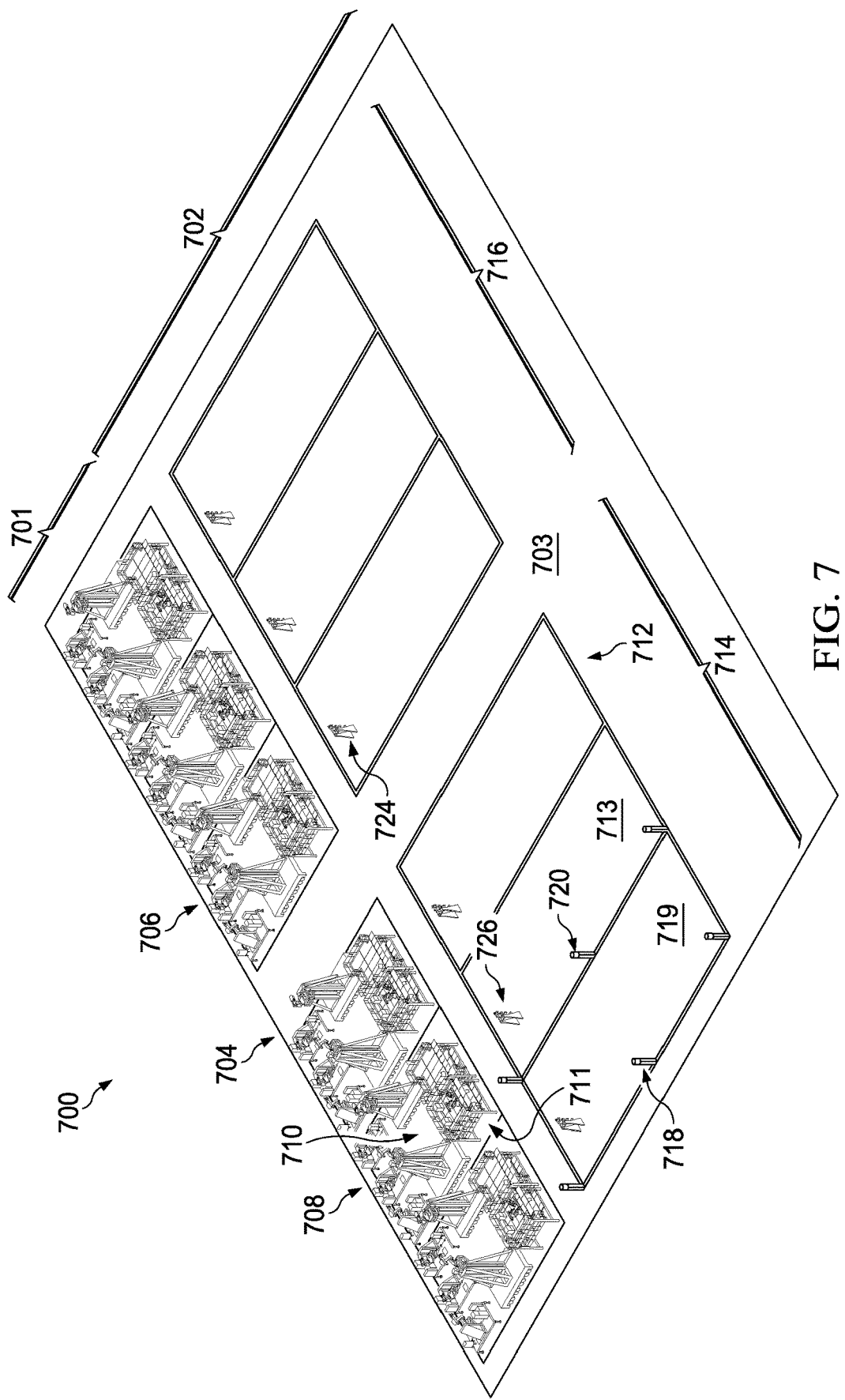
FIG. 7 is an illustration of an isometric view of a manufacturing environment in accordance with an illustrative embodiment.

With reference now to FIG. 7, an illustration of an isometric view of a manufacturing environment is depicted in accordance with an illustrative embodiment. In this illustrative example, manufacturing environment 700 may be an example of one implementation for manufacturing environment 100 in FIG. 1.

As depicted, manufacturing environment 700 may include holding environment 701 and assembly environment 702. Holding environment 701 may be a designated area on and over floor 703 of manufacturing environment 700 for storing plurality of flexible manufacturing systems 706 when plurality of flexible manufacturing systems 706 are not in use. Each of plurality of flexible manufacturing systems 706 may be an example of one implementation for flexible manufacturing system 106 described in FIGS. 1 and 3-5. In particular, each of plurality of flexible manufacturing systems 706 may be an example of one implementation for autonomous flexible manufacturing system 112 in FIG. 1.

Holding environment 701 may include plurality of holding cells 704. In this illustrative example, each of plurality of holding cells 704 may be considered an example of one implementation for holding area 318 in FIG. 3. In other illustrative examples, the entire holding environment 701 may be considered an example of one implementation for holding area 318 in FIG. 3.

Each of plurality of flexible manufacturing systems 706 may be stored in a corresponding one of plurality of holding cells 704. In particular, each of plurality of holding cells 704 may be designated for a specific one of plurality of flexible manufacturing systems 706. However, in other illustrative examples, any one of plurality of holding cells 704 may be used for storing any one of plurality of flexible manufacturing systems 706.

As depicted, flexible manufacturing system 708 may be an example of one of plurality of flexible manufacturing systems 706. Flexible manufacturing system 708 may include plurality of mobile systems 711, which may be an example of one implementation for plurality of mobile systems 134 in FIGS. 1 and 3.

Flexible manufacturing system 708 may be stored in holding cell 710 of plurality of holding cells 704. In this example, all of holding environment 701 may be considered an example of one implementation for holding area 318 in FIG. 3. However, in other examples, each of plurality of holding cells 704 in holding environment 701 may be considered an example of one implementation for holding area 318 in FIG. 3.

Floor 703 of manufacturing environment 700 may be substantially smooth to allow the various components and systems of plurality of flexible manufacturing systems 706 to be autonomously driven across floor 703 of manufacturing environment 700 with ease. When one of plurality of flexible manufacturing systems 706 is ready for use, that flexible manufacturing system may be driven across floor 703 from holding environment 701 into assembly environment 702.

Assembly environment 702 may be the designated area on and above floor 703 for building fuselage assemblies. When none of plurality of flexible manufacturing systems 706 are in use, floor 703 of assembly environment 702 may be kept substantially open and substantially clear.

As depicted, assembly environment 702 may include plurality of work cells 712. In one illustrative example, each of plurality of work cells 712 may be an example of one implementation for assembly area 304 in FIG. 3. Thus, each of plurality of work cells 712 may be designated for performing a fuselage assembly process, such as assembly process 110 in FIG. 1, for building fuselage assembly 114 in FIG. 1. In other illustrative examples, the entire assembly environment 702 may be considered an example of one implementation for assembly area 304 in FIG. 3.

In this illustrative example, first portion 714 of plurality of work cells 712 may be designated for building forward fuselage assemblies, such as forward fuselage assembly 117 in FIG. 1, while second portion 716 of plurality of work cells 712 may be designated for building aft fuselage assemblies, such as aft fuselage assembly 116 in FIG. 1. In this manner, plurality of work cells 712 may allow multiple fuselage assemblies to be built concurrently. Depending on the implementation, the building of these fuselage assemblies may begin at the same time or at different times in plurality of work cells 712.

In one illustrative example, plurality of mobile systems 711 that belong to flexible manufacturing system 708 may be driven across floor 703 from holding cell 710 into work cell 713. Within work cell 713, plurality of mobile systems 711 may be used to build a fuselage assembly (not shown).

An example of one manner in which this fuselage assembly may be built using flexible manufacturing system 708 is described in greater detail in FIGS. 8-18 below.

In some illustrative examples, a sensor system may be associated with one or more of plurality of work cells 712. For example, without limitation, in some cases, sensor system 718 may be associated with work cell 719 of plurality of work cells 712. Sensor data generated by sensor system 718 may be used to help drive the various mobile systems of the corresponding one of plurality of flexible manufacturing systems 706 designated for building a fuselage assembly within work cell 719. In one illustrative example, sensor system 718 may take the form of metrology system 720.

Depending on the implementation, sensor system 718 may be optional. For example, without limitation, other sensor systems are not depicted associated with other work cells of plurality of work cells 712. Not using sensors systems such as sensor system 718 may help keep floor 703 of manufacturing environment 700 more open and clear to help the various mobile systems of plurality of flexible manufacturing systems 706 be driven more freely across floor 703.

As depicted, plurality of utility fixtures 724 may be permanently affixed to floor 703. Each of plurality of utility fixtures 724 may be an example of one implementation for utility fixture 150 in FIG. 1.

Plurality of utility fixtures 724 may be interfaced with a number of utility sources (not shown in this view). These utility sources (not shown) may be, for example, without limitation, located beneath floor 703. Utility fixture 726 may be an example of one of plurality of utility fixtures 724.

In this illustrative example, each of plurality of utility fixtures 724 is located in a corresponding one of plurality of work cells 712. Any one of plurality of flexible manufacturing systems 706 may be driven towards and interfaced with any one of plurality of utility fixtures 724. In this manner, plurality of utility fixtures 724 may be used to provide one or more utilities to plurality of flexible manufacturing systems 706.

Referring now to FIGS. 8-18, illustrations of the building of a fuselage assembly within manufacturing environment 700 from FIG. 7 are depicted in accordance with an illustrative embodiment. In FIGS. 8-18, flexible manufacturing system 708 from FIG. 7 may be used to build a fuselage assembly. The building of the fuselage assembly may be performed within any one of plurality of work cells 712 in FIG. 7. For example, without limitation, the building of the fuselage assembly may be performed within one of the work cells in second portion 716 of plurality of work cells 712 in FIG. 7.

Figure 8:
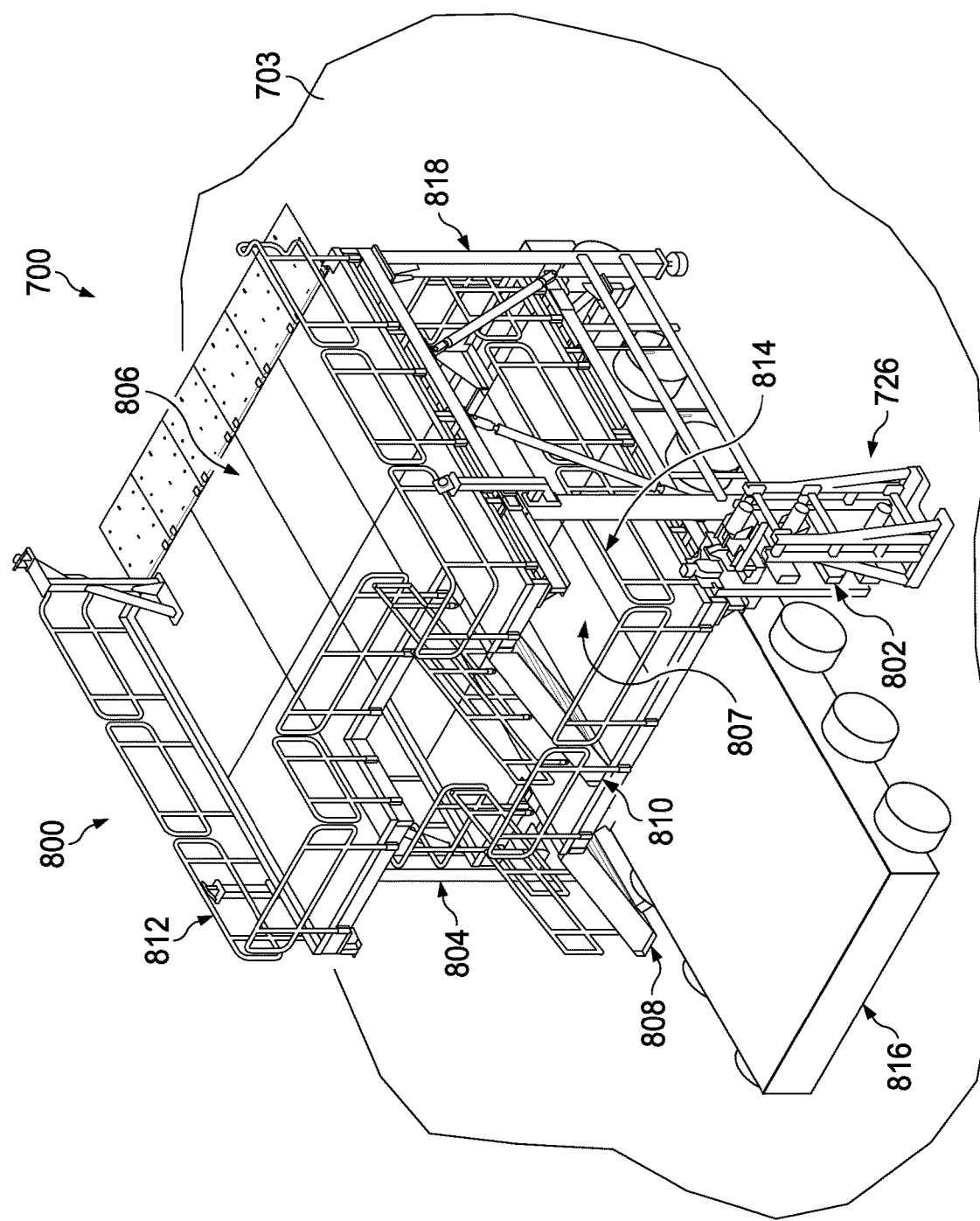
FIG. 8 is an illustration of a first tower coupled to a utility fixture in accordance with an illustrative embodiment.

Turning now to FIG. 8, an illustration of an isometric view of a first tower coupled to utility fixture 726 from FIG. 7 is depicted in accordance with an illustrative embodiment. In this illustrative example, first tower 800 may be coupled to utility fixture 726. First tower 800 may be an example of one of plurality of mobile systems 711 of flexible manufacturing system 708 in FIG. 7. In particular, first tower 800 may be an example of one implementation for first tower 334 in FIG. 3.

First tower 800 may be at least one of electrically and physically coupled to utility fixture 726 such that interface 802 is formed between first tower 800 and utility fixture 726. Interface 802 may be an example of one implementation for interface 342 in FIG. 3.

As depicted, first tower 800 may have base structure 804. Base structure 804 may include top platform 806 and bottom platform 807. In some cases, top platform 806 and bottom platform 807 may be referred to as top platform level and a bottom platform level, respectively. Top platform 806 may be used to provide a human operator with access to a top floor of a fuselage assembly (not shown), such as a passenger floor inside the fuselage assembly. Bottom platform 807 may be used to provide a human operator with access to a bottom floor of the fuselage assembly (not shown), such as a cargo floor inside the fuselage assembly.

In this illustrative example, walkway 808 may provide access from a floor, such as floor 703 in FIG. 7, to bottom platform 807. Walkway 810 may provide access from bottom platform 807 to top platform 806. Railing 812 is associated with top platform 806 for the protection of a human operator moving around on top platform 806. Railing 814 is associated with bottom platform 807 for the protection of a human operator moving around on bottom platform 807.

First tower 800 may be autonomously driven across floor 703 using autonomous vehicle 816. Autonomous vehicle 816 may be an automated guided vehicle (AGV) in this example. Autonomous vehicle 816 may be an example of one of plurality of autonomous vehicles 306 in FIG. 3. As depicted, autonomous vehicle 816 may be used to drive first tower 800 from holding environment 701 in FIG. 7 to selected tower position 818 relative to utility fixture 726. Selected tower position 818 may be an example of one implementation for selected tower position 338 in FIG. 3.

Once first tower 800 has been autonomously driven into selected tower position 818, first tower 800 may autonomously couple to utility fixture 726. In particular, first tower 800 may electrically and physically couple to utility fixture 726 autonomously to form interface 802. This type of coupling may enable a number of utilities to flow from utility fixture 726 to first tower 800. In this manner, first tower 800 and utility fixture 726 may establish at least a portion of a distributed utility network, similar to distributed utility network 144 described in FIGS. 1 and 5.

Figure 9:
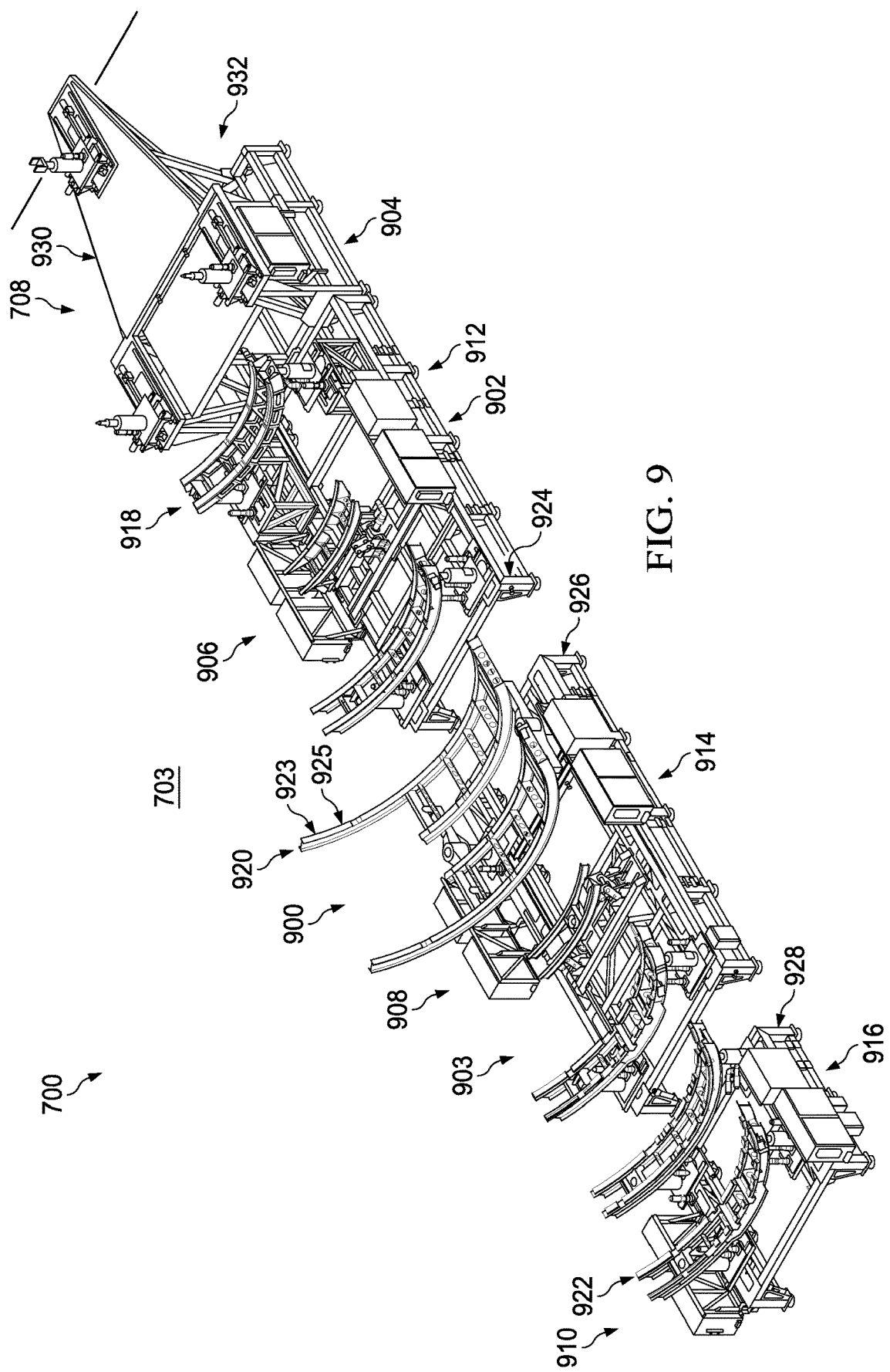
FIG. 9 is an illustration of an isometric view of a cradle system in accordance with an illustrative embodiment.

With reference now to FIG. 9, an illustration of an isometric view of a cradle system is depicted in accordance with an illustrative embodiment. In this illustrative example, cradle system 900 may be an example of one implementation for cradle system 308 in FIG. 3. Further, cradle system 900 may be an example of one of plurality of mobile systems 711 of flexible manufacturing system 708 in FIG. 7. In this manner, cradle system 900 may be an example of one of plurality of mobile systems 711 that are stored in holding cell 710 in FIG. 7.

As depicted, cradle system 900 may be comprised of number of fixtures 903. Number of fixtures 903 may be an example of one implementation for number of fixtures 313 in FIG. 3. Number of fixtures 903 may include number of cradle fixtures 902 and fixture 904. Number of cradle fixtures 902 may be an example of one implementation for number of cradle fixtures 314 in FIG. 3.

Number of cradle fixtures 902 may include cradle fixture 906, cradle fixture 908, and cradle fixture 910. Fixture 904 may be fixedly associated with cradle fixture 906. In this illustrative example, fixture 904 may be considered part of cradle fixture 906. However, in other illustrative examples, fixture 904 may be considered a separate fixture from cradle fixture 906.

As depicted, cradle fixture 906, cradle fixture 908, and cradle fixture 910 have base 912, base 914, and base 916, respectively. Number of retaining structures 918 may be associated with base 912. Number of retaining structures 920 may be associated with base 914. Number of retaining structures 922 may be associated with base 916. Each of number of retaining structures 918, number of retaining structures 920, and number of retaining structures 922 may be an example of an implementation for number of retaining structures 326 in FIG. 3.

Each retaining structure in number of retaining structures 918, number of retaining structures 920, and number of retaining structures 922 may have a curved shape that substantially matches a curvature of a corresponding fuselage section to be received by the retaining structure. Retaining structure 923 may be an example of one of number of retaining structures 920. As depicted, retaining structure 923 may have curved shape 925.

Curved shape 925 may be selected such that curved shape 925 substantially matches a curvature of a corresponding keel panel (not shown) that is to be engaged with retaining structure 923. More specifically, retaining structure 923 may have a substantially same radius of curvature as a corresponding keel panel (not shown) that is to be engaged with retaining structure 923.

In this illustrative example, plurality of stabilizing members 924, plurality of stabilizing members 926, and plurality of stabilizing members 928 may be associated with base 912, base 914, and base 916, respectively. Plurality of stabilizing members 924, plurality of stabilizing members 926, and plurality of stabilizing members 928 may be used to stabilize base 912, base 914, and base 916, respectively, relative to floor 703 of manufacturing environment 700.

In one illustrative example, these stabilizing members may keep their respective bases substantially level relative to floor 703. Further, each of plurality of stabilizing members 924, plurality of stabilizing members 926, and plurality of stabilizing members 928 may substantially support their respective base until that base is to be moved to a new location within or outside of manufacturing environment 700. In one illustrative example, each stabilizing member of plurality of stabilizing members 924, plurality of stabilizing members 926, and plurality of stabilizing members 928 may be implemented using a hydraulic leg.

Each of number of fixtures 903 may be used to support and hold a corresponding fuselage section (not shown) for a fuselage assembly (not shown) for an aircraft (not shown), such as one of plurality of fuselage sections 205 for fuselage assembly 114 for aircraft 104 in FIG. 2. For example, without limitation, fixture 904 may have platform 930 associated with base 932. Platform 930 may be configured to support and hold a forward fuselage section (not shown) or an aft fuselage section (not shown) for the aircraft (not shown), depending on the implementation. The forward fuselage section (not shown) may be the portion of the fuselage assembly (not shown) that is to be closest to the nose of the aircraft (not shown). The aft fuselage section (not shown) may be the portion of the fuselage assembly (not shown) that is to be closest to the tail of the aircraft (not shown).

Figure 10:
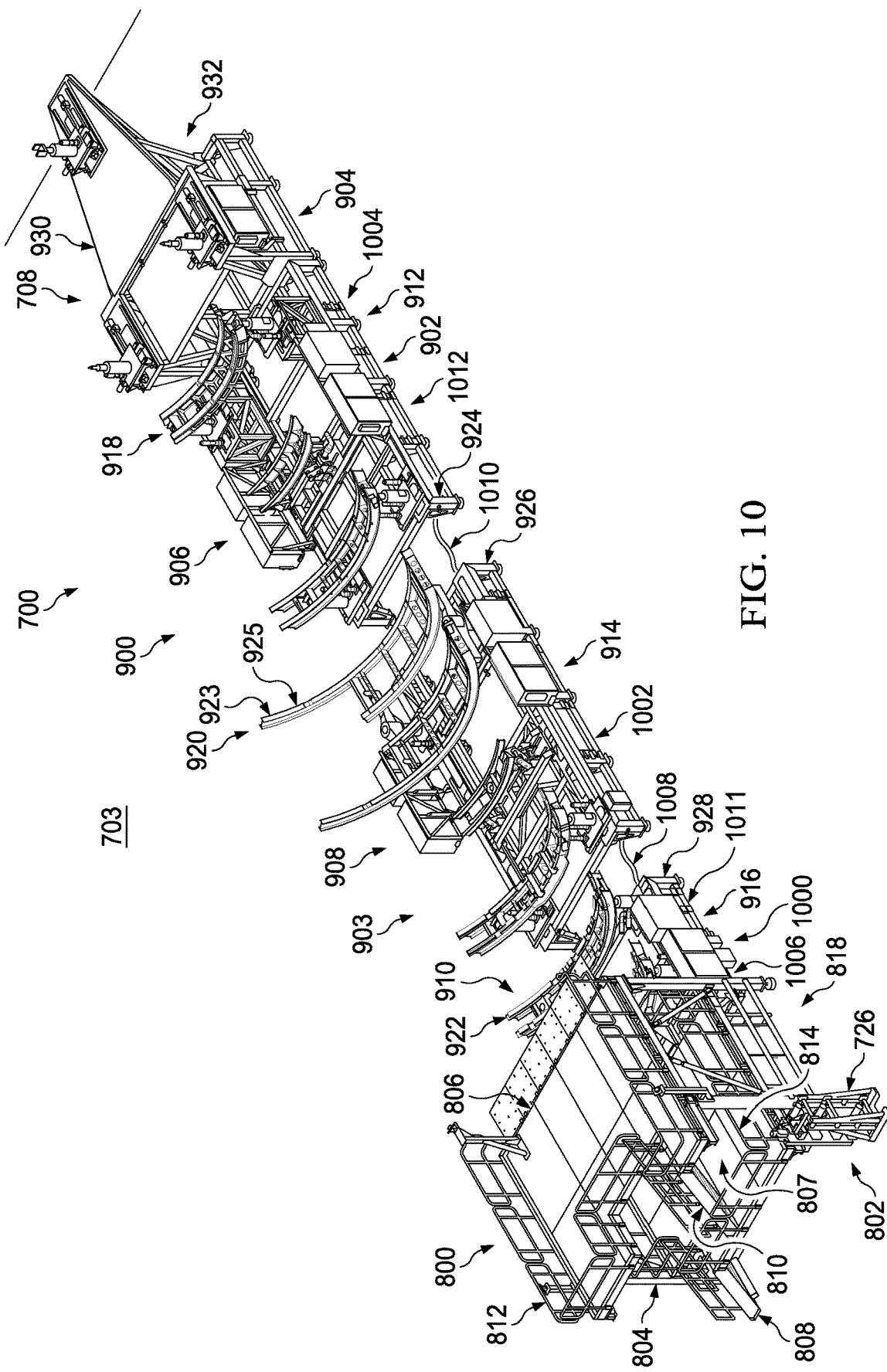
FIG. 10 is an illustration of an isometric view of an assembly fixture formed using a cradle system and coupled to a first tower in accordance with an illustrative embodiment.

With reference now to FIG. 10, an illustration of an isometric view of an assembly fixture formed using cradle system 900 from FIG. 9 and coupled to first tower 800 from FIG. 8 is depicted in accordance with an illustrative embodiment. In this illustrative example, cradle fixture 910 is coupled to first tower 800 and cradle fixture 910, cradle fixture 906, and cradle fixture 908 are coupled to each other.

Cradle fixture 910, cradle fixture 908, and cradle fixture 906 may have been autonomously driven across floor 703 of manufacturing environment 700 to selected cradle position 1000, selected cradle position 1002, and selected cradle position 1004, respectively, using a number of corresponding autonomous vehicles (not shown), such as number of corresponding autonomous vehicles 316 from FIG. 3. Driving cradle fixture 906 may also cause fixture 904 to be driven when fixture 904 is part of cradle fixture 906 as shown. Selected cradle position 1000, selected cradle position 1002, and selected cradle position 1004 may be an example of one implementation for number of selected cradle positions 320 in FIG. 3.

After driving cradle fixture 910, cradle fixture 908, and cradle fixture 906 to selected cradle position 1000, selected cradle position 1002, and selected cradle position 1004, respectively, the number of corresponding autonomous vehicles (not shown) may be autonomously driven away. In other illustrative examples, the number of corresponding autonomous vehicles (not shown) may be integrated as part of cradle fixture 910, cradle fixture 908, and cradle fixture 906.

Selected cradle position 1000 may be a position relative to selected tower position 818 of first tower 800. When cradle fixture 910 is in selected cradle position 1000 relative to first tower 800, cradle fixture 910 may be electrically and physically coupled to first tower 800 to form interface 1006. In some cases, cradle fixture 910 may be coupled to first tower 800 autonomously to form interface 1006. In one illustrative example, interface 1006 may be formed by autonomously coupling cradle fixture 910 to first tower 800. Interface 1006 may be an electrical and physical interface that enables a number of utilities that are flowing from utility fixture 726 to first tower 800 to also flow to cradle fixture 910. In this manner, interface 1006 may be formed by autonomously coupling a number of utilities between cradle fixture 910 and first tower 800. Interface 1006 may be an example of one implementation for interface 340 in FIG. 3. In this illustrative example, cradle fixture 910, being coupled to first tower 800, may be referred to as primary cradle fixture 1011.

Further, as depicted, cradle fixture 906, cradle fixture 908, and cradle fixture 910 may be coupled to each other. In particular, cradle fixture 908 may be coupled to cradle fixture 910 to form interface 1008. Similarly, cradle fixture 906 may be coupled to cradle fixture 908 to form interface 1010. In one illustrative example, both interface 1008 and interface 1010 may be formed by autonomously coupling these cradle fixtures to each other.

In particular, interface 1008 and interface 1010 may take the form of electrical and physical interfaces that enable the number of utilities to flow from cradle fixture 910, to cradle fixture 908, and to cradle fixture 906. In this manner, interface 1008 may be formed by autonomously coupling the number of utilities between cradle fixture 910 and cradle fixture 908 and interface 1010 may be formed by autonomously coupling the number of utilities between cradle fixture 908 and cradle fixture 906. In this manner, number of utilities 146 may be autonomously coupled between adjacent cradle fixtures in number of cradle fixtures 314.

Thus, when utility fixture 726, first tower 800, cradle fixture 910, cradle fixture 908, and cradle fixture 906 are all coupled in series as described above, the number of utilities may be distributed downstream from utility fixture 726 to first tower 800, cradle fixture 910, cradle fixture 908, and cradle fixture 906. In this illustrative example, any utilities that flow to cradle fixture 906 may also be distributed to fixture 904.

Any number of coupling units, structural members, connection devices, cables, other types of elements, or combination thereof may be used to form interface 1008 and interface 1010. Depending on the implementation, interface 1008 and interface 1010 may take the form of coupling units that both physically and electrically connect cradle fixture 910, cradle fixture 908, and cradle fixture 906 to each other. In other illustrative examples, interface 1008 and interface 1010 may be implemented in some other manner.

When cradle fixture 910, cradle fixture 908, and cradle fixture 906 are in selected cradle position 1000, selected cradle position 1002, and selected cradle position 1004, respectively, and coupled to each other, these cradle fixtures together form assembly fixture 1012. Assembly fixture 1012 may be an example of one implementation for assembly fixture 324 in FIG. 3. In this manner, interface 1006 between first tower 800 and cradle fixture 910 may also be considered an electrical and physical interface between first tower 800 and assembly fixture 1012.

Figure 11:
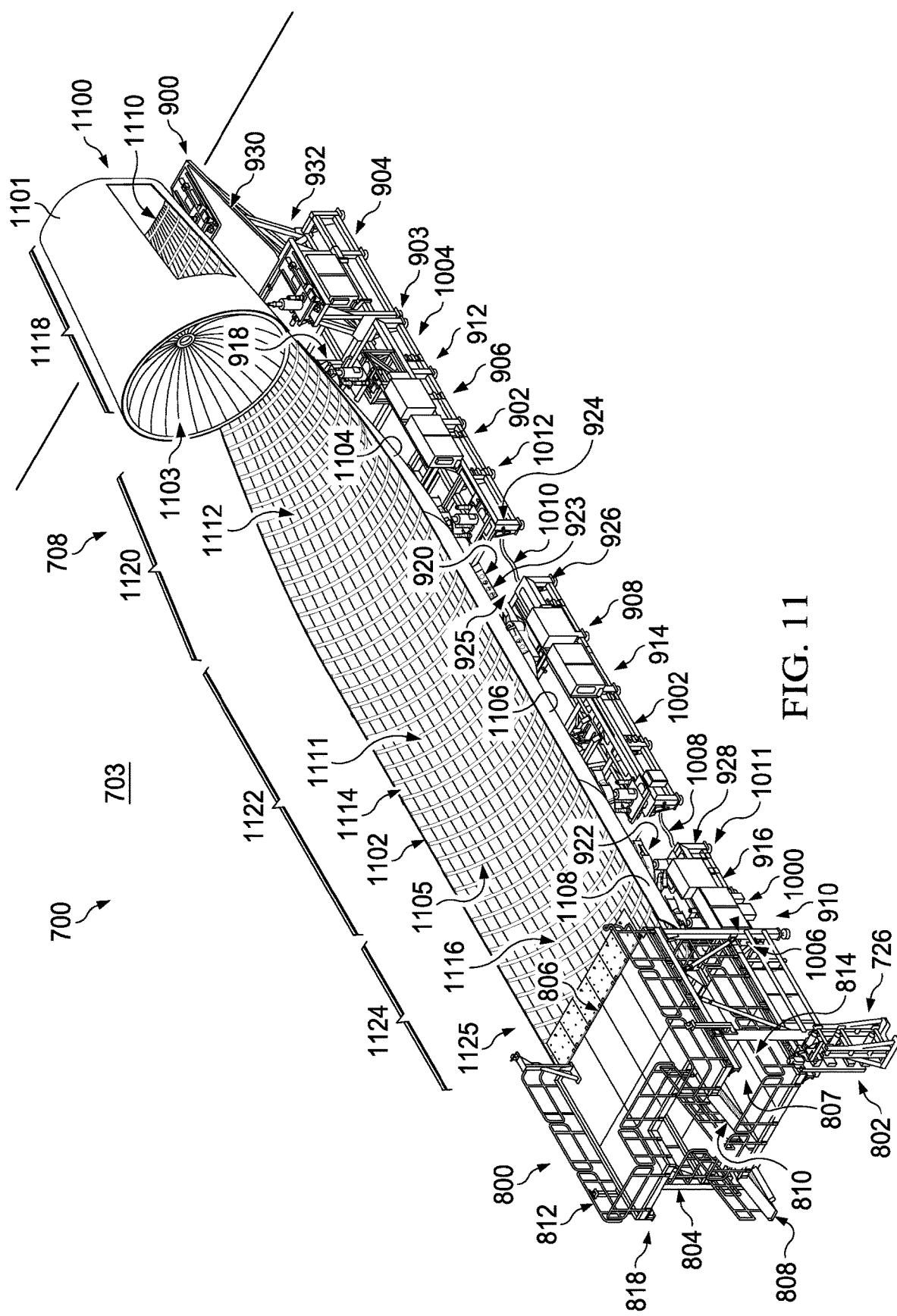
FIG. 11 is an illustration of an isometric view of one stage in the assembly process for building a fuselage assembly that is being supported by an assembly fixture in accordance with an illustrative embodiment.

With reference now to FIG. 11, an illustration of an isometric view of one stage in the assembly process for building a fuselage assembly that is being supported by assembly fixture 1012 from FIG. 10 is depicted in accordance with an illustrative embodiment. In this illustrative example, assembly fixture 1012 may support fuselage assembly 1100 as fuselage assembly 1100 is built on assembly fixture 1012.

Fuselage assembly 1100 may be an aft fuselage assembly that is an example of one implementation for aft fuselage assembly 116 in FIG. 1. Fuselage assembly 1100 may be partially assembled in this illustrative example. Fuselage assembly 1100 may be at an early stage of assembly in this example.

At this stage of the assembly process, fuselage assembly 1100 includes end panel 1101 and plurality of keel panels 1102. End panel 1101 may have a tapered cylindrical shape in this illustrative example. In this manner, one portion of end panel 1101 may form part of the keel 1105 for fuselage assembly 1100, another portion of end panel 1101 may form part of the sides (not fully shown) for fuselage assembly 1100, and yet another portion of end panel 1101 may form part of a crown (not fully shown) for fuselage assembly 1100.

Further, as depicted, bulkhead 1103 may be associated with end panel 1101. Bulkhead 1103 may be a pressure bulkhead. Bulkhead 1103 may be an example of one implementation for bulkhead 272 in FIG. 2.

Plurality of keel panels 1102 include keel panel 1104, keel panel 1106, and keel panel 1108. End panel 1101 and plurality of keel panels 1102 have been engaged with assembly fixture 1012. In particular, end panel 1101 has been engaged with fixture 904. Keel panel 1104, keel panel 1106, and keel panel 1108 have been engaged with cradle fixture 906, cradle fixture 908, and cradle fixture 910, respectively.

In one illustrative example, end panel 1101 is first engaged with fixture 904 with keel panel 1104, keel panel 1106, and keel panel 1108 then being successively engaged with cradle fixture 906, cradle fixture, 908, and cradle fixture 910, respectively. In this manner, keel 1105 of fuselage assembly 1100 may be assembled in a direction from the aft end of fuselage assembly 1100 to the forward end of fuselage assembly 1100.

Each of cradle fixture 906, cradle fixture 908, and cradle fixture 910 may be at least one of autonomously or manually adjusted, as needed, to accommodate plurality of keel panels 1102 such that fuselage assembly 1100 may be built to meet outer mold line requirements and inner mold line requirements within selected tolerances. In some cases, at least one of cradle fixture 906, cradle fixture 908, and cradle fixture 910 may have at least one retaining structure that can be adjusted to adapt to the shifting of fuselage assembly 1100 during the assembly process due to increased loading as fuselage assembly 1100 is built.

As depicted, members 1111 may be associated with end panel 1101 and plurality of keel panels 1102. Members 1111 may include frames and stringers in this illustrative example. However, depending on the implementation, members 1111 may also include, without limitation, stiffeners, stanchions, intercostal structural members, connecting members, other types of structural members, or some combination thereof. The connecting members may include, for example, without limitation, shear clips, ties, splices, intercostal connecting members, other types of mechanical connecting members, or some combination thereof.

The portion of members 1111 attached to end panel 1101 may form support section 1110. The portions of members 1111 attached to keel panel 1104, keel panel 1106, and keel panel 1108 may form support section 1112, support section 1114, and support section 1116, respectively.

In this illustrative example, end panel 1101 may form fuselage section 1118 for fuselage assembly 1100. Each of keel panel 1104, keel panel 1106, and keel panel 1108 may form a portion of fuselage section 1120, fuselage section 1122, and fuselage section 1124, respectively, for fuselage assembly 1100. Fuselage section 1118, fuselage section 1120, fuselage section 1122, and fuselage section 1124 may together form plurality of fuselage sections 1125 for fuselage assembly 1100. Each of fuselage section 1118, fuselage section 1120, fuselage section 1122, and fuselage section 1124 may be an example of one implementation for fuselage section 207 in FIG. 2.

End panel 1101 and plurality of keel panels 1102 may be temporarily connected together using temporary fasteners such as, for example, without limitation, tack fasteners. In particular, end panel 1101 and plurality of keel panels 1102 may be temporarily connected to each other as each of the panels is engaged with assembly fixture 1012 and other panels.

For example, without limitation, coordination holes (not shown) may be present at the edges of end panel 1101 and each of plurality of keel panels 1102. In some cases, a coordination hole may pass through a panel and at least one of members 1111 associated with the panel. Engaging one panel with another panel may include aligning these coordination holes such that temporary fasteners, such as tack fasteners, may be installed in these coordination holes. In some cases, engaging one panel with another panel may include aligning a coordination hole through one panel with a coordination hole through one of members 1111 associated with another panel.

In yet another illustrative example, engaging a first panel with another panel may include aligning the edges of the two panels to form a butt splice. These two panels may then be temporarily connected together by aligning a first number of coordination holes in, for example, a splice plate, with a corresponding number of holes on the first panel and aligning a second number of coordination holes in that splice plate with a corresponding number of holes on the second panel. Temporary fasteners may then be inserted through these aligned coordination holes to temporarily connect the first panel to the second panel.

In this manner, panels and members may be engaged with each other and temporarily connected together in a number of different ways. Once end panel 1101 and plurality of keel panels 1102 have been temporarily connected together, assembly fixture 1012 may help maintain the position and orientation of end panel 1101 and each of plurality of keel panels 1102 relative to each other.

Figure 12:
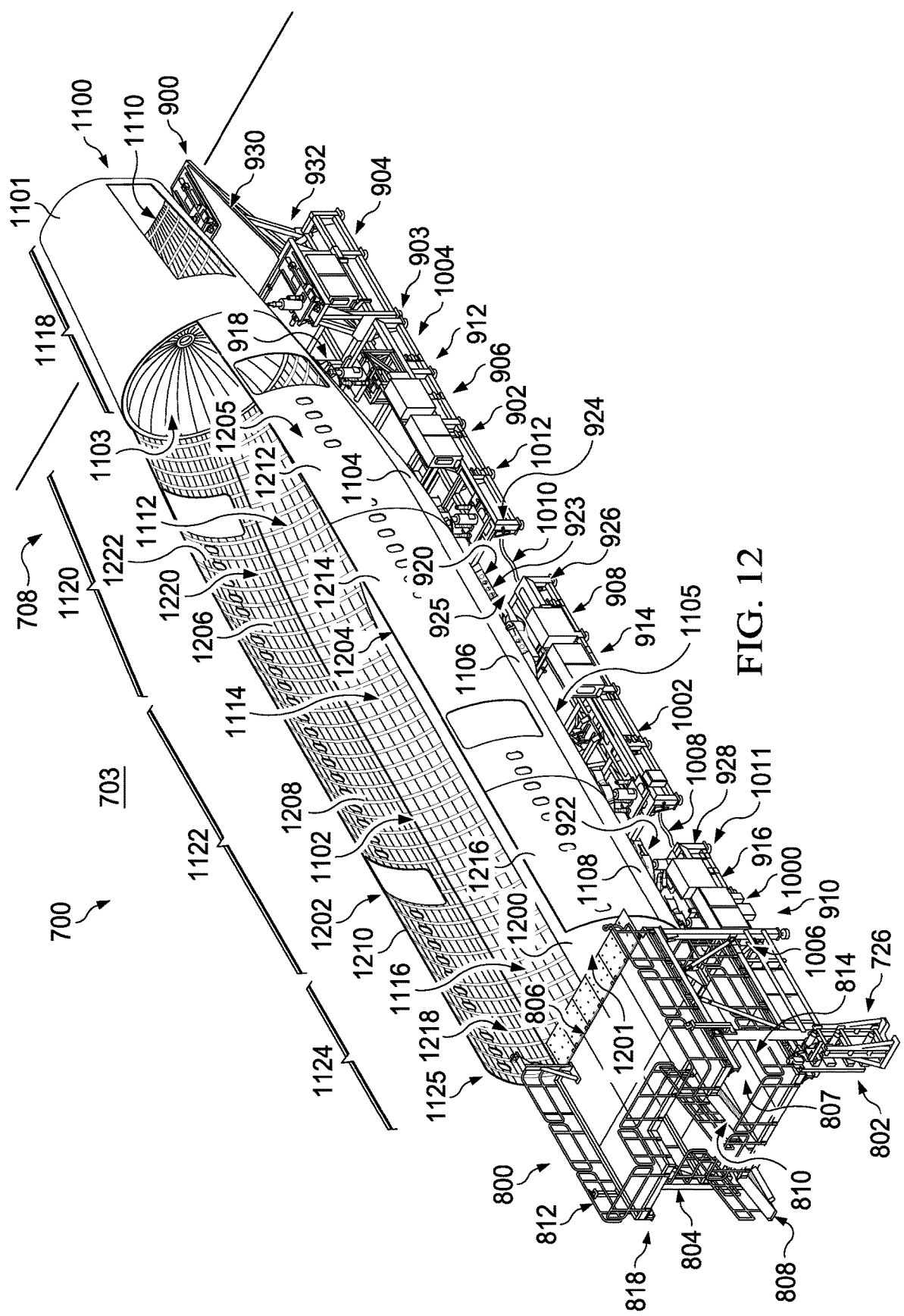
FIG. 12 is an illustration of an isometric view of another stage in the assembly process for building a fuselage assembly being supported by an assembly fixture in accordance with an illustrative embodiment.

Turning now to FIG. 12, an illustration of an isometric view of another stage in the assembly process for building a fuselage assembly is depicted in accordance with an illustrative embodiment. In this illustrative example, cargo floor 1200 has been added to fuselage assembly 1100. In particular, cargo floor 1200 may be associated with plurality of keel panels 1102.

As depicted, at least a portion of cargo floor 1200 may be substantially level with bottom platform 807 of first tower 800. In particular, at least the portion of cargo floor 1200 nearest first tower 800 may be substantially aligned with bottom platform 807 of first tower 800. In this manner, a human operator (not shown) may use bottom platform 807 of first tower 800 to easily walk onto cargo floor 1200 and access interior 1201 of fuselage assembly 1100.

As depicted, first side panels 1202 and second side panels 1204 have been added to fuselage assembly 1100. First side panels 1202 and second side panels 1204 may be an example of one implementation for first side panels 224 and second side panels 226, respectively, in FIG. 2. First side panels 1202, second side panels 1204, and a first and second portion of end panel 1101 may form sides 1205 of fuselage assembly 1100. In this illustrative example, plurality of keel panels 1102, end panel 1101, first side panels 1202, and second side panels 1204 may all be temporarily connected together using, for example, without limitation, tack fasteners.

First side panels 1202 may include side panel 1206, side panel 1208, and side panel 1210 that have been engaged with and temporarily connected to keel panel 1104, keel panel 1106, and keel panel 1108, respectively. Similarly, second side panels 1204 may include side panel 1212, side panel 1214, and side panel 1216 that have been engaged with and temporarily connected to keel panel 1104, keel panel 1106, and keel panel 1108, respectively. Further, both side panel 1206 and side panel 1212 have been engaged with end panel 1101.

As depicted, members 1218 may be associated with first side panels 1202. Other members (not shown) may be similarly associated with second side panels 1204. Members 1218 may be implemented in a manner similar to members 1111. In this illustrative example, corresponding portion 1220 of members 1218 may be associated with side panel 1206. Corresponding portion 1220 of members 1218 may form support section 1222 associated with side panel 1206. Support section 1222 may be an example of one implementation for support section 238 in FIG. 2.

Figure 13:
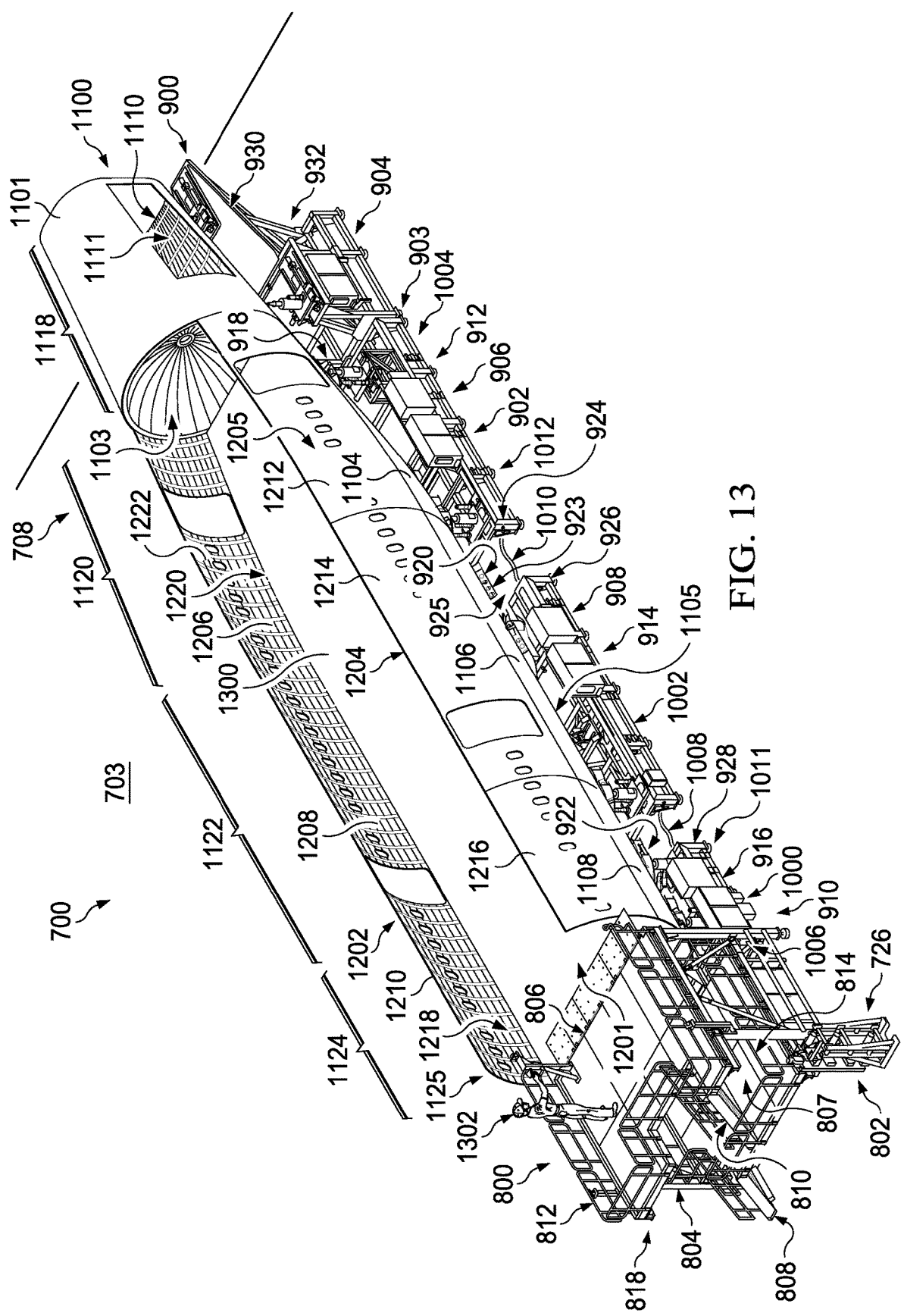
FIG. 13 is an illustration of an isometric view of another stage in the assembly process for building a fuselage assembly being supported by an assembly fixture in accordance with an illustrative embodiment.

With reference now to FIG. 13, an illustration of an isometric view of another stage in the assembly process for building a fuselage assembly is depicted in accordance with an illustrative embodiment. In this illustrative example, passenger floor 1300 has been added to fuselage assembly 1100. As depicted, passenger floor 1300 may be substantially level with top platform 806 of first tower 800. Human operator 1302 may use top platform 806 of first tower 800 to walk onto passenger floor 1300 and access interior 1201 of fuselage assembly 1100.

Figure 14:
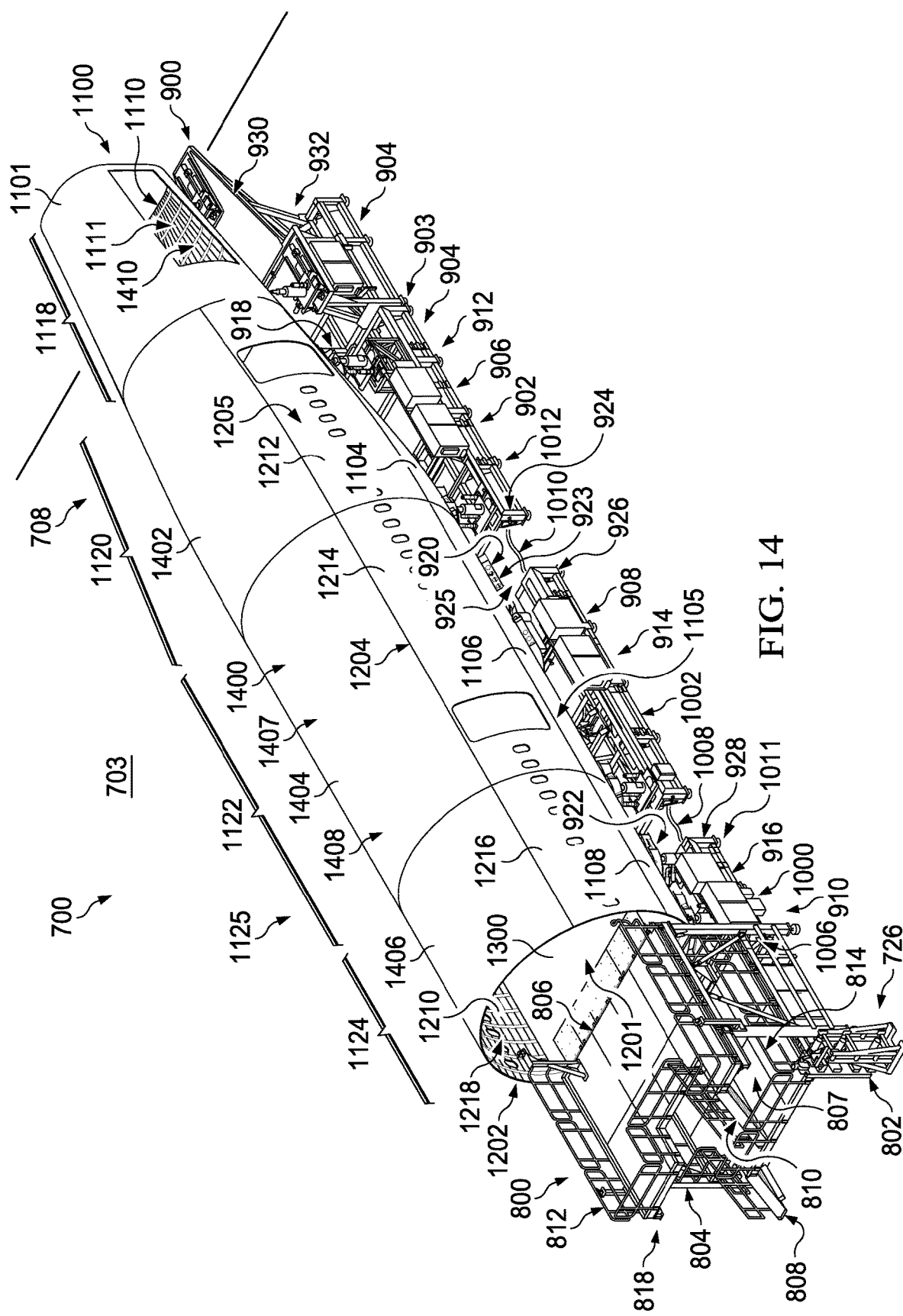
FIG. 14 is an illustration of an isometric view of another stage in the assembly process for building a fuselage assembly in accordance with an illustrative embodiment.

With reference now to FIG. 14, an illustration of an isometric view of another stage in the assembly process for building a fuselage assembly is depicted in accordance with an illustrative embodiment. In this illustrative example, plurality of crown panels 1400 have been added to fuselage assembly 1100. Plurality of crown panels 1400 may be an example of one implementation for crown panels 218 in FIG. 2.

In this illustrative example, plurality of crown panels 1400 may include crown panel 1402, crown panel 1404, and crown panel 1406. These crown panels along with a top portion of end panel 1101 may form crown 1407 of fuselage assembly 1100. Crown panel 1402 may be engaged with and temporarily connected to end panel 1101, side panel 1206 shown in FIG. 12, side panel 1212, and crown panel 1404. Crown panel 1404 may be engaged with and temporarily connected to crown panel 1402, crown panel 1406, side panel 1208 shown in FIG. 12, and side panel 1214. Further, crown panel 1406 may be engaged with and temporarily connected to crown panel 1404, side panel 1210, and side panel 1216.

Together, end panel 1101, plurality of keel panels 1102, first side panels 1202, second side panels 1204, and plurality of crown panels 1400 may form plurality of panels 1408 for fuselage assembly 1100. Plurality of panels 1408 may be an example of one implementation for plurality of panels 120 in FIG. 1.

Plurality of panels 1408 may all be temporarily connected to each other such that desired compliance with outer mold line requirements and inner mold line requirements may be maintained during the building of fuselage assembly 1100. In other words, temporarily connecting plurality of panels 1408 to each other may enable outer mold line requirements and inner mold line requirements to be met within selected tolerances during the building of fuselage assembly 1100 and, in particular, the joining of plurality of panels 1408 together.

Members (not shown) may be associated with plurality of crown panels 1400 in a manner similar to the manner in which members 1218 are associated with first side panels 1202. These members associated with plurality of crown panels 1400 may be implemented in a manner similar to members 1218 and members 1111 as shown in FIGS. 12-13. The various members associated with end panel 1101, plurality of keel panels 1102, plurality of crown panels 1400, first side panels 1202, and second side panels 1204 may form plurality of members 1410 for fuselage assembly 1100. When plurality of panels 1408 are joined together, plurality of members 1410 may form a support structure (not yet shown) for fuselage assembly 1100, similar to support structure 131 in FIG. 1.

After plurality of crown panels 1400 have been added to fuselage assembly 1100, first tower 800 may be autonomously decoupled from assembly fixture 1012 and utility fixture 726. First tower 800 may then be autonomously driven away from utility fixture 726 using, for example, without limitation, autonomous vehicle 816 in FIG. 8. In one illustrative example, first tower 800 may be autonomously driven back to holding environment 701 in FIG. 7.

When first tower 800 is decoupled from assembly fixture 1012 and utility fixture 726, a gap is formed in the distributed utility network. This gap may be filled using a second tower (not shown), implemented in a manner similar to second tower 336 in FIG. 3.

Figure 15:
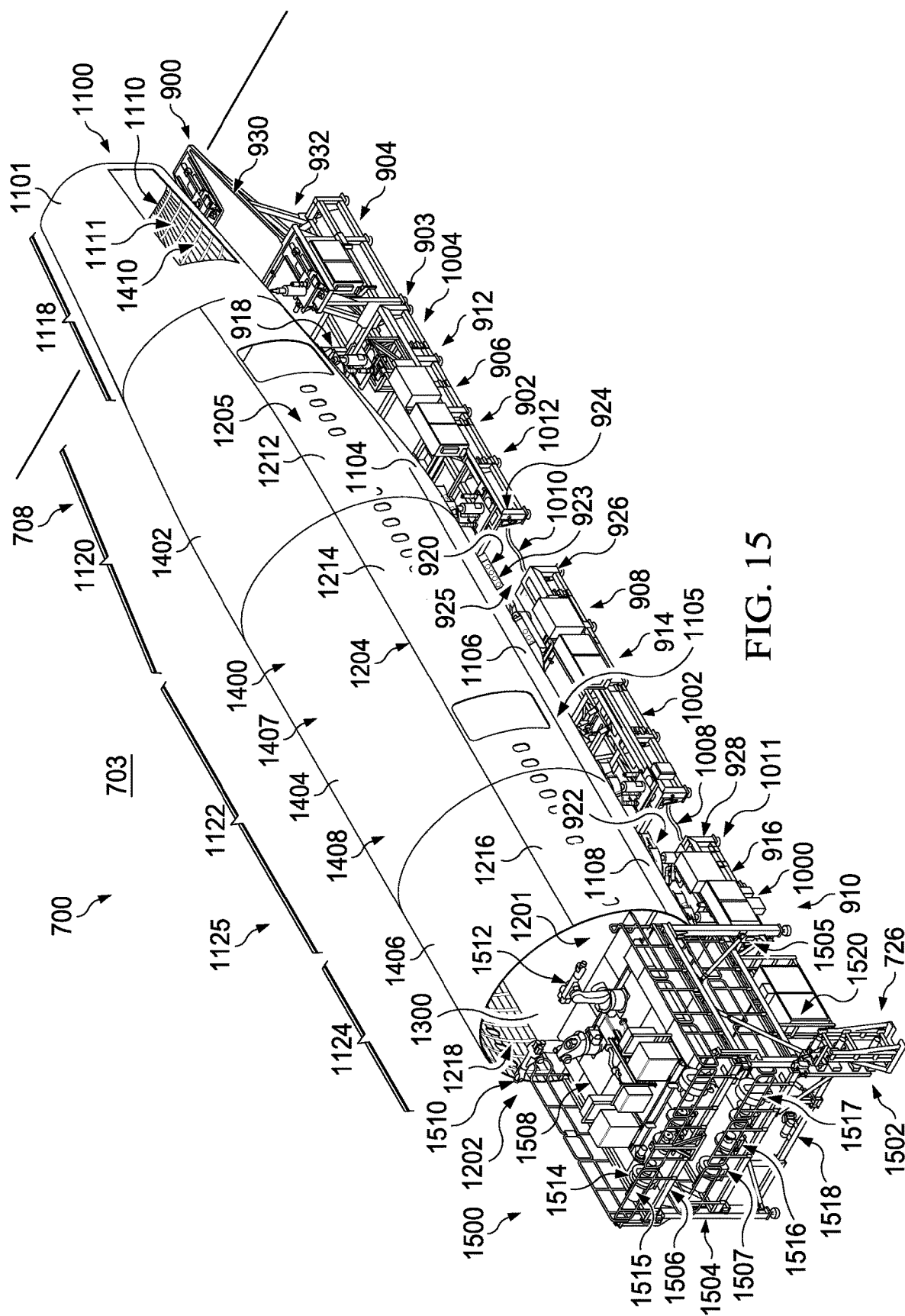
FIG. 15 is an illustration of an isometric view of a second tower coupled to a utility fixture and an assembly fixture supporting a fuselage assembly in accordance with an illustrative embodiment.

With reference now to FIG. 15, an illustration of an isometric view of a second tower coupled to utility fixture 726 and assembly fixture 1012 supporting fuselage assembly 1100 from FIG. 14 is depicted in accordance with an illustrative embodiment. In this illustrative example, second tower 1500 has been positioned relative to assembly fixture 1012 and utility fixture 726. Second tower 1500 may be an example of one implementation for second tower 336 in FIG. 3.

Second tower 1500 may be autonomously driven across floor 703 using an autonomous vehicle (not shown), similar to autonomous vehicle 816 in FIG. 8. Second tower 1500 may be autonomously driven into selected tower position 1518 relative to utility fixture 726. Selected tower position 1518 may be an example of one implementation for selected tower position 338 in FIG. 3. In this illustrative example, selected tower position 1518 may be substantially the same as selected tower position 818 in FIG. 8.

Once second tower 1500 has been autonomously driven into selected tower position 1518, second tower 1500 may autonomously couple to utility fixture 726. In particular, second tower 1500 may electrically and physically couple to utility fixture 726 autonomously to form interface 1502. Interface 1502 may be another example of one implementation for interface 342 in FIG. 3. This type of coupling may enable a number of utilities to flow from utility fixture 726 to second tower 1500.

Further, second tower 1500 may autonomously couple to cradle fixture 910, thereby autonomously coupling to assembly fixture 1012, to form interface 1505. Interface 1505 may enable the number of utilities to flow downstream from second tower 1500. In this manner, the number of utilities may flow from second tower 1500 to cradle fixture 910, to cradle fixture 908, and then to cradle fixture 906. In this manner, second tower 1500 may fill the gap in the distributed utility network that was created when first tower 800 in FIG. 14 was decoupled from assembly fixture 1012 and utility fixture 726 and driven away.

Similar to first tower 800 in FIG. 8, second tower 1500 may include base structure 1504, top platform 1506, and bottom platform 1507. However, top platform 1506 and bottom platform 1507 may be used to provide internal mobile platforms with access to interior 1201 of fuselage assembly 1100 instead of human operators.

In this illustrative example, internal mobile platform 1508 may be positioned on top platform 1506. Top platform 1506 may be substantially aligned with passenger floor 1300 such that internal mobile platform 1508 may be able to autonomously drive across top platform 1506 onto passenger floor 1300.

Similarly, an internal mobile platform (not shown in this view) may be positioned on bottom platform 1507. Bottom platform 1507 may be substantially aligned with cargo floor 1200 (not shown in this view) from FIG. 12 such that this other internal mobile platform (not shown in this view) may be able to autonomously drive across bottom platform 1507 onto the cargo floor. Internal mobile platform 1508 and the other internal mobile platform (not shown in this view) may be examples of implementations for internal mobile platform 406 in FIG. 4.

As depicted, internal robotic device 1510 and internal robotic device 1512 may be associated with internal mobile platform 1508. Although internal robotic device 1510 and internal robotic device 1512 are shown associated with the same internal mobile platform 1508, in other illustrative examples, internal robotic device 1510 may be associated with one internal mobile platform and internal robotic device 1512 may be associated with another internal mobile platform. Each of internal robotic device 1510 and internal robotic device 1512 may be an example of one implementation for internal robotic device 416 in FIG. 4.

Internal robotic device 1510 and internal robotic device 1512 may be used to perform operations within interior 1201 of fuselage assembly 1100 for joining plurality of panels 1408. For example, without limitation, internal robotic device 1510 and internal robotic device 1512 may be used to perform fastening operations, such as riveting operations, within interior 1201 of fuselage assembly 1100.

In one illustrative example, utility box 1520 may be associated with base structure 1504. Utility box 1520 may manage the number of utilities received from utility fixture 726 through interface 1502 and may distribute these utilities into utility cables that are managed using cable management system 1514 and cable management system 1516.

As depicted in this example, cable management system 1514 may be associated with top platform 1506 and cable management system 1516 may be associated with bottom platform 1507. Cable management system 1514 and cable management system 1516 may be implemented similarly.

Cable management system 1514 may include cable wheels 1515 and cable management system 1516 may include cable wheels 1517. Cable wheels 1515 may be used to spool utility cables that are connected to internal mobile platform 1508. For example, without limitation, cable wheels 1515 may be biased in some manner to substantially maintain a selected amount of tension in the utility cables. This biasing may be achieved using, for example, one or more spring mechanisms.

As internal mobile platform 1508 moves away from second tower 1500 along passenger floor 1300, the utility cables may extend from cable wheels 1515 to maintain utility support to internal mobile platform 1508 and manage the utility cables such that they do not become tangled. Cable wheels 1517 may be implemented in a manner similar to cable wheels 1515.

By using cable wheels 1515 to spool the utility cables, the utility cables may be kept off of internal mobile platform 1508, thereby reducing the weight of internal mobile platform 1508 and the load applied by internal mobile platform 1508 to passenger floor 1300. The number of utilities provided to internal mobile platform 1508 may include, for example, without limitation, electricity, air, water, hydraulic fluid, communications, some other type of utility, or some combination thereof.

Figure 16:
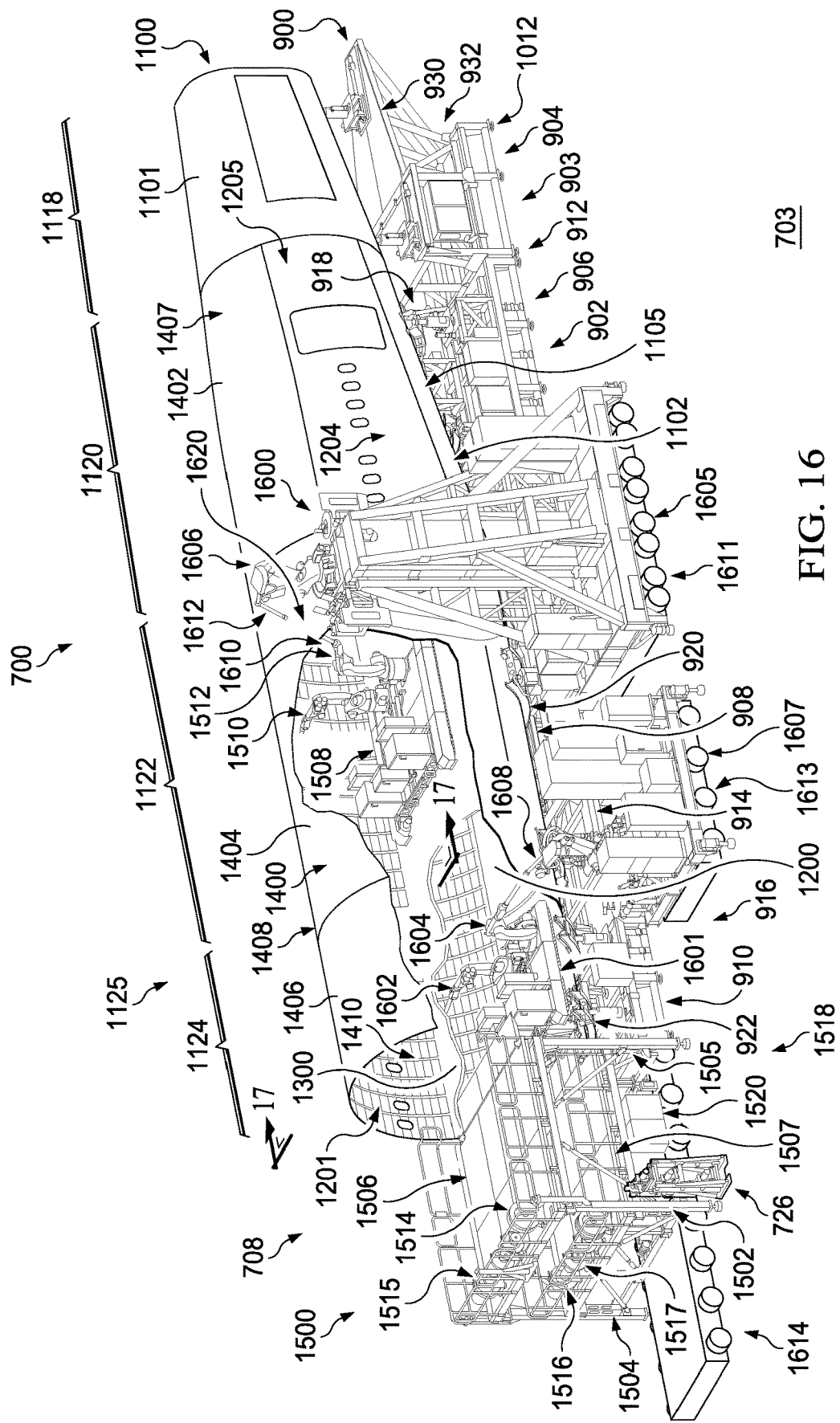
FIG. 16 is an illustration of an isometric cutaway view of a plurality of mobile platforms performing fastening processes within an interior of a fuselage assembly in accordance with an illustrative embodiment.

With reference now to FIG. 16, an illustration of an isometric cutaway view of a plurality of mobile platforms performing fastening processes within interior 1201 of fuselage assembly 1100 is depicted in accordance with an illustrative embodiment. In this illustrative example, plurality of mobile platforms 1600 may be used to perform fastening processes to join plurality of panels 1408 together.

In particular, plurality of panels 1408 may be joined together at selected locations along fuselage assembly 1100. Plurality of panels 1408 may be joined to form at least one of lap joints, butt joints, or other types of joints. In this manner, plurality of panels 1408 may be joined such that at least one of circumferential attachment, longitudinal attachment, or some other type of attachment is created between the various panels of plurality of panels 1408.

As depicted, plurality of mobile platforms 1600 may include internal mobile platform 1508 and internal mobile platform 1601. Internal mobile platform 1508 and internal mobile platform 1601 may be an example of one implementation for number of internal mobile platforms 402 in FIG. 4. Internal mobile platform 1508 may be configured to move along passenger floor 1300, while internal mobile platform 1601 may be configured to move along cargo floor 1200.

As depicted, internal robotic device 1602 and internal robotic device 1604 may be associated with internal mobile platform 1601. Each of internal robotic device 1602 and internal robotic device 1604 may be an example of one implementation for internal robotic device 416 in FIG. 4. Internal robotic device 1602 and internal robotic device 1604 may be similar to internal robotic device 1510 and internal robotic device 1512.

Plurality of mobile platforms 1600 may also include external mobile platform 1605 and external mobile platform 1607. External mobile platform 1605 and external mobile platform 1607 may be an example of one implementation for at least a portion of number of external mobile platforms 400 in FIG. 4. External mobile platform 1605 and external mobile platform 1607 may be examples of implementations for external mobile platform 404 in FIG. 4.

External robotic device 1606 may be associated with external mobile platform 1605. External robotic device 1608 may be associated with external mobile platform 1607. Each of external robotic device 1606 and external robotic device 1608 may be an example of one implementation for external robotic device 408 in FIG. 4.

As depicted, external robotic device 1606 and internal robotic device 1512 may work collaboratively to install fasteners autonomously in fuselage assembly 1100. These fasteners may take the form of, for example, without limitation, at least one of rivets, interference-fit bolts, non-interference-fit bolts, or other types of fasteners or fastener systems. Similarly, external robotic device 1608 and internal robotic device 1604 may work collaboratively to install fasteners autonomously in fuselage assembly 1100. As one illustrative example, end effector 1610 of internal robotic device 1512 and end effector 1612 of external robotic device 1606 may be positioned relative to a same location 1620 on fuselage assembly 1100 to perform a fastening process at location 1620, such as fastening process 424 in FIG. 4.

The fastening process may include at least one of, for example, without limitation, a drilling operation, a fastener insertion operation, a fastener installation operation, an inspection operation, or some other type of operation. The fastener installation operation may take the form of, for example, without limitation, two-stage riveting process 444 described in FIG. 4, interference-fit bolt-type installation process 439 described in FIG. 4, bolt-nut type installation process 433 described in FIG. 4, or some other type of fastener installation operation.

In this illustrative example, autonomous vehicle 1611 may be fixedly associated with external mobile platform 1605. Autonomous vehicle 1611 may be used to drive external mobile platform 1605 autonomously. For example, autonomous vehicle 1611 may be used to autonomously drive external mobile platform 1605 across floor 703 of manufacturing environment 700 relative to assembly fixture 1012.

Similarly, autonomous vehicle 1613 may be fixedly associated with external mobile platform 1607. Autonomous vehicle 1613 may be used to drive external mobile platform 1607 autonomously. For example, autonomous vehicle 1613 may be used to autonomously drive external mobile platform 1607 across floor 703 of manufacturing environment 700 relative to assembly fixture 1012.

By being fixedly associated with external mobile platform 1605 and external mobile platform 1607, autonomous vehicle 1611 and autonomous vehicle 1613 may be considered integral to external mobile platform 1605 and external mobile platform 1607, respectively. However, in other illustrative examples, these autonomous vehicles may be independent of the external mobile platforms in other illustrative examples.

Once all fastening processes have been completed for fuselage assembly 1100, internal mobile platform 1508 and internal mobile platform 1601 may be autonomously driven across passenger floor 1300 back onto top platform 1506 and bottom platform 1507, respectively, of second tower 1500. Second tower 1500 may then be autonomously decoupled from both utility fixture 726 and assembly fixture 1012. Autonomous vehicle 1614 may then be used to autonomously drive or move second tower 1500 away.

In this illustrative example, building of fuselage assembly 1100 may now be considered completed for this stage in the overall assembly process for the fuselage. Consequently, assembly fixture 1012 may be autonomously driven across floor 703 to move fuselage assembly 1100 to some other location. In other illustrative examples, first tower 800 from FIG. 8 may be autonomously driven back into selected tower position 818 in FIG. 8 relative to utility fixture 726. First tower 800 from FIG. 8 may then be autonomously recoupled to utility fixture 726 and assembly fixture 1012. First tower 800 from FIG. 8 may enable a human operator (not shown) to access interior 1201 of fuselage assembly 1100 to perform other operations including, but not limited to, at least one of inspection operations, fastening operations, system installation operations, or other types of operations. System installation operations may include operations for installing systems such as, for example, without limitation, at least one of a fuselage utility system, an air conditioning system, interior panels, electronic circuitry, some other type of system, or some combination thereof.

Figure 17:
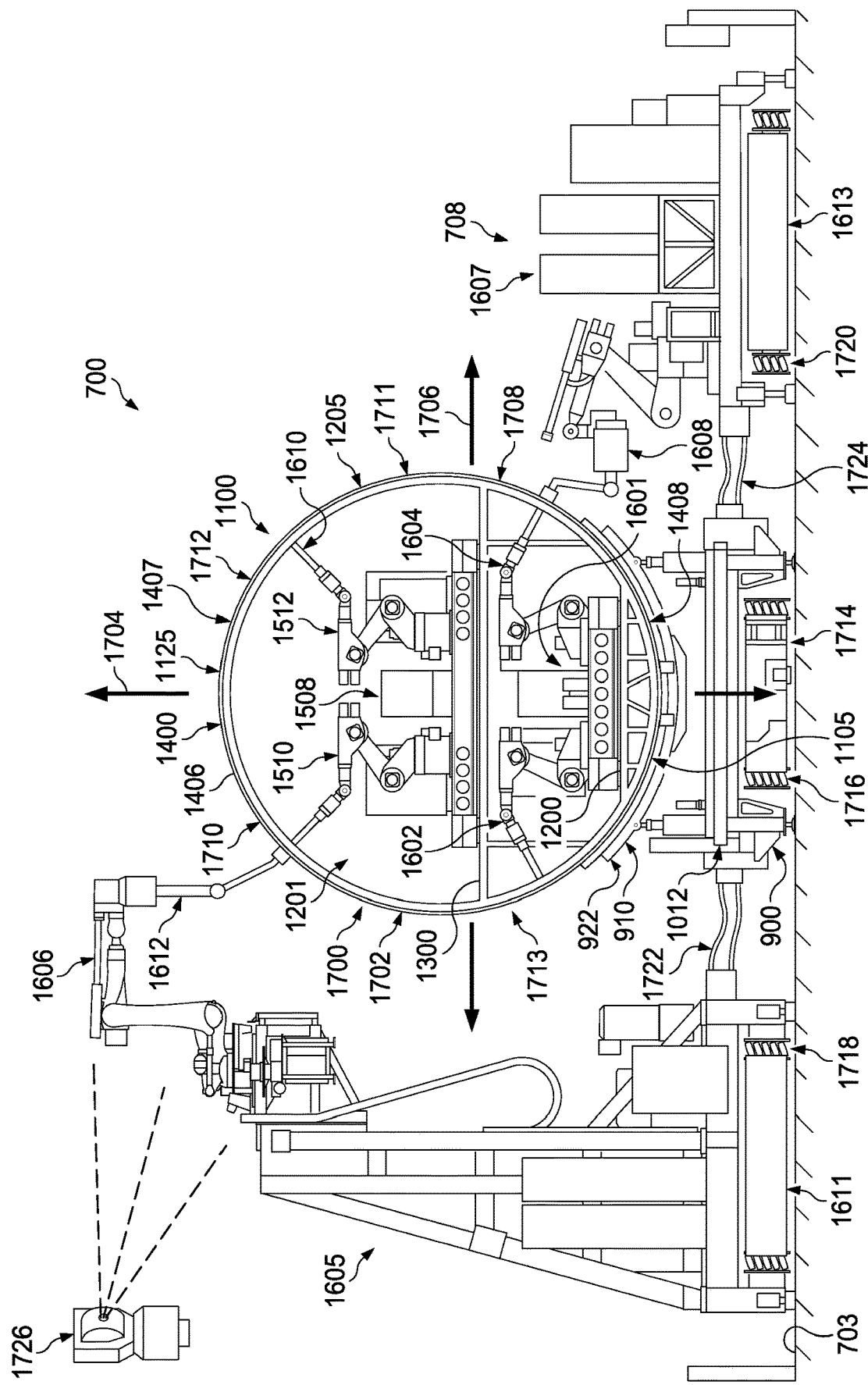
FIG. 17 is an illustration of a cross-sectional view of a flexible manufacturing system performing operations on a fuselage assembly in accordance with an illustrative embodiment.

With reference now to FIG. 17, an illustration of a cross-sectional view of flexible manufacturing system 708 performing operations on fuselage assembly 1100 from FIG. 16 is depicted in accordance with an illustrative embodiment. In this illustrative example, a cross-sectional view of fuselage assembly 1100 from FIG. 16 is depicted taken in the direction of lines 17-17 in FIG. 16.

As depicted, internal mobile platform 1508 and internal mobile platform 1601 are performing operations within interior 1201 of fuselage assembly 1100. External mobile platform 1605 and external mobile platform 1607 are performing assembly operations along exterior 1700 of fuselage assembly 1100.

In this illustrative example, external mobile platform 1605 may be used to perform operations along portion 1702 of exterior 1700 between axis 1704 and axis 1706 at first side 1710 of fuselage assembly 1100. External robotic device 1606 of external mobile platform 1605 may work collaboratively with internal robotic device 1510 of internal mobile platform 1508 to perform fastening processes.

Similarly, external mobile platform 1607 may be used to perform operations along portion 1708 of exterior 1700 of fuselage assembly 1100 between axis 1704 and axis 1706 at second side 1712 of fuselage assembly 1100. External robotic device 1608 of external mobile platform 1607 may work collaboratively with internal robotic device 1604 of internal mobile platform 1601 to perform fastening processes.

Although external mobile platform 1605 is depicted as being located at first side 1710 of fuselage assembly 1100, external mobile platform 1605 may be autonomously driven by autonomous vehicle 1611 to second side 1712 of fuselage assembly 1100 to perform operations along portion 1711 of exterior 1700 of fuselage assembly 1100 between axis 1704 and axis 1706. Similarly, external mobile platform 1607 may be autonomously driven by autonomous vehicle 1613 to second side 1712 of fuselage assembly 1100 to perform operations along portion 1713 of exterior 1700 of fuselage assembly 1100 between axis 1704 and axis 1706.

Although not shown in this illustrative example, an external mobile platform similar to external mobile platform 1605 may have an external robotic device configured to work collaboratively with internal robotic device 1512 of internal mobile platform 1508 at second side 1712 of fuselage assembly 1100. Similarly, an external mobile platform similar to external mobile platform 1607 may have an external robotic device configured to work collaboratively with internal robotic device 1602 of internal mobile platform 1601 at first side 1710 of fuselage assembly 1100.

These four different external mobile platforms and two internal mobile platforms may be controlled such that the operations performed by internal mobile platform 1508 located on passenger floor 1300 may occur at a different location with respect to the longitudinal axis of fuselage assembly 1100 than the operations performed by internal mobile platform 1601 located on cargo floor 1200. The four external mobile platforms may be controlled such that the two external mobile platforms located on the same side of fuselage assembly 1100 do not collide or impede one another. The two external mobile platforms located at the same side of fuselage assembly 1100 may be unable to occupy the same footprint in this illustrative example.

In this illustrative example, external mobile platform 1605 may autonomously couple to assembly fixture 1012 to form interface 1722 such that a number of utilities may flow from assembly fixture 1012 to external mobile platform 1605. In other words, the number of utilities may be autonomously coupled between external mobile platform 1605 and assembly fixture 1012 through interface 1722. In particular, external mobile platform 1605 has been coupled to cradle fixture 910 through interface 1722.

Similarly, external mobile platform 1607 may autonomously couple to assembly fixture 1012 to form interface 1724 such that a number of utilities may flow from assembly fixture 1012 to external mobile platform 1607. In other words, the number of utilities may be autonomously coupled between external mobile platform 1607 and assembly fixture 1012 through interface 1724. In particular, external mobile platform 1607 has been coupled to cradle fixture 910 through interface 1724.

As operations are performed along fuselage assembly 1100 by external mobile platform 1605, external mobile platform 1607, and any other external mobile platforms, these external mobile platforms may be coupled to and decoupled from assembly fixture 1012 as needed. For example, external mobile platform 1607 may decouple from cradle fixture 910 as external mobile platform 1607 moves aftward along fuselage assembly 1100 such that external mobile platform 1607 may then autonomously couple to cradle fixture 908 (not shown) from FIGS. 9-16. Further, these external mobile platforms may be coupled to and decoupled from assembly fixture 1012 to avoid collisions and prevent the external mobile platforms from impeding each other during maneuvering of the external mobile platforms relative to assembly fixture 1012 and fuselage assembly 1100.

As depicted, autonomous vehicle 1714 is shown positioned under the assembly fixture 1012 formed by cradle system 900. In this illustrative example, autonomous vehicle 1714, autonomous vehicle 1611, and autonomous vehicle 1613 may have omnidirectional wheels 1716, omnidirectional wheels 1718, and omnidirectional wheels 1720, respectively. In some illustrative examples, metrology system 1726 may be used to help position external mobile platform 1605 and external mobile platform 1607 relative to fuselage assembly 1100.

Figure 18:
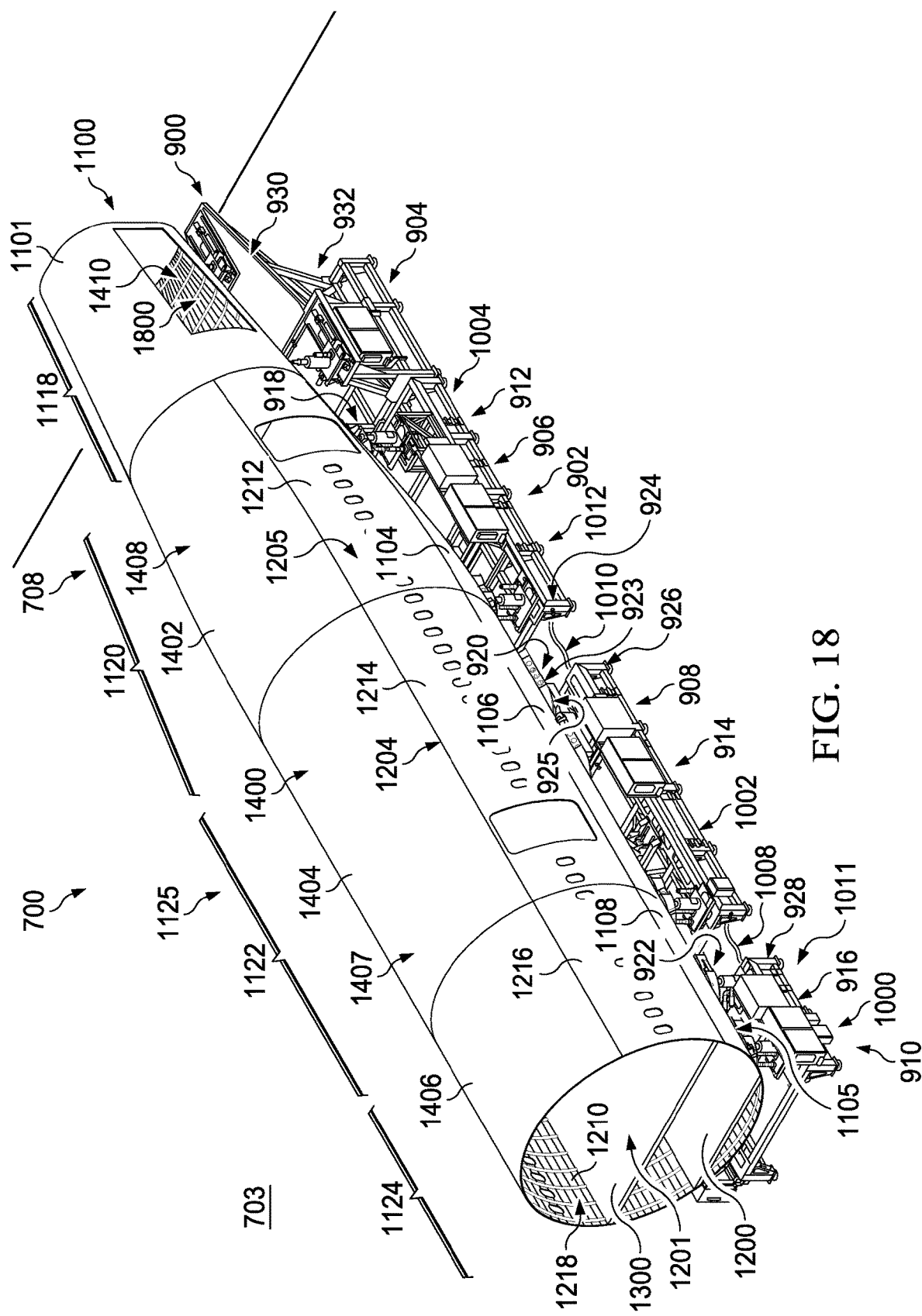
FIG. 18 is an illustration of an isometric view of a fully assembled fuselage in accordance with an illustrative embodiment.

Turning now to FIG. 18, an illustration of an isometric view of a fully built fuselage assembly is depicted in accordance with an illustrative embodiment. In this illustrative example, fuselage assembly 1100 may be considered completed when plurality of panels 1408 have been fully joined.

In other words, all fasteners needed to join together plurality of panels 1408 have been fully installed. With plurality of panels 1408 joined together, support structure 1800 may be fully formed. Support structure 1800 may be an example of one implementation for support structure 121 in FIG. 1. Fuselage assembly 1100, which is an aft fuselage assembly, may now be ready for attachment to a corresponding middle fuselage assembly (not shown) and forward fuselage assembly (not shown).

As depicted, autonomous vehicles (not shown in this view), similar to autonomous vehicle 1614 shown in FIG. 16, may be positioned under base 912 of cradle fixture 906, base 914 of cradle fixture 908, and base 916 of cradle fixture 910, respectively. Autonomous vehicles, such as number of corresponding autonomous vehicles 316 in FIG. 3, may lift up base 912, base 914, and base 916, respectively, such that plurality of stabilizing members 924, plurality of stabilizing members 926, and plurality of stabilizing members 928, respectively, no longer contact the floor.

These autonomous vehicles (not shown) may then autonomously drive cradle system 900 carrying fuselage assembly 1100 that has been fully built away from assembly environment 702 in FIG. 7 and, in some cases, away from manufacturing environment 700 in FIG. 7. Computer-controlled movement of these autonomous vehicles (not shown) may ensure that number of cradle fixtures 902 maintain their positions relative to each other as fuselage assembly 1100 is being moved.

Figure 19:
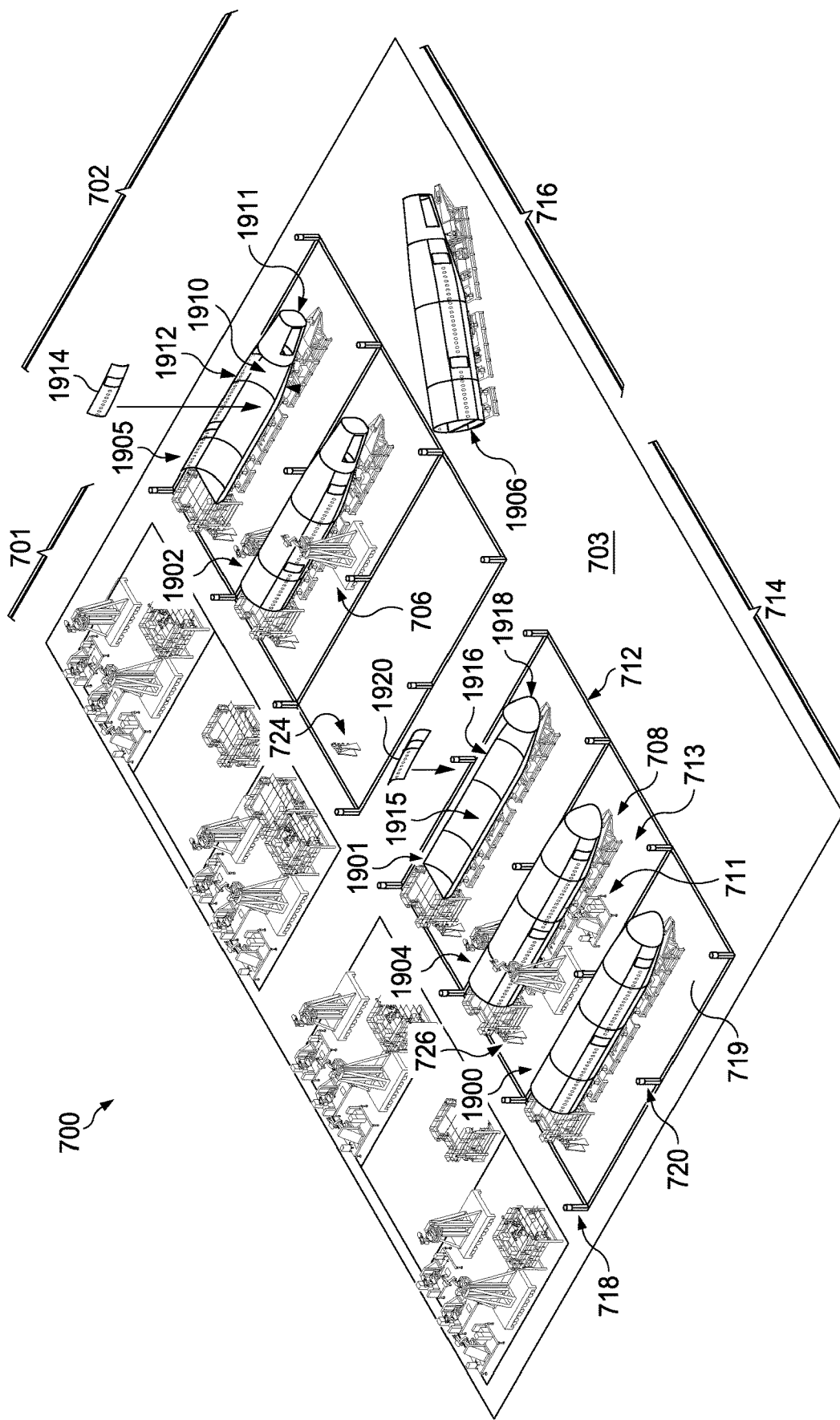
FIG. 19 is an illustration of an isometric view of fuselage assemblies being built within a manufacturing environment in accordance with an illustrative embodiment.

With reference now to FIG. 19, an illustration of an isometric view of fuselage assemblies being built within manufacturing environment 700 is depicted in accordance with an illustrative embodiment. In this illustrative example, plurality of fuselage assemblies 1900 are being built within plurality of work cells 712 in manufacturing environment 700.

Plurality of fuselage assemblies 1900 may include plurality of forward fuselage assemblies 1901 being built in first portion 714 of plurality of work cells 712 and plurality of aft fuselage assemblies 1902 being built in second portion 716 of plurality of work cells 712. Each of plurality of fuselage assemblies 1900 may be an example of one implementation for fuselage assembly 114 in FIG. 1.

As depicted, plurality of fuselage assemblies 1900 are being built concurrently. However, plurality of fuselage assemblies 1900 are at different stages of assembly in this illustrative example.

Forward fuselage assembly 1904 may be an example of one of plurality of forward fuselage assemblies 1901. Forward fuselage assembly 1904 may be an example of one implementation for forward fuselage assembly 117 in FIG. 1. Aft fuselage assembly 1905 may be an example of one of plurality of aft fuselage assemblies 1902. Aft fuselage assembly 1905 may be an example of one implementation for aft fuselage assembly 116 in FIG. 1. In this illustrative example, aft fuselage assembly 1905 may be at an earlier stage of assembly than forward fuselage assembly 1904.

Aft fuselage assembly 1906, which may be another example of an implementation for aft fuselage assembly 116 in FIG. 1, may be a fuselage assembly with all panels joined. As depicted, aft fuselage assembly 1906 is being autonomously driven to some other location for a next stage in the overall fuselage and aircraft manufacturing process.

As described above, aft fuselage assembly 1905 may be partially assembled. In this illustrative example, aft fuselage assembly 1905 has keel 1910, end panel 1911, and first side 1912. End panel 1911 may form an end fuselage section of aft fuselage assembly 1905. As depicted, side panel 1914 may be added to aft fuselage assembly 1905 to build a second side of aft fuselage assembly 1905.

Forward fuselage assembly 1915 may be another example of one of plurality of forward fuselage assemblies 1901. In this illustrative example, forward fuselage assembly 1915 has keel 1916 and end panel 1918. End panel 1918 may form an end fuselage section of forward fuselage assembly 1915. As depicted, side panel 1920 may be added to forward fuselage assembly 1915 to begin building a first side of forward fuselage assembly 1915.

Figure 20:
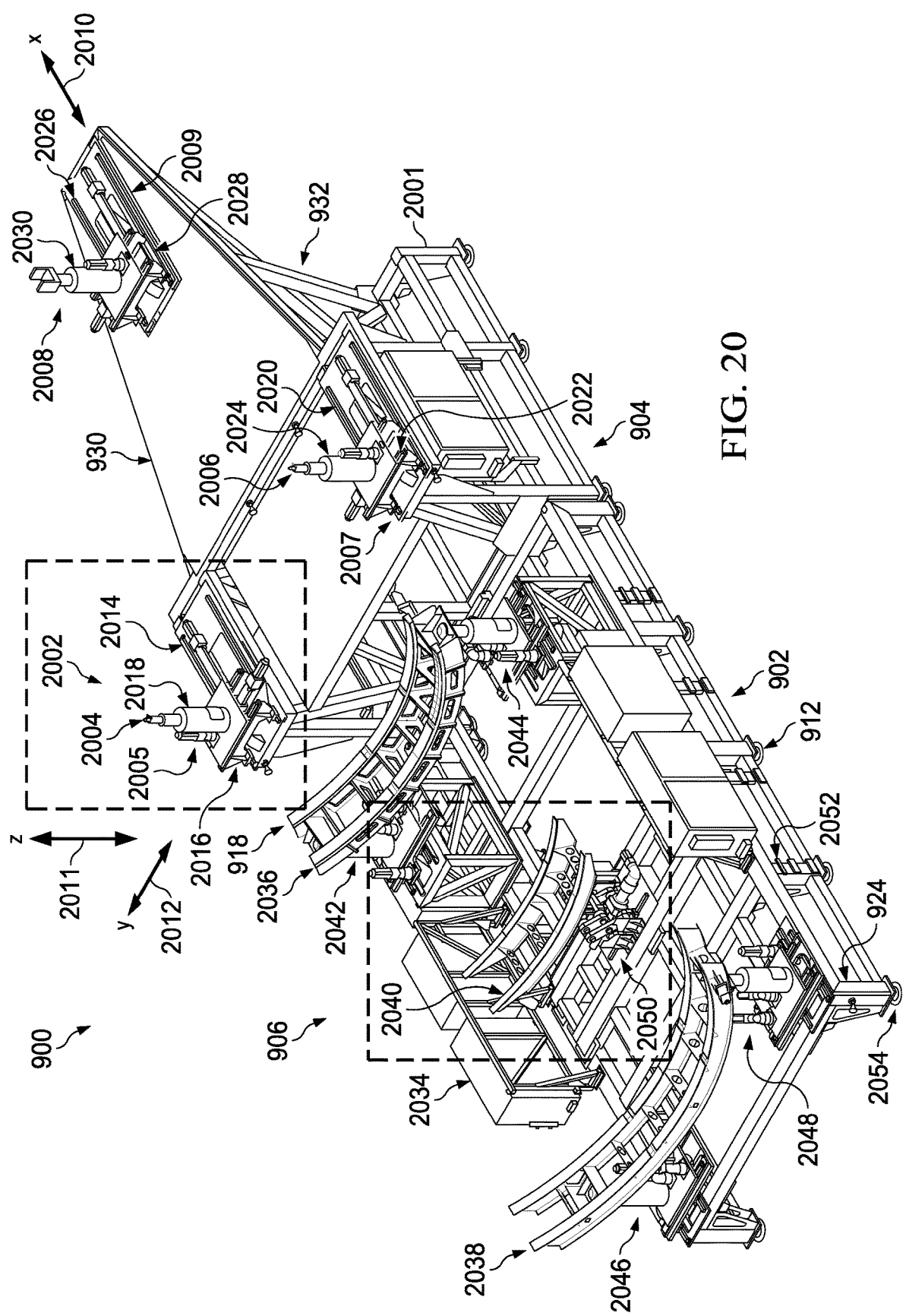
FIG. 20 is an illustration of an isometric view of a cradle fixture in accordance with an illustrative embodiment.

With reference now to FIG. 20, an illustration of an isometric view of cradle fixture 906 from FIG. 9 is depicted in accordance with an illustrative embodiment. As depicted, cradle fixture 906 may include base 912 and base 932. Base 932 may belong to fixture 904. Base 912 and base 932 may together form overall base 2001 for cradle fixture 906.

As depicted, plurality of retaining members 2002 may be associated with base 932 of fixture 904. Plurality of retaining members 2002 may include retaining members 2004, 2006, and 2008 that are used to support fuselage section 1118 in FIG. 11. In this illustrative example, each of plurality of retaining members 2002 may be movable relative to X-axis 2010, Y-axis 2012, and Z-axis 2011.

Movement system 2005, movement system 2007, and movement system 2009 may be used to move retaining members 2004, 2006, and 2008, respectively, relative to X-axis 2010, Y-axis 2012, and Z-axis 2011. As depicted, movement system 2005 may include rail system 2014, rail system 2016, and actuator device 2018. Movement system 2007 may include rail system 2020, rail system 2022, and actuator device 2024. Movement system 2009 may include rail system 2026, rail system 2028, and actuator device 2030.

Rail system 2014, rail system 2016, rail system 2020, rail system 2022, rail system 2026, and rail system 2028 may provide movement relative to X-axis 2010 and Y-axis 2012. In other words, these rail systems may provide horizontal X-Y movement. Actuator device 2018, actuator device 2024, and actuator device 2030 may provide movement relative to Z-axis 2011. In other words, these actuator devices may provide vertical Z movement.

In this illustrative example, plurality of units 2034 may be associated with overall base 2001. Plurality of units 2034 may include, for example, without limitation, a power unit, an air supply unit, a hydraulic unit, a water supply unit, a communications unit, or some other type of unit.

As depicted, number of retaining structures 918 may include retaining structures 2036, 2038, and 2040. Retaining structures 2036, 2038, and 2040 may be associated with base 912. Each of retaining structures 2036, 2038, and 2040 may be an example of one implementation for retaining structure 616 in FIG. 6.

As depicted, retaining structure 2036 may be moved relative to X-axis 2010, Y-axis 2012, and Z-axis 2011 using movement system 2042 and movement system 2044. Retaining structure 2038 may be moved relative to X-axis 2010, Y-axis 2012, and Z-axis 2011 using movement system 2046 and movement system 2048. Retaining structure 2040 may be moved relative to X-axis 2010, Y-axis 2012, and Z-axis 2011 using movement system 2050.

As depicted, bracket 2052 may be associated with base 912 and used to hold a rail system (not shown) for a utilities unit (not shown). This utilities unit (not shown) may be used to couple an external mobile platform, such as external mobile platform 404 described in FIG. 4, to cradle fixture 906. As used herein, a utilities unit may also be referred to as a utility unit in some cases.

In this illustrative example, plurality of stabilizing members 924 may take the form of plurality of hydraulic legs 2054. Each of plurality of hydraulic legs 2054 may be capable of adjusting in height. In this manner, plurality of stabilizing members 924 may be used to adjust at least one of a height of cradle fixture 906 or the tilt of cradle fixture 906 relative to Z-axis 2011.

Figure 21:
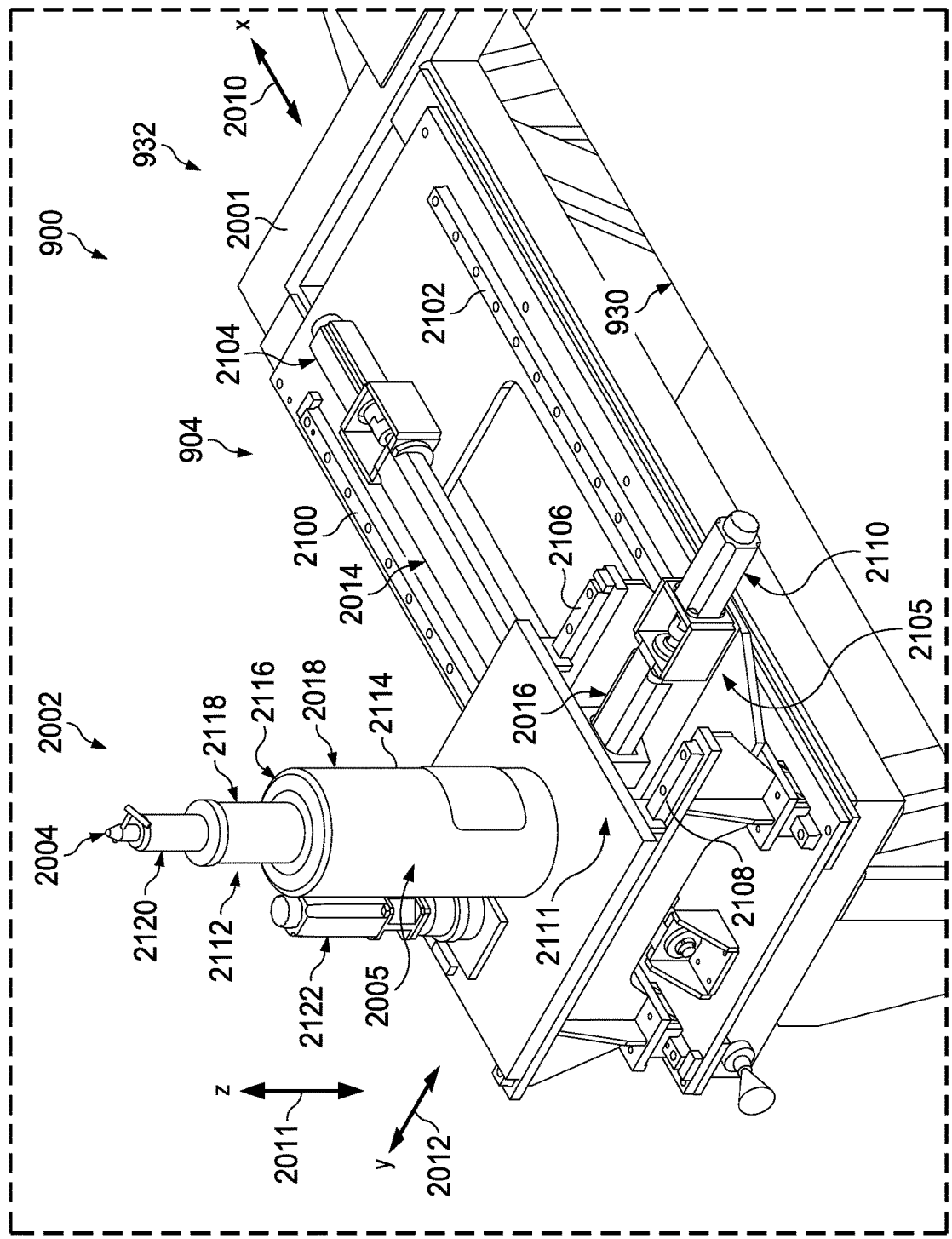
FIG. 21 is an illustration of an enlarged isometric view of a retaining member and a movement system in accordance with an illustrative embodiment.

With reference now to FIG. 21, an illustration of an enlarged isometric view of retaining member 2004 and movement system 2005 from FIG. 20 is depicted in accordance with an illustrative embodiment. Rail system 2014, rail system 2016, and actuator device 2018 from FIG. 20 are more clearly depicted in FIG. 21.

As depicted, rail system 2014 may include rail 2100, rail 2102, and motor 2104. Motor 2104 may be used to provide movement of retaining member 2004 along rail 2100 and rail 2102. For example, retaining member 2004 may be indirectly associated with plate 2105 that is configured to move along rail 2100 and rail 2102. Motor 2104 may be used to move plate 2105 along these rails to move retaining member 2004 in a direction along X-axis 2010.

In this illustrative example, rail system 2016 may include rail 2106, rail 2108, and motor 2110. Motor 2110 may be used to provide movement of retaining member 2004 along rail 2106 and rail 2108. For example, retaining member 2004 may be indirectly associated with plate 2111 that is configured to move along rail 2106 and rail 2108. Motor 2110 may be used to move plate 2111 along these rails to move retaining member 2004 in a direction along Y-axis 2012.

Actuator device 2018 may include telescoping device 2112. Telescoping device 2112 may include base 2114, element 2116, element 2118, and element 2120. Motor 2122 may be used to move each of element 2116, element 2118, and element 2120 along Z-axis 2011 relative to base 2114. In this manner, movement system 2005 may provide movement of retaining member 2004 relative to X-axis 2010, Y-axis 2012, and Z-axis 2011.

Figure 22:
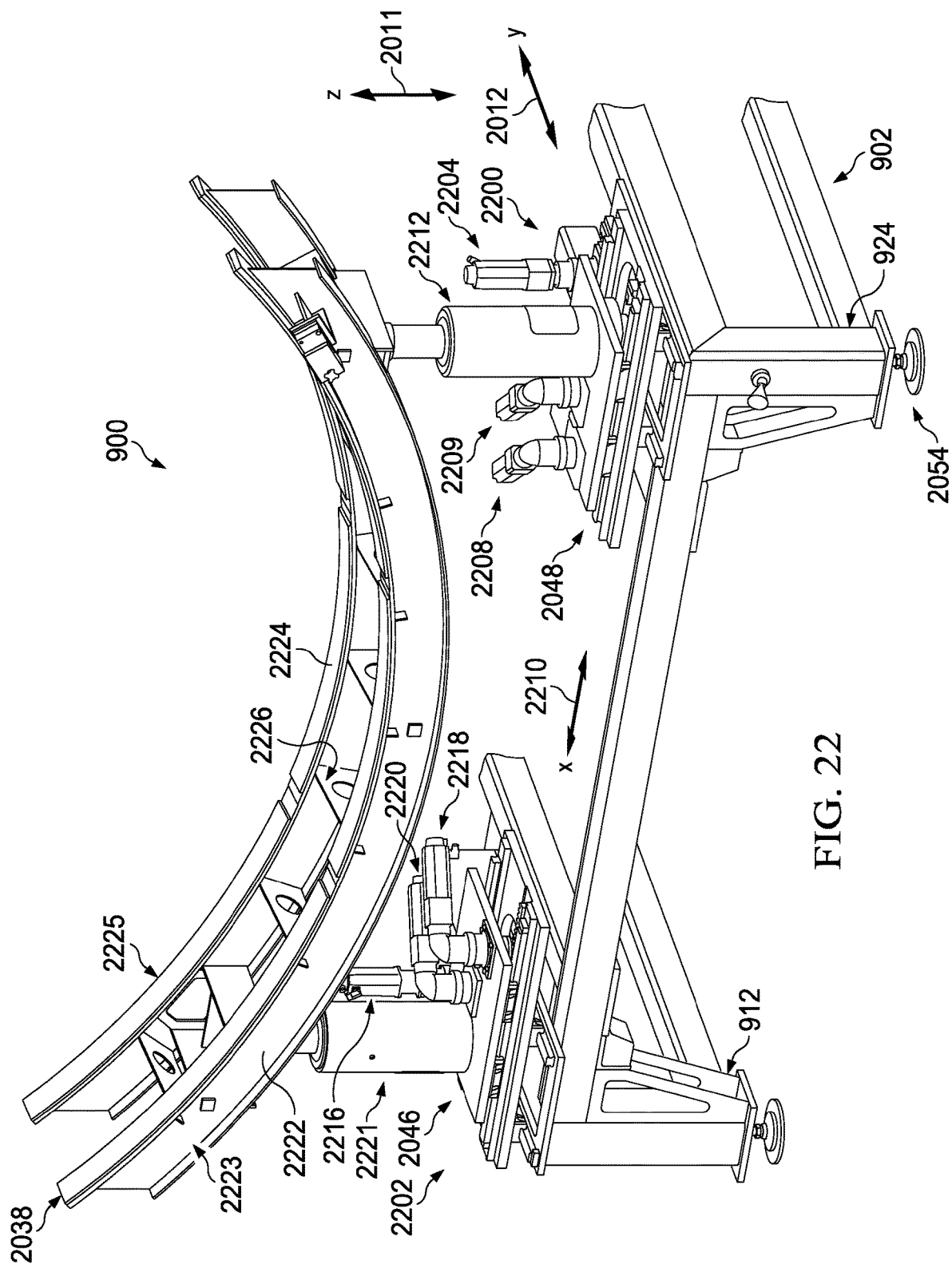
FIG. 22 is an illustration of an enlarged isometric view of a retaining structure and movement systems in accordance with an illustrative embodiment.

Turning now to FIG. 22, an illustration of an enlarged isometric view of retaining structure 2038, movement system 2046, and movement system 2048 from FIG. 20 is depicted in accordance with an illustrative embodiment. Movement system 2046 and movement system 2048 may be more clearly seen in FIG. 22.

In this illustrative example, movement system 2048 and movement system 2046 may include X-Y table 2200 and X-Y table 2202, respectively. X-Y table 2200 and X-Y table 2202 may be examples of implementations for X-Y table 646 in FIG. 6.

Movement system 2048 may also include motor 2204, motor 2208, motor 2209, and actuator device 2212. Motor 2204 may be configured to move X-Y table 2200 in a direction along X-axis 2010. Motor 2208 may be configured to move X-Y table 2200 in a direction along Y-axis 2012. Motor 2209 may be configured to operate actuator device 2212 to move the portion of retaining structure 2038 associated with actuator device 2212 along Z-axis 2214.

Similarly, movement system 2046 may also include motor 2216, motor 2218, motor 2220, and actuator device 2221. Motor 2216 may be configured to move X-Y table 2200 in a direction along X-axis 2010. Motor 2218 may be configured to move X-Y table 2200 in a direction along Y-axis 2210. Motor 2220 may be configured to operate actuator device 2221 to move the portion of retaining structure 2038 associated with actuator device 2221 along Z-axis 2214.

As depicted, retaining structure 2038 may include beam 2222 and beam 2224 connected by set of connecting elements 2226. Beam 2222 and beam 2224 may have curved shape 2223 and curved shape 2225, respectively. Curved shape 2223 and curved shape 2225 may substantially match the curvature of the portion of keel panel 1104 shown in FIG. 11 that is received by retaining structure 2038. More specifically, beam 2222 and beam 2224 may have radii of curvature that substantially match an outer mold line of the portion of keel panel 1104 shown in FIG. 11 that is engaged with retaining structure 2038. With beam 2222 and beam 2224 having curved shape 2223 and curved shape 2225, respectively, retaining structure 2038 may also have an overall curved shape.

Retaining structure 2036 in FIG. 20 may be implemented in a manner similar to retaining structure 2038. Further, movement system 2042 and movement system 2044 associated with retaining structure 2036 in FIG. 20 may be implemented in a manner similar to movement system 2046 and movement system 2048, respectively, associated with retaining structure 2038.

Figure 23:
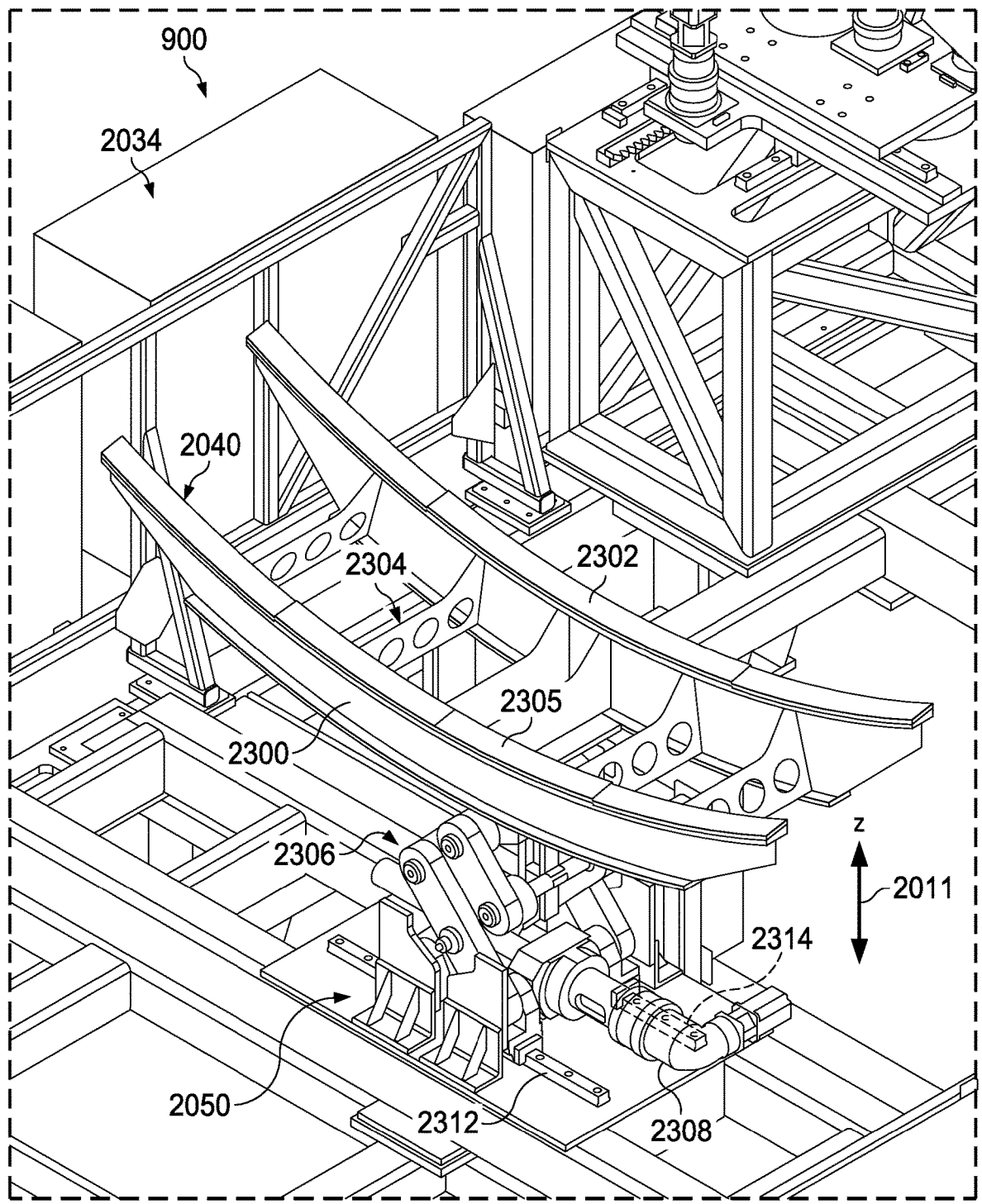
FIG. 23 is an illustration of an enlarged isometric view of a retaining structure and a movement system in accordance with an illustrative embodiment.

With reference now to FIG. 23, an illustration of an enlarged isometric view of retaining structure 2040 and movement system 2050 from FIG. 20 is depicted in accordance with an illustrative embodiment. In this illustrative example, movement system 2050 may be more clearly seen.

Retaining structure 2040 may include beam 2300 and beam 2302 connected by set of connecting elements 2304. In this illustrative example, both beam 2300 and beam 2302 may be curved such that retaining structure 2040 has curved shape 2305 that may substantially match the curvature of keel panel 1104 shown in FIG. 11 to be received by retaining structure 2040. More specifically, beam 2300 and beam 2302 may have radii of curvature that substantially match an outer mold line of the portion of keel panel 1104 shown in FIG. 11 that is to be engaged with retaining structure 2040.

As depicted, movement system 2050 may include scissor lift mechanism 2306, motor 2308, rail 2312, and rail 2314. Motor 2308 may be used to operate scissor lift mechanism 2306, which may be configured to move retaining structure 2040 along Z-axis 2310. Motor 2308 may cause scissor lift mechanism 2306 to expand and retract along rail 2312 and rail 2314.

Figure 24:
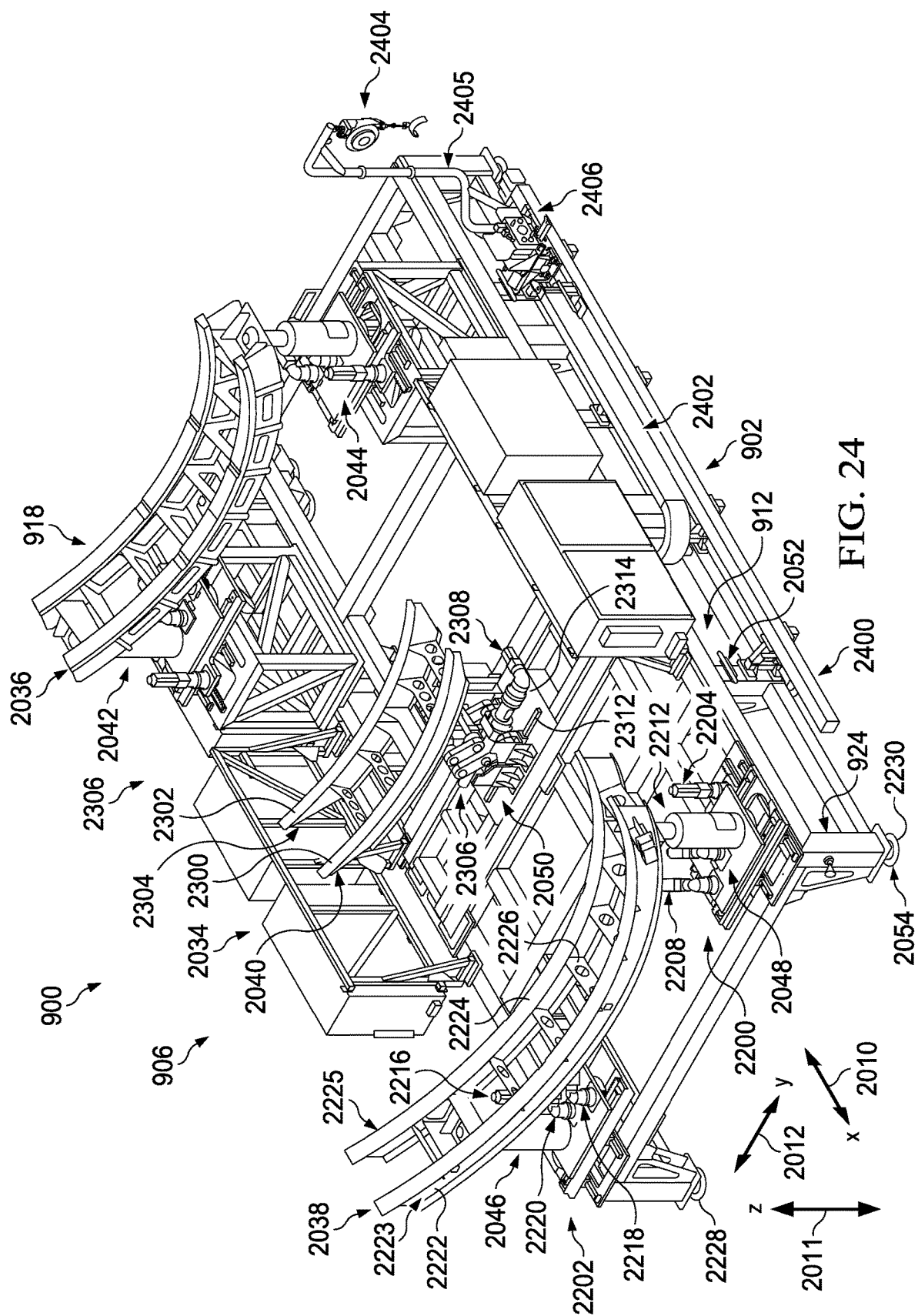
FIG. 24 is an illustration of an isometric view of a cradle fixture with a utilities unit associated with the cradle fixture in accordance with an illustrative embodiment.

With reference now to FIG. 24, an illustration of an isometric view of cradle fixture 906 from FIG. 9 with a utilities unit associated with cradle fixture 906 is depicted in accordance with an illustrative embodiment. In this illustrative example, rail system 2400 has been coupled to bracket 2052.

In this illustrative example, cable management system 2402 may be associated with base 912. In this illustrative example, cable management system 2402 may include cable track 2404 and cable support arm 2405. Cable track 2404 and cable support arm 2405 may be used to manage a number of utility cables associated with cradle fixture 906.

As depicted, utilities unit 2406 may be associated with rail system 2400. In this illustrative example, utilities unit 2406 may be coupled to rail system 2400 such that utilities unit 2406 may be moved along rail system 2400 in a direction along X-axis 2010. Utilities unit 2406 may be used to provide a number of utilities from cradle fixture 906 to an external mobile platform (not shown) that couples to utilities unit 2406.

As one illustrative example, one of external mobile platform 1605 and external mobile platform 1607 in FIG. 16 may be coupled to utilities unit 2406. The coupled external mobile platform may then be configured to receive a number of utilities from cradle fixture 906 through utilities unit 2406.

Figure 25:
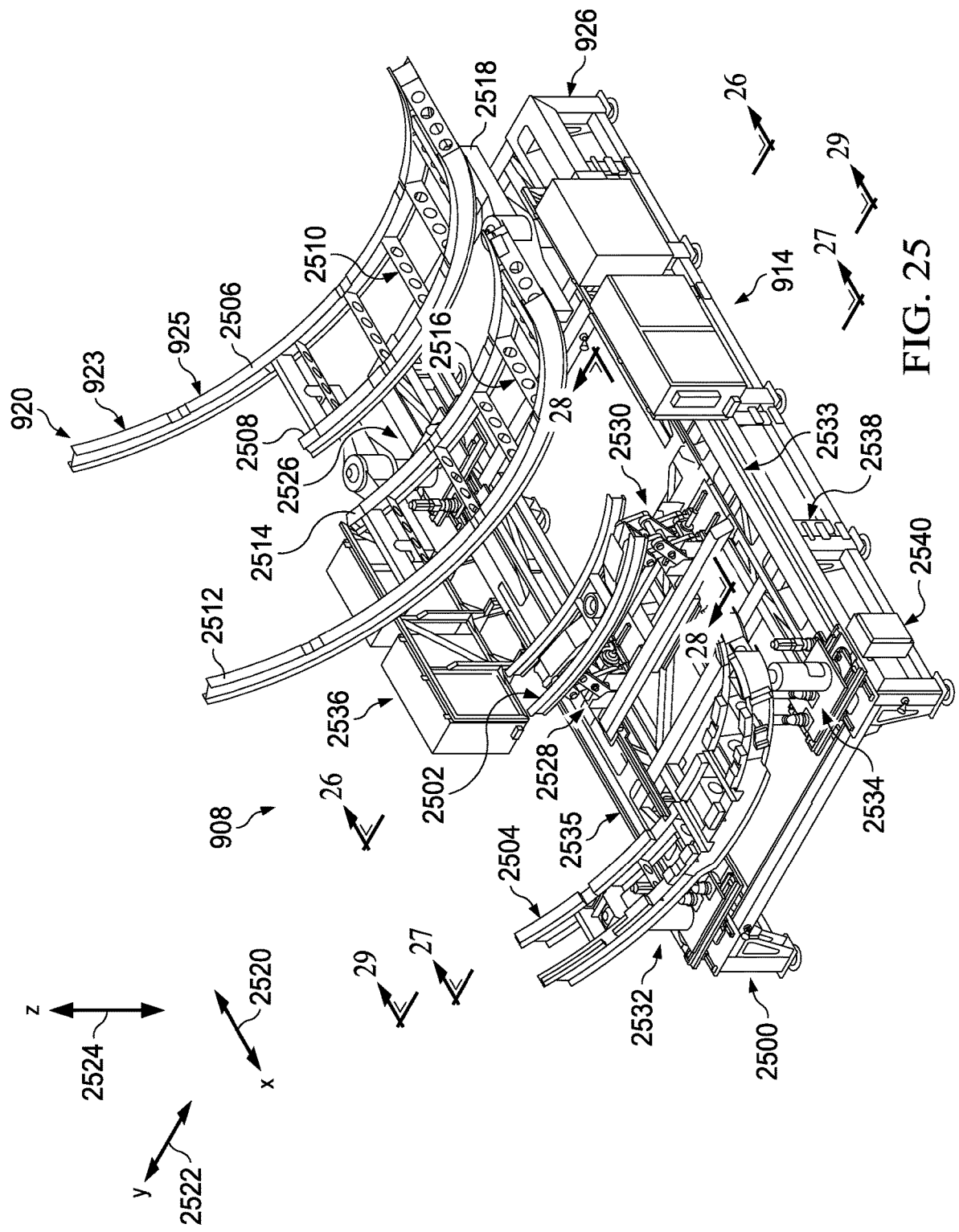
FIG. 25 is an illustration of an enlarged isometric view of a cradle fixture in accordance with an illustrative embodiment.

With reference now to FIG. 25, an illustration of an enlarged isometric view of cradle fixture 908 from FIG. 9 is depicted in accordance with an illustrative embodiment. As depicted, plurality of stabilizing members 926 associated with base 914 of cradle fixture 908 may take the form of plurality of hydraulic legs 2500.

In this illustrative example, cradle fixture 908 may include retaining structure 923, retaining structure 2502, and retaining structure 2504. As depicted, retaining structure 923 may include beam 2506 and beam 2508 connected by set of connecting elements 2510 and beam 2512 and beam 2514 connected by set of connecting elements 2516. In this illustrative example, beams 2506, 2508, 2512, and 2514 may be rotatably associated with set of connection beams 2518.

Retaining structure 923 may be moved relative to base 914 in one or more directions relative to X-axis 2520, Y-axis 2522, and Z-axis 2524. In particular, retaining structure 923 may be rotated relative to set of connection beams 2518 in a direction about Z-axis 2524. Further, retaining structure 923 may be associated with movement system 2526 and movement system 2528. Each of movement system 2526 and movement system 2528 may be implemented in a manner similar to movement systems 2042, 2044, 2046, and 2048 in FIG. 20.

Retaining structure 2502 may be moved relative to base 914 using movement system 2530. Retaining structure 2504 may be moved relative to base 914 using movement system 2532 and movement system 2534, which may be implemented in a manner similar to movement systems 2042, 2044, 2046, and 2048 in FIG. 20. In this illustrative example, retaining structure 2502 may be moved relative to base 914 along X-axis 2520 using rail system 2535 and rail system 2533. Rail system 2535 may be part of movement system 2532. Rail system 2533 may be part of movement system 2534.

In this illustrative example, plurality of units 2536 may be associated with base 914. Plurality of units 2536 may include, for example, without limitation, a power unit, an air supply unit, a hydraulic unit, a water supply unit, a communications unit, or some other type of unit. Further, as depicted, bracket 2538 may be associated with base 914 and used to hold a rail system (not shown) for a utilities unit (not shown).

In this illustrative example, number of radar targets 2540 is shown associated with base 914. Number of radar targets 2540 may be used to position an external mobile platform (not shown) relative to cradle fixture 908. For example, autonomous vehicle 1611 from FIG. 16 may use number of radar targets 2540 to position external mobile platform 1605 in FIG. 16 relative to cradle fixture 908.

Figure 26:
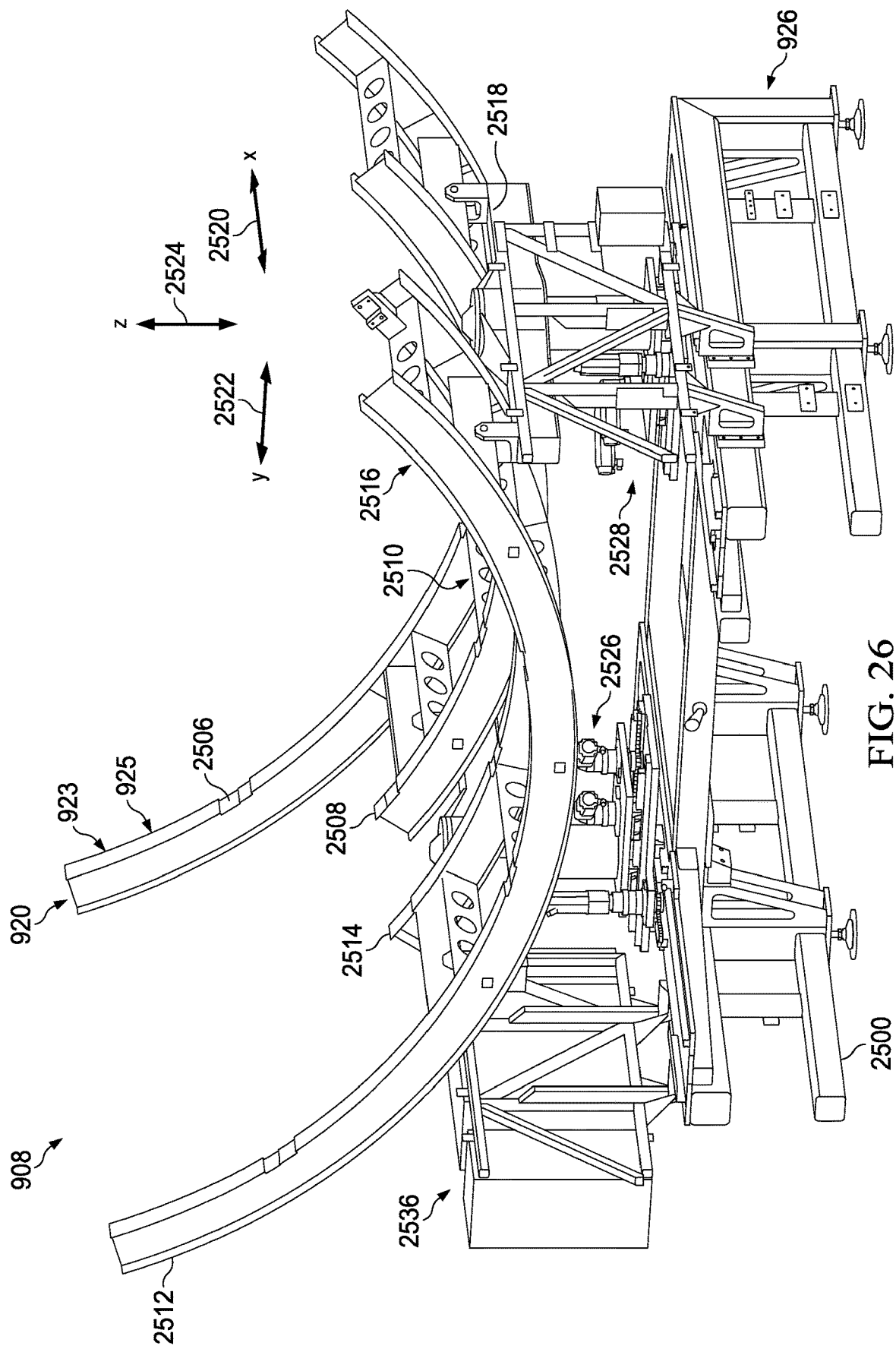
FIG. 26 is an illustration of an enlarged isometric view of a retaining structure in accordance with an illustrative embodiment.

With reference now to FIG. 26, an illustration of an enlarged isometric view of retaining structure 923 from FIG. 25 is depicted in accordance with an illustrative embodiment. In this illustrative example, movement system 2526 and movement system 2528 may be more clearly seen. This view of retaining structure 923 may be shown from the direction of lines 26-26 in FIG. 25. As depicted, movement system 2526 and movement system 2528 may be implemented in a manner similar to movement system 2042 and movement system 2046 and movement system 2048, respectively, shown in FIG. 22.

Figure 27:
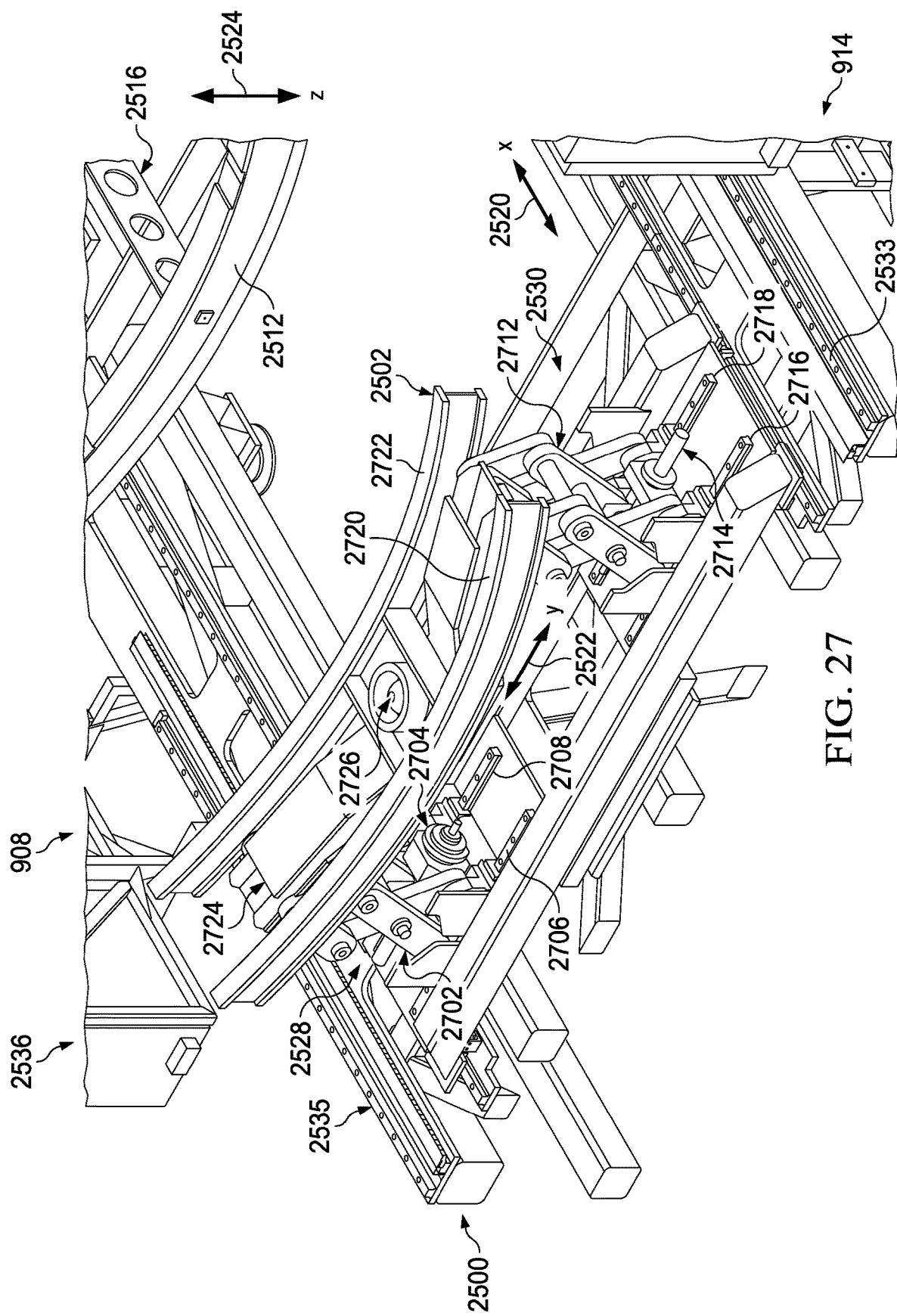
FIG. 27 is an illustration of an enlarged isometric view of a retaining structure in accordance with an illustrative embodiment.

With reference now to FIG. 27, an illustration of an enlarged isometric view of retaining structure 2502 from FIG. 25 is depicted in accordance with an illustrative embodiment. In this illustrative example, movement system 2528 and movement system 2530 are shown more clearly. This view of retaining structure 2502 may be shown from the direction of lines 27-27 in FIG. 25.

As depicted, movement system 2528 may include scissor lift mechanism 2702, motor 2704, rail 2706, and rail 2708. Motor 2704 may be used to expand and retract scissor lift mechanism 2702 in a direction along Y-axis 2522 along rail 2706 and rail 2708 such that retaining structure 2502 may be moved in a direction along Z-axis 2705.

Further, movement system 2530 may include scissor lift mechanism 2712, motor 2714, rail 2716, and rail 2718. Motor 2714 may be used to expand and retract scissor lift mechanism 2712 in a direction along Y-axis 2522 along rail 2716 and rail 2718 such that retaining structure 2502 may be moved in a direction along Z-axis 2705.

In this illustrative example, retaining structure 2502 may be moved in the direction along X-axis 2520 by moving along rail system 2535 and rail system 2533. In some cases, rail system 2535 may be considered part of movement system 2528 and rail system 2533 may be considered part of movement system 2530.

Retaining structure 2502 may include beam 2720 and beam 2722. Connection beam 2724 may be associated with beam 2720 and beam 2722. Movement system 2528 and movement system 2530 may be associated with connection beam 2724. Retaining structure 2502 may be rotatably associated with connection beam 2724. In particular, retaining structure 2502 may be rotatably associated with connection beam 2724 through spherical interface 2726. Spherical interface 2726 may be an example of one implementation for spherical interface 654 in FIG. 6. Retaining structure 2502 may be configured to passively rotate about spherical interface 2726 in a direction about X-axis 2520, a direction about Y-axis 2522, and a direction about Z-axis 2524.

Figure 28:
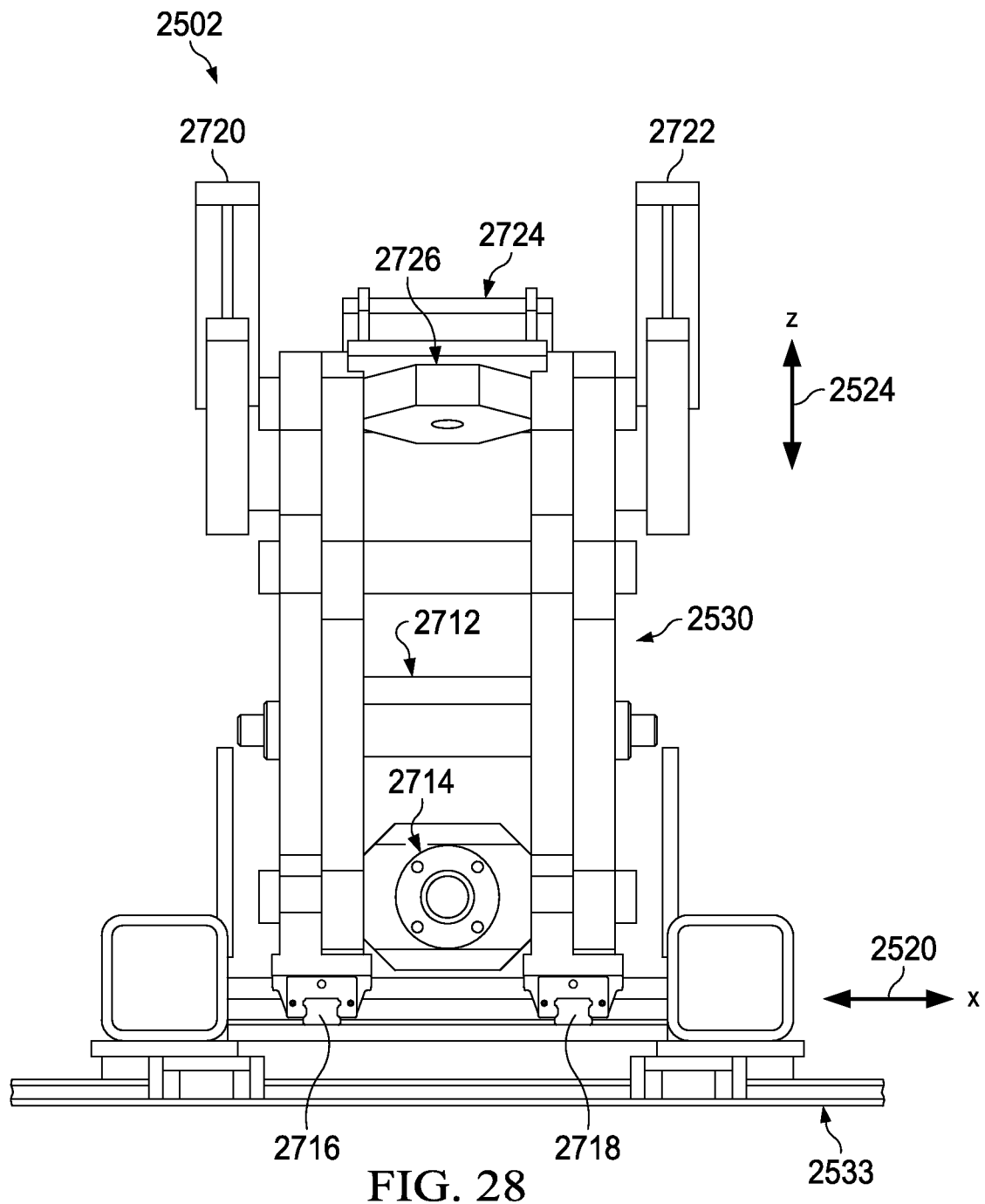
FIG. 28 is an illustration of a side view of a retaining structure and a movement system in accordance with an illustrative embodiment.

With reference now to FIG. 28, an illustration of a side view of retaining structure 2502 and movement system 2530 from FIG. 25 is depicted in accordance with an illustrative embodiment. In this illustrative example, the view of retaining structure 2502 may be shown from the direction of lines 28-28 in FIG. 25.

Figure 29:
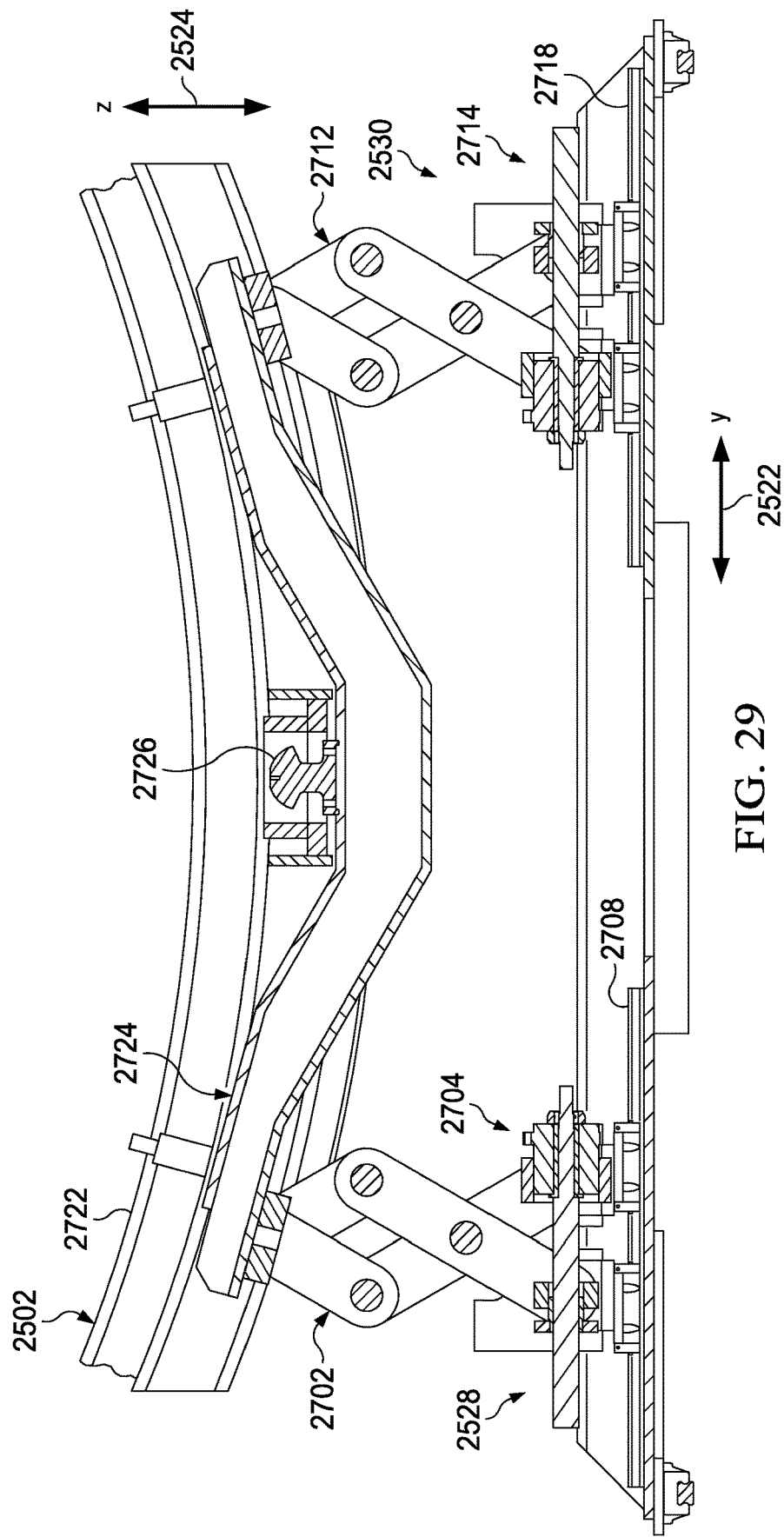
FIG. 29 is an illustration of a front view of a retaining structure with a movement system and another movement system in accordance with an illustrative embodiment.

With reference now to FIG. 29, an illustration of a front view of retaining structure 2502 from FIG. 26 with movement system 2530 and movement system 2528 is depicted in accordance with an illustrative embodiment. In this illustrative example, the view of retaining structure 2502 may be shown from the direction of lines 29-29 in FIG. 25.

Figure 30:
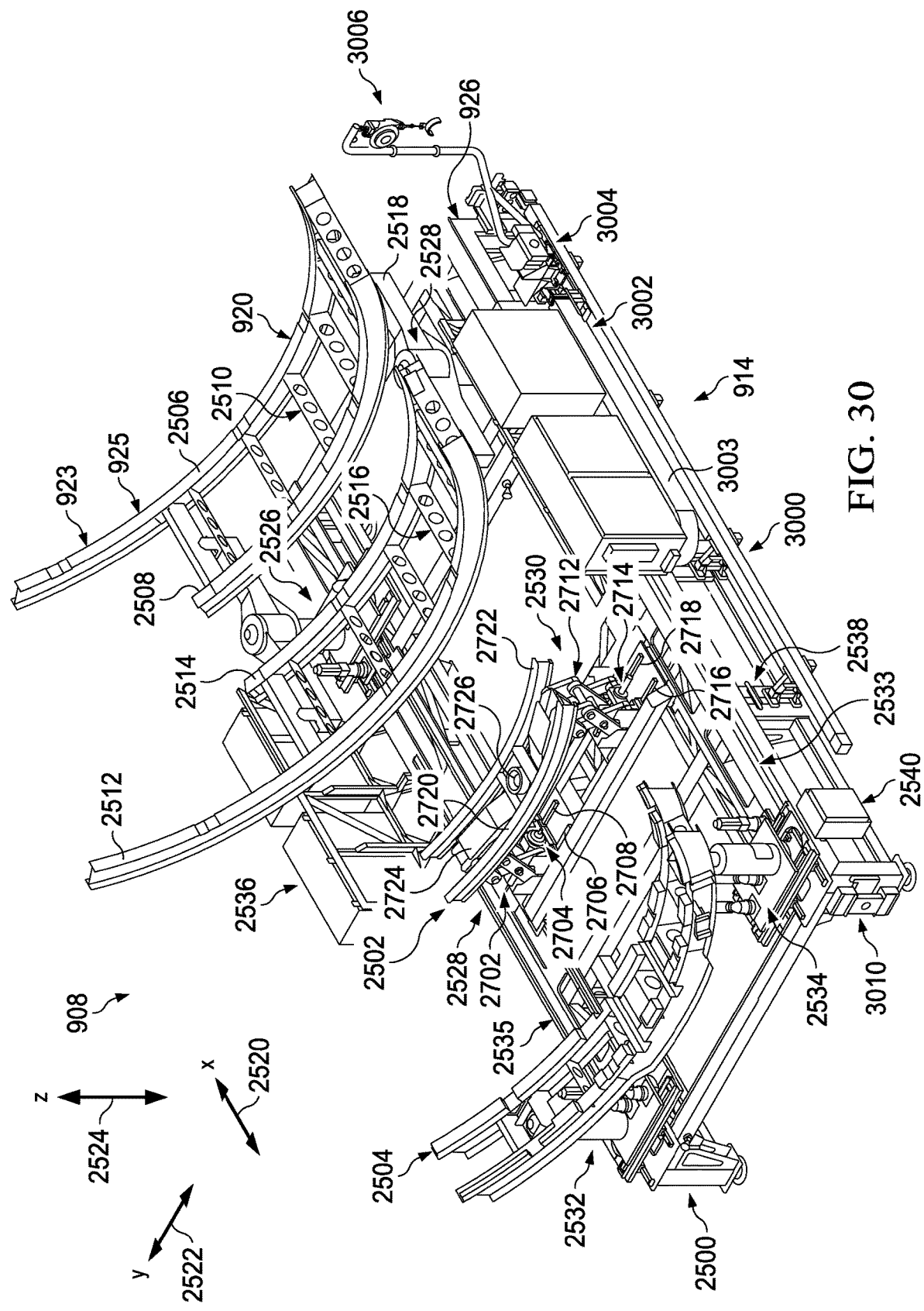
FIG. 30 is an illustration of an isometric view of a cradle fixture with a utilities unit associated with a cradle fixture in accordance with an illustrative embodiment.

With reference now to FIG. 30, an illustration of an isometric view of cradle fixture 908 from FIG. 9 with a utilities unit associated with cradle fixture 908 is depicted in accordance with an illustrative embodiment. In this illustrative example, rail system 3000 has been coupled to bracket 2538.

In this illustrative example, cable management system 3002 may be associated with base 914. In this illustrative example, cable management system 3002 may include cable track 3003 and cable support arm 3006. Cable track 3003 and cable support arm 3006 may be used to manage a number of utility cables associated with cradle fixture 908.

As depicted, utilities unit 3004 may be associated with rail system 3000. In this illustrative example, utilities unit 3004 may be coupled to rail system 3000 such that utilities unit 3004 may be moved along rail system 3000 in a direction along X-axis 2520. Utilities unit 3004 may be used to provide a number of utilities from cradle fixture 908 to an external mobile platform (not shown) that couples to utilities unit 3004.

Cradle coupling unit 3010 is shown associated with base 914. In this illustrative example, cradle coupling unit 3010 may be used to couple cradle fixture 908 to cradle fixture 910 in FIG. 9. Cradle coupling unit 3010 may allow a number of utilities to flow from cradle fixture 910 to cradle fixture 908.

Figure 31:
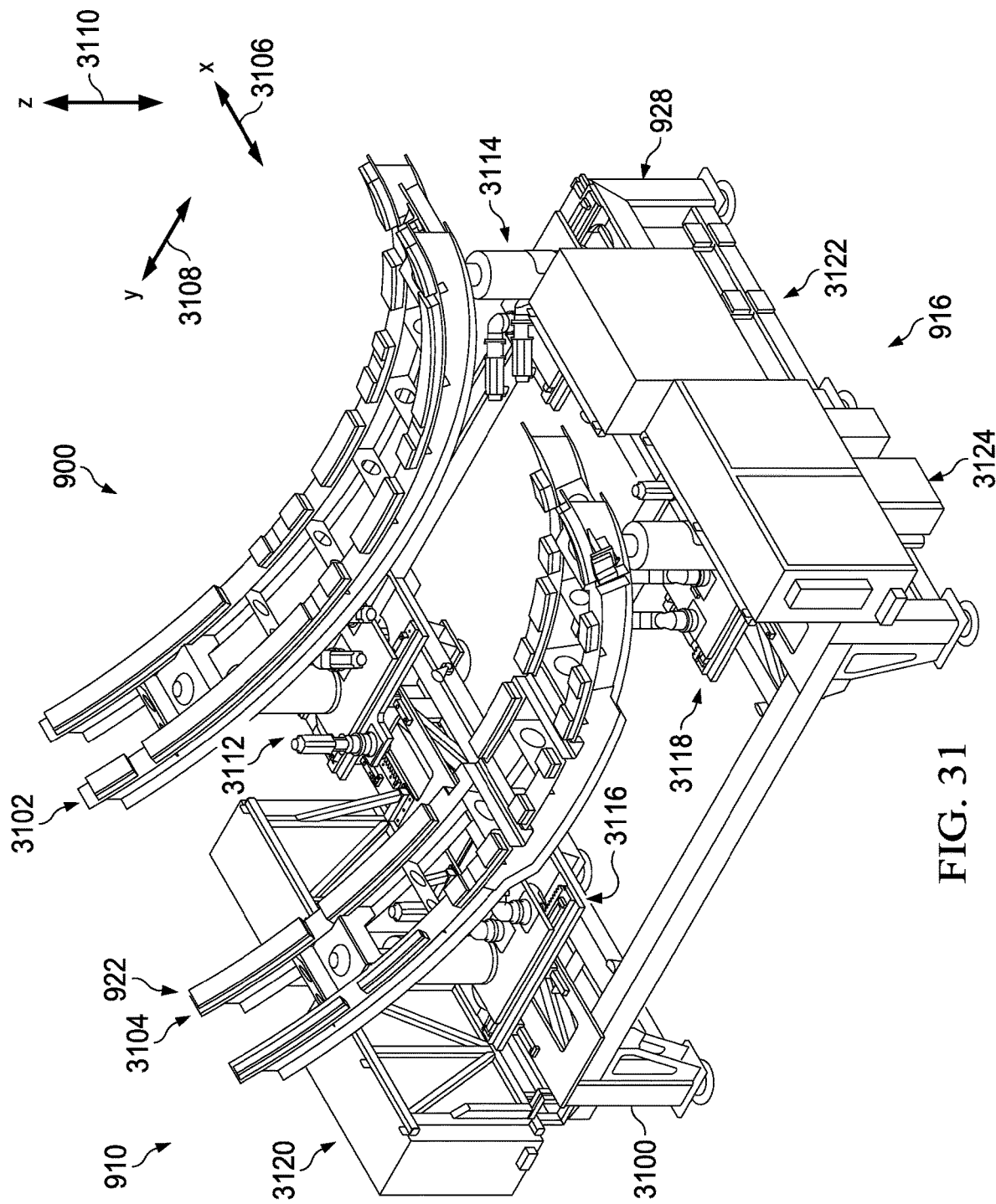
FIG. 31 is an illustration of an enlarged isometric view of a cradle fixture in accordance with an illustrative embodiment.

With reference now to FIG. 31, an illustration of an enlarged isometric view of cradle fixture 910 from FIG. 9 is depicted in accordance with an illustrative embodiment. In this illustrative example, plurality of stabilizing members 928 may take the form of plurality of hydraulic legs 3100.

As depicted, cradle fixture 910 may include retaining structure 3102 and retaining structure 3104. Retaining structure 3102 and retaining structure 3104 may be moved relative to base 916 relative to X-axis 3106, Y-axis 3108, and Z-axis 3110. In particular, movement system 3112 and movement system 3114 may be used to move retaining structure 3102 relative to base 916. Movement system 3116 and movement system 3118 may be used to move retaining structure 3104 relative to base 916.

As depicted, plurality of units 3120 may be associated with base 916. Further, bracket 3122 may be associated with base 916. In this illustrative example, radar target 3124 is shown associated with base 916. Radar target 3124 may be used to position an external mobile platform (not shown) relative to cradle fixture 908.

Figure 32:
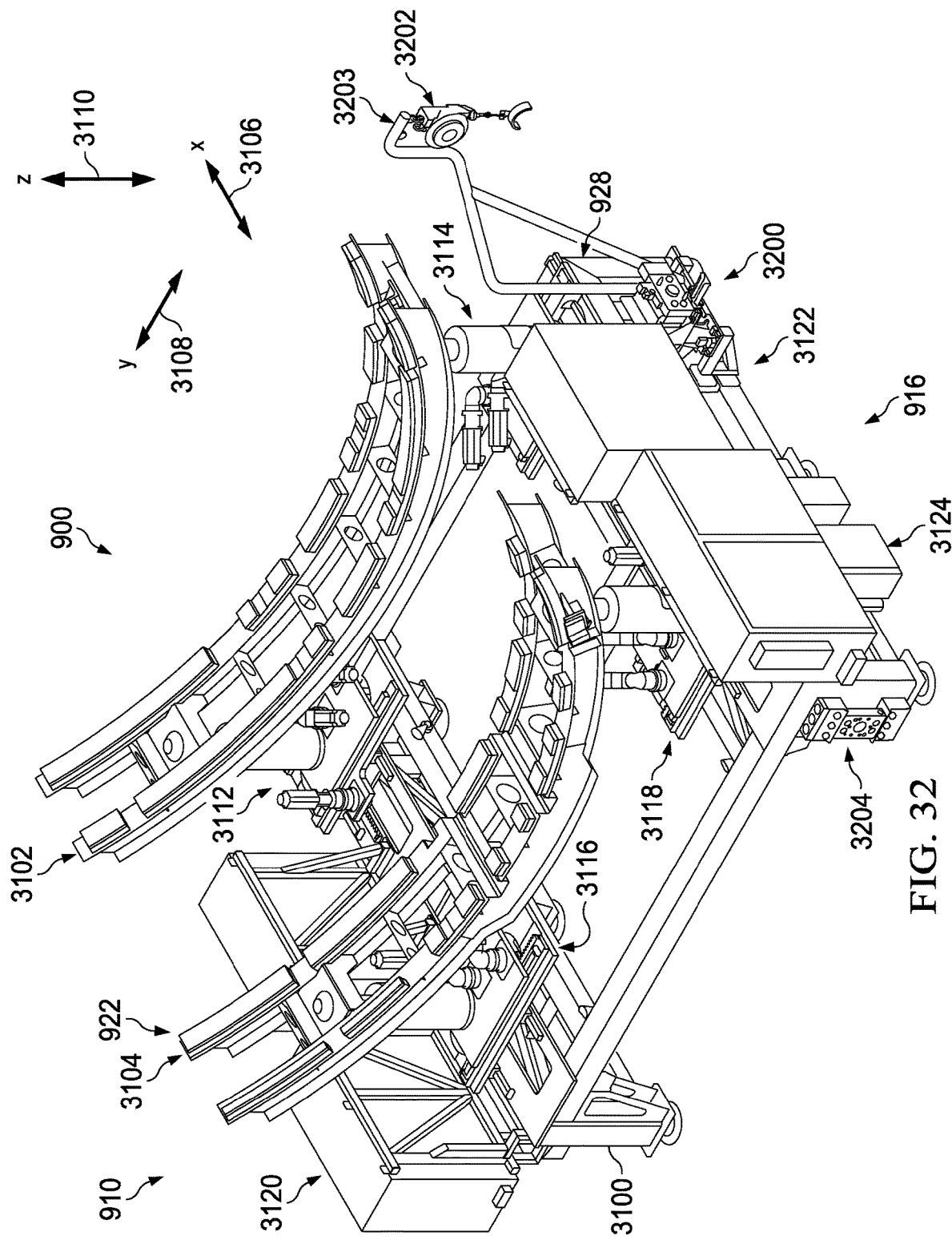
FIG. 32 is an illustration of an isometric view of a cradle fixture with a utilities unit associated with a cradle fixture in accordance with an illustrative embodiment.

With reference now to FIG. 32, an illustration of an isometric view of cradle fixture 910 from FIG. 9 with a utilities unit associated with cradle fixture 910 is depicted in accordance with an illustrative embodiment. In this illustrative example, utilities unit 3200 has been coupled to bracket 3122. Cable management system 3202 is shown comprising cable support arm 3203 associated with base 916. Tower coupling unit 3204 may also be associated with base 916. Tower coupling unit 3204 may be used to couple cradle fixture 910 to a tower, such as first tower 1001 in FIG. 11 or second tower 1500 in FIG. 15.

The illustrations in FIGS. 7-32 are not meant to imply physical or architectural limitations to the manner in which an illustrative embodiment may be implemented. Other components in addition to or in place of the ones illustrated may be used. Some components may be optional.

The different components shown in FIGS. 7-32 may be illustrative examples of how components shown in block form in FIGS. 1-6 can be implemented as physical structures. Additionally, some of the components in FIGS. 1-6 may be combined with components in FIG. 1, used with components in FIG. 1, or a combination of the two.

Figure 33:
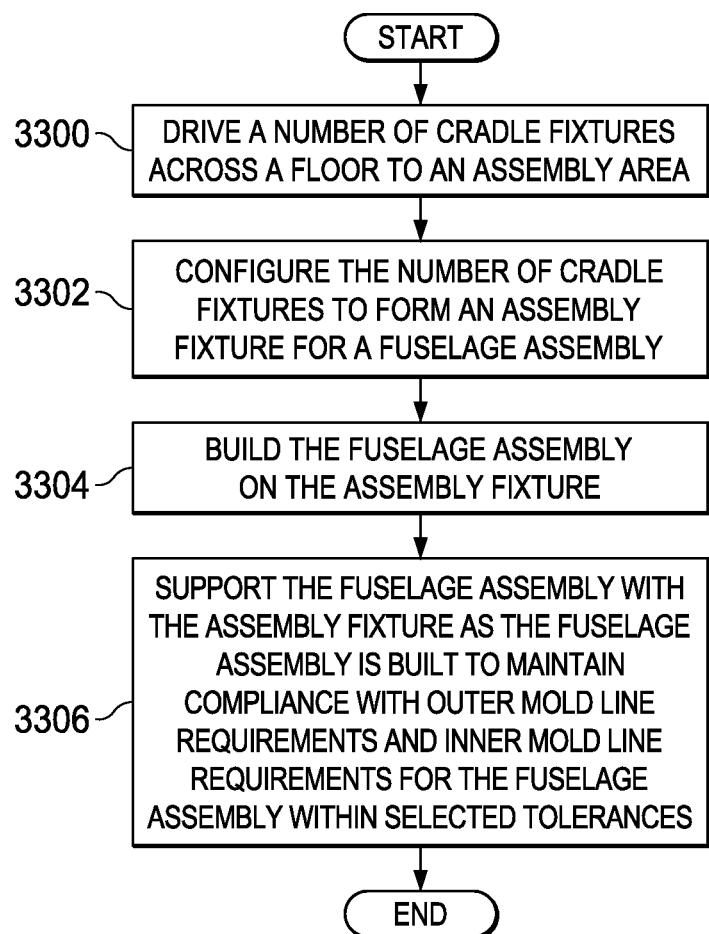
FIG. 33 is an illustration of a process for configuring an assembly fixture in the form of a flowchart in accordance with an illustrative embodiment.

Turning now to FIG. 33, an illustration of a process for configuring an assembly fixture is depicted is depicted in the form of a flowchart in accordance with an illustrative embodiment. The process illustrated in FIG. 33 may be implemented to configure assembly fixture 324 in FIG. 3.

The process may begin by driving number of cradle fixtures 314 across floor 300 to assembly area 304 (operation 3300). In one illustrative example, in operation 3300, number of cradle fixtures 314 may be autonomously driven across floor 300. Next, number of cradle fixtures 314 may be configured to form assembly fixture 324 for fuselage assembly 114 (operation 3302).

Thereafter, fuselage assembly 114 may be built on assembly fixture 324 (operation 3304). Assembly fixture 324 may support fuselage assembly 114 as fuselage assembly 114 is being built to maintain compliance with outer mold line requirements and inner mold requirements for fuselage assembly 114 within selected tolerances (operation 3306), with the process terminating thereafter.

In some cases, assembly fixture 324 may be used to transport fully built fuselage assembly 114 to one or more other locations at which other operations may be performed. In some illustrative examples, assembly fixture 324 may be used to support fuselage assembly 114 while fuselage assembly 114 is being joined to another fuselage assembly, another aircraft structure, or some other type of component.

Figure 34:
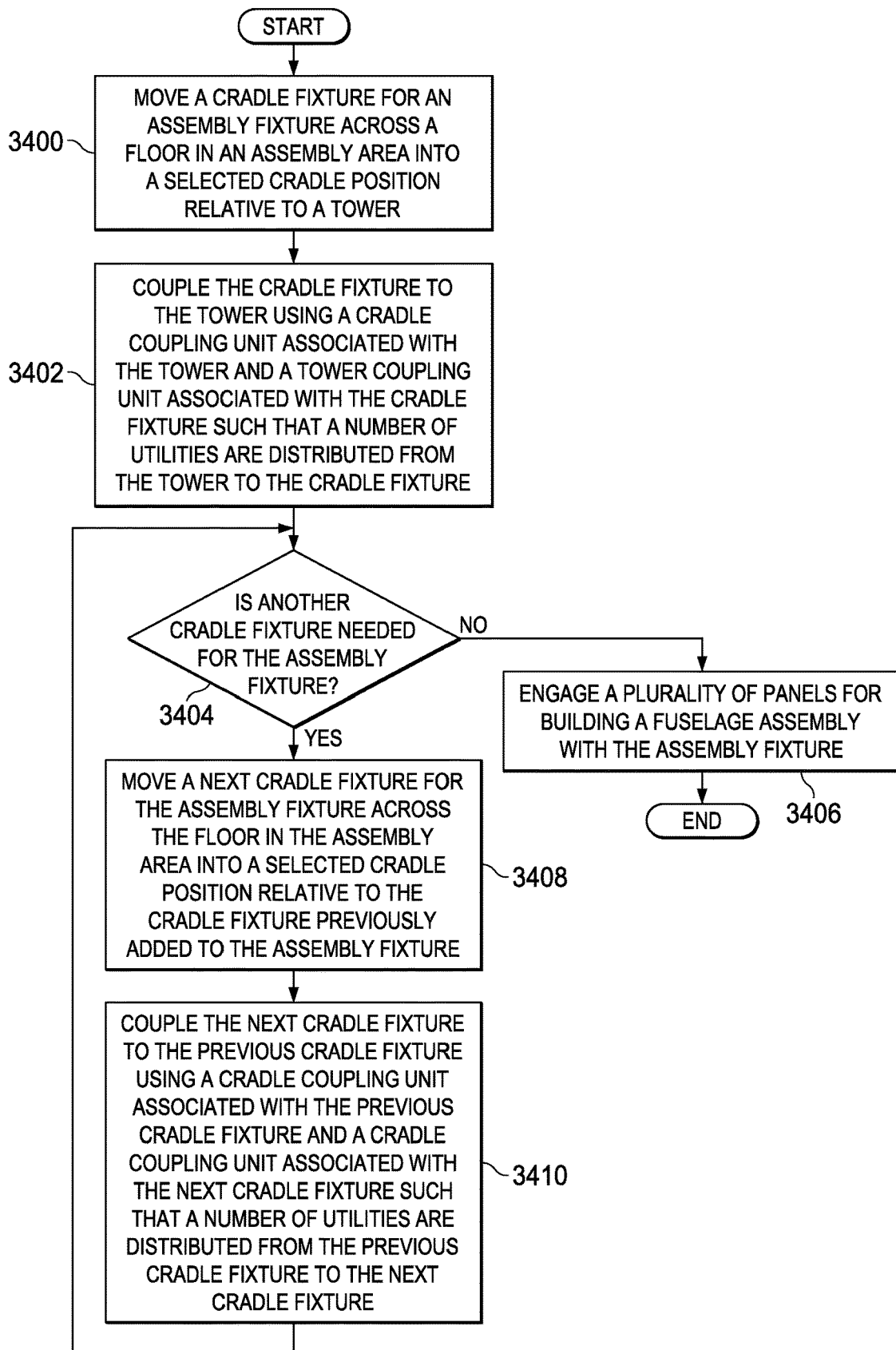
FIG. 34 is an illustration of a process for configuring an assembly fixture in the form of a flowchart in accordance with an illustrative embodiment.

Turning now to FIG. 34, an illustration of a process for configuring an assembly fixture is depicted in the form of a flowchart in accordance with an illustrative embodiment. The process illustrated in FIG. 34 may be implemented to configure assembly fixture 324 in FIG. 1.

The process may begin by moving cradle fixture 600 for assembly fixture 324 across floor 300 into selected cradle position 631 relative to tower 332 in assembly area 304 (operation 3400). Next, cradle fixture 600 may be coupled to tower 332 using cradle coupling unit 612 associated with tower 332 and tower coupling unit 613 associated with cradle fixture 600 such that number of utilities 146 are distributed from tower 332 to cradle fixture 600 (operation 3402).

Thereafter, a determination is made as to whether another cradle fixture is needed for assembly fixture 324 (operation 3404). If another cradle fixture is not needed, assembly fixture 324 is complete and plurality of panels 120 for building fuselage assembly 114 are engaged with assembly fixture 324 (operation 3406), with the process terminating thereafter.

With reference again to operation 3404, if another cradle fixture is needed, a next cradle fixture for assembly fixture 324 is moved across floor 300 in assembly area 304 into a selected cradle position relative to cradle fixture 600 previously added to assembly fixture 324 (operation 3408). Thereafter, the next cradle fixture may be coupled to the previous cradle fixture using the cradle coupling unit associated with the previous cradle fixture and the cradle coupling unit associated with the next cradle fixture such that number of utilities 146 are distributed from the previous cradle fixture to the next cradle fixture (operation 3410). The process may then proceed to operation 3404 as described above.

Figure 35:
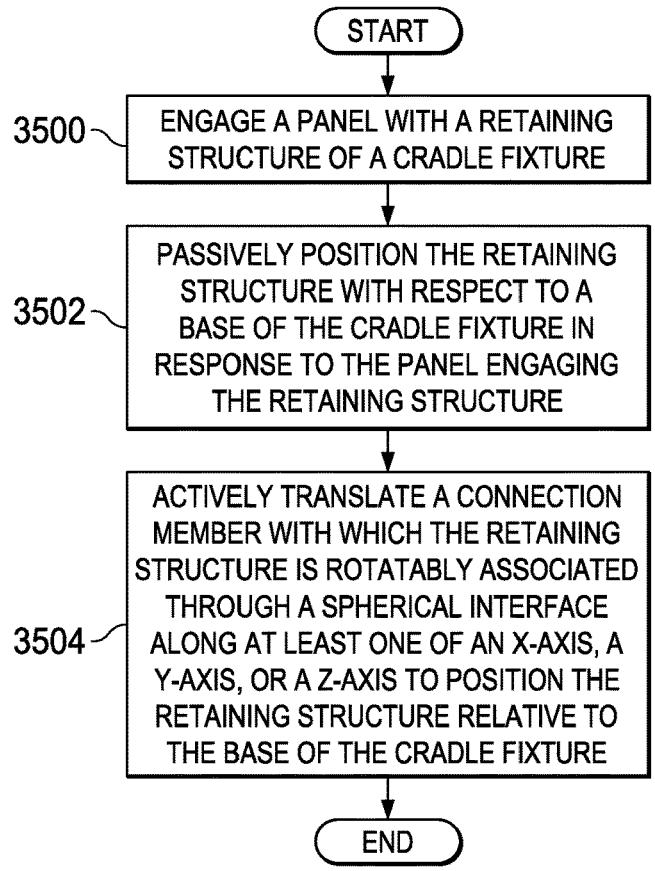
FIG. 35 is an illustration of a process for adjusting a retaining structure of a cradle fixture in the form of a flowchart in accordance with an illustrative embodiment.

Turning now to FIG. 35, an illustration of a process for adjusting a retaining structure of a cradle fixture is depicted in the form of a flowchart in accordance with an illustrative embodiment. The process illustrated in FIG. 35 may be implemented to adjust, for example, without limitation, retaining structure 615 of cradle fixture 600 in FIG. 1.

The process may begin by engaging panel 119 with retaining structure 616 of cradle fixture 600 (operation 3500). Panel 216 may be a fuselage panel. Next, panel 216 may passively position retaining structure 616 with respect to base 602 of cradle fixture 600 in response to panel 216 engaging retaining structure 616 (operation 3502). Thereafter, connection member 652 with which retaining structure 616 is rotatably associated through spherical interface 654 may be actively translated along at least one of X-axis 634, Y-axis 636, or Z-axis 638 to position retaining structure 616 relative to base 602 of cradle fixture 600 (operation 3504), with the process terminating thereafter.

Figure 36:
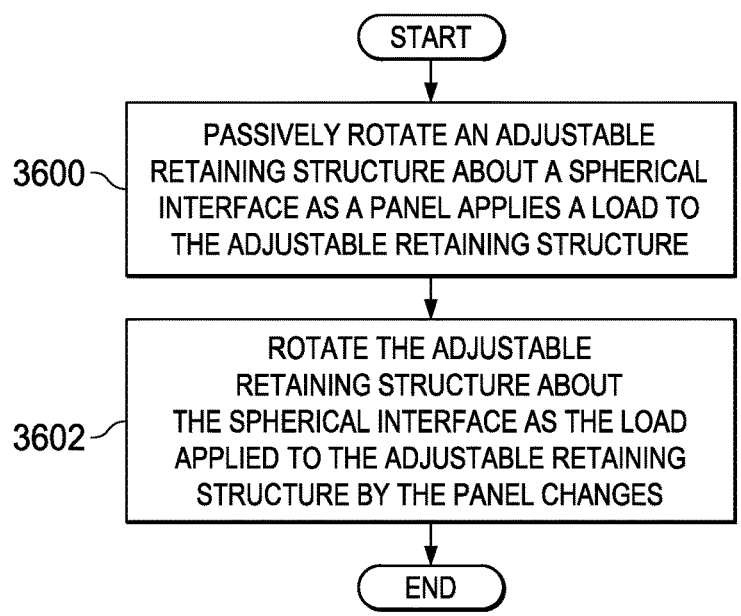
FIG. 36 is an illustration of adjusting an adjustable retaining structure in the form of a flowchart in accordance with an illustrative embodiment.

With reference now to FIG. 36, an illustration of a process for adjusting an adjustable retaining structure is depicted in the form of a flowchart in accordance with an illustrative embodiment. The process illustrated in FIG. 36 may be used to adjust, for example, without limitation, adjustable retaining structure 655 in FIG. 6.

The process may begin by passively rotating adjustable retaining structure 655 about spherical interface 654 as a panel applies load to adjustable retaining structure 655 (operation 3600). Adjustable retaining structure 655 may be rotated about spherical interface 654 as the load applied to adjustable retaining structure 655 by the panel changes (operation 3602), with the process terminating thereafter. In other words, in operation 3602, adjustable retaining structure 655 may passively rotate about spherical interface 654 as the load being applied to adjustable retaining structure 655 during the building of fuselage assembly 114 changes over time.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 37:
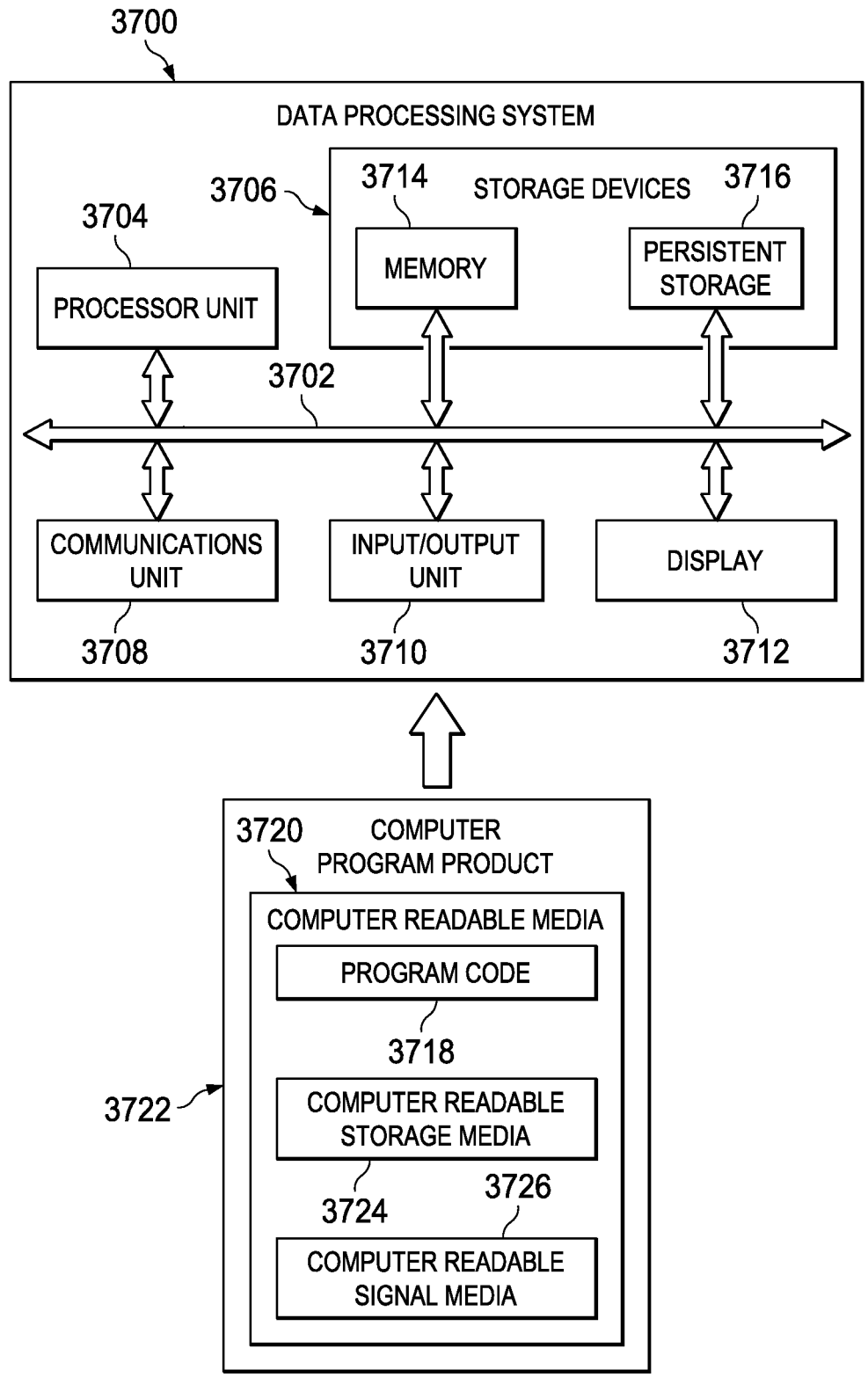
FIG. 37 is an illustration of a data processing system in the form of a block diagram in accordance with an illustrative embodiment.

Turning now to FIG. 37, an illustration of a data processing system is depicted in the form of a block diagram in accordance with an illustrative embodiment. Data processing system 3700 may be used to implement any of the controllers described above, including control system 136 in FIG. 1. In some illustrative examples, data processing system 3700 may be used to implement at least one of a controller in set of controllers 140 in FIG. 1 or controller 650 in FIG. 6.

As depicted, data processing system 3700 includes communications framework 3702, which provides communications between processor unit 3704, storage devices 3706, communications unit 3708, input/output unit 3710, and display 3712. In some cases, communications framework 3702 may be implemented as a bus system.

Processor unit 3704 is configured to execute instructions for software to perform a number of operations. Processor unit 3704 may comprise at least one of a number of processors, a multi-processor core, or some other type of processor, depending on the implementation. In some cases, processor unit 3704 may take the form of a hardware unit, such as a circuit system, an application specific integrated circuit (ASIC), a programmable logic device, or some other suitable type of hardware unit.

Instructions for the operating system, applications and programs run by processor unit 3704 may be located in storage devices 3706. Storage devices 3706 may be in communication with processor unit 3704 through communications framework 3702. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 3714 and persistent storage 3716 are examples of storage devices 3706. Memory 3714 may take the form of, for example, a random access memory or some type of volatile or non-volatile storage device. Persistent storage 3716 may comprise any number of components or devices. For example, persistent storage 3716 may comprise a hard drive, a flash memory, a rewritable optical disk, a rewritable magnetic tape, or some combination of the above. The media used by persistent storage 3716 may or may not be removable.

Communications unit 3708 allows data processing system 3700 to communicate with other data processing systems, devices, or both. Communications unit 3708 may provide communications using physical communications links, wireless communications links, or both.

Input/output unit 3710 allows input to be received from and output to be sent to other devices connected to data processing system 3700. For example, input/output unit 3710 may allow user input to be received through a keyboard, a mouse, some other type of input device, or a combination thereof. As another example, input/output unit 3710 may allow output to be sent to a printer connected to data processing system 3700.

Display 3712 is configured to display information to a user. Display 3712 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 3704 using computer-implemented instructions. These instructions may be referred to as program code, computer usable program code, or computer readable program code and may be read and executed by one or more processors in processor unit 3704.

In these examples, program code 3718 is located in a functional form on computer readable media 3720, which is selectively removable, and may be loaded onto or transferred to data processing system 3700 for execution by processor unit 3704. Program code 3718 and computer readable media 3720 together form computer program product 3722. In this illustrative example, computer readable media 3720 may be computer readable storage media 3724 or computer readable signal media 3726.

Computer readable storage media 3724 is a physical or tangible storage device used to store program code 3718 rather than a medium that propagates or transmits program code 3718. Computer readable storage media 3724 may be, for example, without limitation, an optical or magnetic disk or a persistent storage device that is connected to data processing system 3700.

Alternatively, program code 3718 may be transferred to data processing system 3700 using computer readable signal media 3726. Computer readable signal media 3726 may be, for example, a propagated data signal containing program code 3718. This data signal may be an electromagnetic signal, an optical signal, or some other type of signal that can be transmitted over physical communications links, wireless communications links, or both.

The illustration of data processing system 3700 in FIG. 37 is not meant to provide architectural limitations to the manner in which the illustrative embodiments may be implemented. The different illustrative embodiments may be implemented in a data processing system that includes components in addition to or in place of those illustrated for data processing system 3700. Further, components shown in FIG. 37 may be varied from the illustrative examples shown.

Figure 38:
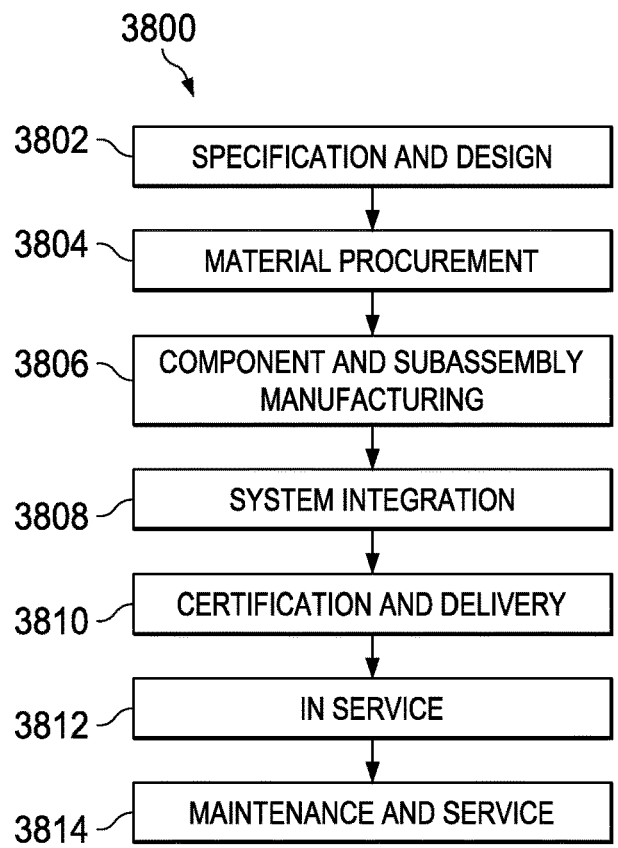
FIG. 38 is an illustration of an aircraft manufacturing and service method in the form of a block diagram in accordance with an illustrative embodiment.
Figure 39:
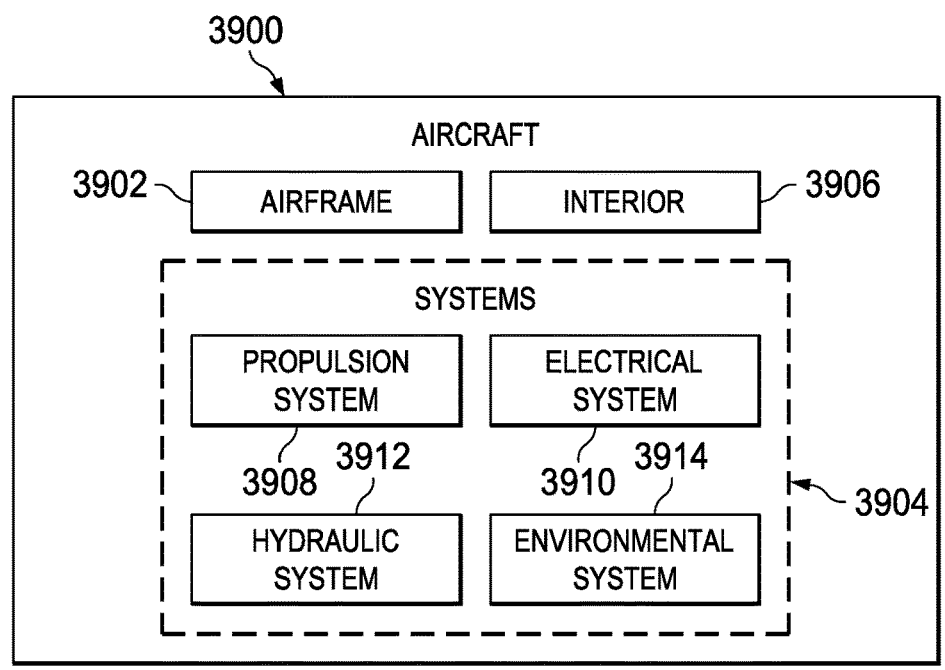
FIG. 39 is an illustration of an aircraft in the form of a block diagram in which an illustrative embodiment may be implemented.

The illustrative embodiments of the disclosure may be described in the context of aircraft manufacturing and service method 3800 as shown in FIG. 38 and aircraft 3900 as shown in FIG. 39. Turning first to FIG. 38, an illustration of an aircraft manufacturing and service method is depicted in the form of a block diagram in accordance with an illustrative embodiment. During pre-production, aircraft manufacturing and service method 3800 may include specification and design 3802 of aircraft 3900 in FIG. 39 and material procurement 3804.

During production, component and subassembly manufacturing 3806 and system integration 3808 of aircraft 3900 in FIG. 39 takes place. Thereafter, aircraft 3900 in FIG. 39 may go through certification and delivery 3810 in order to be placed in service 3812. While in service 3812 by a customer, aircraft 3900 in FIG. 39 is scheduled for routine maintenance and service 3814, which may include modification, reconfiguration, refurbishment, and other maintenance or service.

Each of the processes of aircraft manufacturing and service method 3800 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 39, an illustration of an aircraft is depicted in the form of a block diagram in which an illustrative embodiment may be implemented. In this example, aircraft 3900 is produced by aircraft manufacturing and service method 3800 in FIG. 38 and may include airframe 3902 with plurality of systems 3904 and interior 3906. Examples of systems 3904 include one or more of propulsion system 3908, electrical system 3910, hydraulic system 3912, and environmental system 3914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3800 in FIG. 38. In particular, flexible manufacturing system 106 from FIG. 1 may be used to build at least a portion of airframe 3902 of aircraft 3900 during any one of the stages of aircraft manufacturing and service method 3800. For example, without limitation, flexible manufacturing system 106 from FIG. 1 may be used during at least one of component and subassembly manufacturing 3806, system integration 3808, or some other stage of aircraft manufacturing and service method 3800 to form a fuselage for aircraft 3900.

In one illustrative example, components or subassemblies produced in component and subassembly manufacturing 3806 in FIG. 38 may be fabricated or manufactured in a manner similar to components or subassemblies produced while aircraft 3900 is in service 3812 in FIG. 38. As yet another example, one or more apparatus embodiments, method embodiments, or a combination thereof may be utilized during production stages, such as component and subassembly manufacturing 3806 and system integration 3808 in FIG. 38. One or more apparatus embodiments, method embodiments, or a combination thereof may be utilized while aircraft 3900 is in service 3812, during maintenance and service 3814 in FIG. 38, or both. The use of a number of the different illustrative embodiments may substantially expedite the assembly of and reduce the cost of aircraft 3900.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for aligning a plurality of sub-panels of a fuselage keel panel during an assembly of a fuselage, the method comprising:
   the fuselage keel panel comprising the plurality of sub-panels;
   placing a first sub-panel of the sub-panels onto a curved beam of an adjustable retaining structure of a cradle fixture comprising a base, the adjustable retaining structure configured to rotate responsive to changing loads on the fuselage assembly during the assembly of the fuselage, the cured beam comprising a shape substantially matching a curvature for a corresponding portion of an outer mold line for the fuselage and supporting the first sub-panel;
   aligning the adjustable retaining structure with a curvature of the first sub-panel via the first sub-panel engaging the curved beam and passively rotating the curved beam about an X-axis, a Y-axis, and a Z-axis with respect to the base, such that the adjustable retaining structure connects to a lift configured to move along first rails parallel to the Y-axis and also move perpendicular to the Y-axis along second rails connected to a third rail transporting a utilities unit and a cable management system along the base;
   placing a second sub-panel of the sub-panels onto the curved beam and engaging the first sub-panel with the second sub-panel;
   aligning the adjustable retaining structure with a curvature of the second sub-panel via the second sub-panel engaging the curved beam and passively rotating the curved beam about the X-axis, the Y-axis, and the Z-axis with respect to the base; and
   connecting the first sub-panel to the second sub-panel.

2. The method of claim 1, wherein further comprising the base supporting a vertical movement system supporting a connection beam supporting an interface pivotally supporting the curved beam.

3. The method of claim 2 further comprising:
   a shape of the first sub-panel and the second sub-panel temporarily connected substantially matching the curvature for the corresponding portion of the outer mold line for the fuselage; and
   supporting a load of the first sub-panel and the second sub-panel using the adjustable retaining structure.

4. The method of claim 2, further comprising:
   the interface comprising a spherical interface; and
   rotating the adjustable retaining structure about the spherical interface in response to the adjustable retaining structure impinging on the first sub-panel.

5. The method of claim 4, wherein rotating the adjustable retaining structure comprises:
   rotating the adjustable retaining structure about the spherical interface in response to a loading of the adjustable retaining structure when the adjustable retaining structure impinges on the first sub-panel.

6. The method of claim 1, further comprising impinging on the first sub-panel with the adjustable retaining structure to align the curved beam of the adjustable retaining structure with the curvature of the first sub-panel.

7. The method of claim 1, further comprising moving the adjustable retaining structure towards the first sub-panel such that the adjustable retaining structure impinges on the first sub-panel.

8. The method of claim 7, wherein moving the adjustable retaining structure comprises:
   moving the adjustable retaining structure towards the first sub-panel using at least one scissor lift mechanism.

9. The method of claim 7, wherein moving the adjustable retaining structure comprises:
   applying a force against the first sub-panel with the adjustable retaining structure as the adjustable retaining structure is moved in a direction towards the first sub-panel.

10. The method of claim 7, wherein moving the adjustable retaining structure comprises:
    translating the adjustable retaining structure along at least one of the X-axis, the Y-axis, or the Z-axis to move the adjustable retaining structure towards the first sub-panel.

11. The method of claim 10, wherein translating the adjustable retaining structure comprises:
    translating a connection member with which the adjustable retaining structure is rotatably associated along the at least one of the X-axis, the Y-axis, or the Z-axis.

12. The method of claim 11, wherein translating the connection member comprises:
    translating the connection member autonomously along the at least one of the X-axis, the Y-axis, or the Z-axis.

13. The method of claim 1, further comprising:
    impinging on the first sub-panel with the adjustable retaining structure; and
    wherein rotating the adjustable retaining structure comprises rotating the adjustable retaining structure about a spherical interface about the X-axis, the Y-axis, and the Z-axis until the curved beam of the adjustable retaining structure aligns with the curvature of the first sub-panel.

14. The method of claim 1 further comprising:
    moving the adjustable retaining structure relative to the base of the cradle fixture prior to the first sub-panel being engaged with the adjustable retaining structure.

15. The method of claim 14, wherein moving the adjustable retaining structure comprises:
    translating the adjustable retaining structure along at least one of the X-axis, the Y-axis, or the Z-axis to position the adjustable retaining structure relative to the base of the cradle fixture.

16. The method of claim 15, wherein translating the adjustable retaining structure comprises:
    translating a connection member with which the adjustable retaining structure is associated along the X-axis relative to the base using a first rail system; and
    translating the connection member along the Y-axis relative to the base using a second rail system.

17. The method of claim 15, wherein translating the adjustable retaining structure comprises:

translating a connection member along the Z-axis relative to the base using at least one scissor lift mechanism.

18. The method of claim 1 further comprising:
readjusting an alignment of the adjustable retaining structure with the first sub-panel during building of the fuselage.

19. The method of claim 18, wherein readjusting the alignment of the adjustable retaining structure comprises:
rotating, passively, the adjustable retaining structure about a spherical interface as a load being applied to the adjustable retaining structure changes during the building of the fuselage.

20. The method of claim 1, further comprising the adjustable retaining structure comprising a number of curved beams comprising a curvature that substantially matches the curvature of the outer mold line for the keel panel of the fuselage.

21. A method for adjusting an adjustable retaining structure comprising a curved beam during assembly of a plurality of sub-panels of skin panels in a keel panel, the method comprising:
the keel panel comprising the plurality of sub-panels;
engaging a first skin panel with a second skin panel while supporting at least one of the first skin panel or the second skin panel on the adjustable retaining structure;
aligning the curved beam with a curvature of the first skin panel and the second skin panel, as at least one of the first skin panel or the second skin panel apply loads to the adjustable retaining structure, via rotating, passively, the curved beam of the adjustable retaining structure about a spherical interface about an X-axis, a Y-axis, and a Z-axis, such that the adjustable retaining structure connects to a lift configured to move along first rails parallel to the Y-axis and also move perpendicular to the Y-axis along second rails connected to a third rail transporting a utilities unit and a cable management system along a base supporting the first rails and the second rails and the adjustable retaining structure; and
connecting the first skin panel to the second skin panel.

22. The method of claim 21 further comprising:
rotating the adjustable retaining structure about the spherical interface, such that the rotating occurs passively as the adjustable retaining structure supports the first skin panel and the second skin panel and loads, the loads being transferred through the first skin panel and the second skin panel to the adjustable retaining structure change; and
a shape of the first skin panel and the second skin panel temporarily connected substantially matching a curvature for a corresponding portion of an outer mold line of a structure comprising the first skin panel and the second skin panel.

23. A system configured to align sub-panels in a keel panel in a fuselage assembly, such that the system comprises a cradle fixture, configured to support assembly of the keel panel for a curved structure, such that:
the keel panel comprises a plurality of sub-panels; and
the cradle fixture comprises:
a base; and
an adjustable retaining structure associated with the base, such that the adjustable retaining structure connects to a lift configured to move along first rails parallel to a Y-axis with respect to the base and also move perpendicular to the Y-axis along second rails connected to a third rail transporting a utilities unit and a cable management system along the base, and comprises curved beams configured to:
support the plurality of sub-panels for assembly of the keel panel of the curved structure;
responsive to engaging the plurality of sub-panels to each other on the curved beams, rotate at least one sub-panel of the plurality of sub-panels passively about an X-axis, the Y-axis, and a Z-axis with respect to the base such that the plurality of sub-panels align the curved beam of the adjustable retaining structure comprising a spherical interface with a curvature of the plurality of sub-panels substantially matching a curvature for a corresponding portion of an outer mold line for the keel panel for the curved structure; and
rotate responsive to changing loads on the curved structure during the assembly of the curved structure.

24. The system of claim 23 further comprising:
a connection member, wherein the adjustable retaining structure is rotatably associated with the connection member.

25. The system of claim 24, wherein the adjustable retaining structure is rotatably associated with the connection member through the spherical interface.

26. The system of claim 24 further comprising:
a movement system that translates the connection member along at least one of the X-axis, the Y-axis, or the Z-axis relative to the base of the cradle fixture.

27. The system of claim 26, wherein the movement system comprises:
a rail system.

28. The system of claim 26, wherein the movement system comprises:
a scissor lift mechanism.

29. The system of claim 23 further comprising:
a plurality of stabilizing members associated with the base.

30. The system of claim 29 further comprising:
a tower coupling unit associated with the base;
a cradle coupling unit associated with the base; and
a robotics coupling unit associated with the base.

31. The system of claim 23 further comprising:
a set of sensors associated with the adjustable retaining structure, wherein a set of sensors aid in engaging the adjustable retaining structure with the plurality of sub-panels.

32. The system of claim 23, wherein the cradle fixture is a drivable cradle fixture.

33. An assembly fixture for a curved structure that comprises skin panels assembled to form a keel panel, such that the assembly fixture comprises:
the keel panel comprises a plurality of sub-panels;
a number of cradle fixtures in which at least one of the number of cradle fixtures comprises:
a number of retaining structures in which at least one of the number of retaining structures comprises an adjustable retaining structure that comprises: a base, such that the adjustable retaining structure connects to a lift configured to move along first rails parallel to a Y-axis with respect to the base and also move perpendicular to the Y-axis along second rails connected to a third rail transporting a utilities unit and a cable management system along the base, and a curved beam configured to:

impinge on a first sub-panel of the plurality of sub-panels engaged with a second sub-panel of the plurality of sub-panels for an exterior of the curved structure; and passively rotate the curved beam about an X-axis, a Y-axis, and a Z-axis with respect to the base and align the curved beam of the adjustable retaining structure with a curvature of the first sub-panel engaged with the second sub-panel, such that the curvature of the first sub-panel engaged with the second sub-panel substantially matches a curvature for a corresponding portion of an outer mold line for the curved structure.

\* \* \* \* \*